US011351843B2

(12) United States Patent
Nemoto

(10) Patent No.: US 11,351,843 B2
(45) Date of Patent: Jun. 7, 2022

(54) AIR VENT UNIT SERVING AS CONTAINER HOLDER

(71) Applicant: NIFCO INC., Yokosuka (JP)

(72) Inventor: Takehiko Nemoto, Yokosuka (JP)

(73) Assignee: NIFCO INC., Yokosuka (JP)

( * ) Notice: Subject to any disclaimer, the term of this patent is extended or adjusted under 35 U.S.C. 154(b) by 320 days.

(21) Appl. No.: 16/616,156

(22) PCT Filed: Jun. 20, 2018

(86) PCT No.: PCT/JP2018/023469
§ 371 (c)(1),
(2) Date: Nov. 22, 2019

(87) PCT Pub. No.: WO2019/004023
PCT Pub. Date: Jan. 3, 2019

(65) Prior Publication Data
US 2020/0156445 A1 May 21, 2020

(30) Foreign Application Priority Data
Jun. 26, 2017 (JP) .............................. JP2017-123958

(51) Int. Cl.
*B60H 1/34* (2006.01)
*B60N 3/10* (2006.01)

(52) U.S. Cl.
CPC ............... *B60H 1/34* (2013.01); *B60N 3/104* (2013.01)

(58) Field of Classification Search
CPC .... B60R 2011/0008; B60R 2011/0082; B60H 1/34; B60H 2001/3492; B60N 3/102; B60N 3/104; B60N 3/10
See application file for complete search history.

(56) References Cited

U.S. PATENT DOCUMENTS 6,560,983 B1  5/2003  Schimmeyer

FOREIGN PATENT DOCUMENTS

| EP | 1422083 | * | 5/2004 |
|---|---|---|---|
| JP | S63-201837 A | | 8/1988 |
| JP | H02-060609 U | | 5/1990 |
| JP | H08-058455 A | | 3/1996 |
| JP | 2001-277948 A | | 10/2001 |

OTHER PUBLICATIONS

PCT/ISA/210, "International Search Report for International Application No. PCT/JP2018/023469," dated Aug. 28, 2018.

* cited by examiner

*Primary Examiner* — Steven S Anderson, II
(74) *Attorney, Agent, or Firm* — Manabu Kanesaka

(57) ABSTRACT

An air vent unit includes a vent portion communicating with an outlet of an air conditioning device; and a container holding portion communicating with the vent portion to hold a container. In a vent-portion attachment state wherein the vent portion is attached to an outlet by facing the vent portion toward an interior side, the container holding portion is stored inside the outlet. In a container-holding-portion attachment state wherein the air vent unit is removed from the outlet from the vent-portion attachment state and the vent portion is attached by facing toward the outlet, the container holding portion projects toward the interior side, and at that time, the container holding portion is held not to be pushed toward an inside of the outlet.

11 Claims, 72 Drawing Sheets

FIG. 7
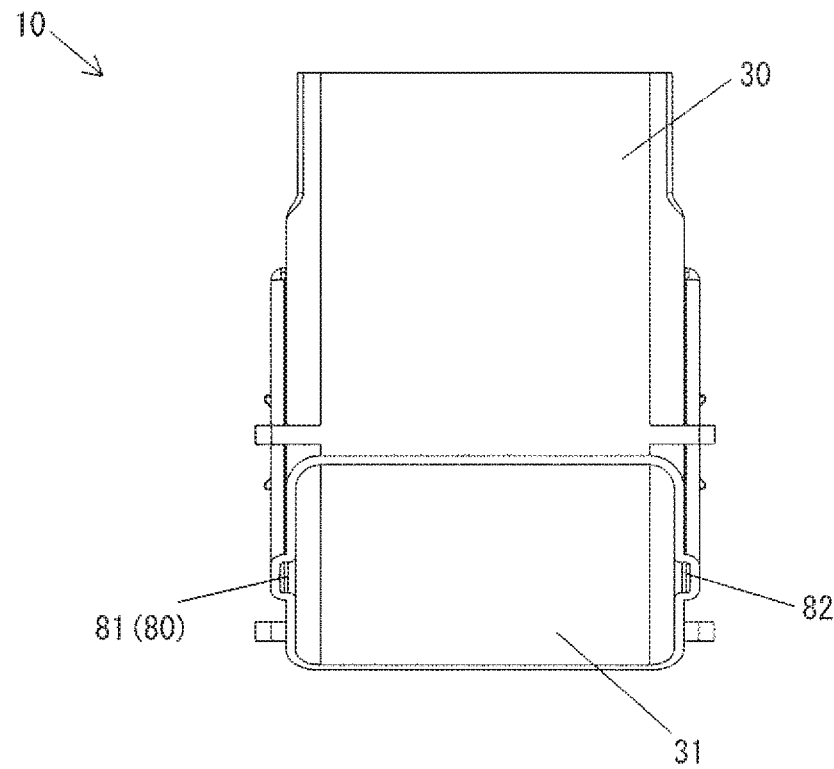
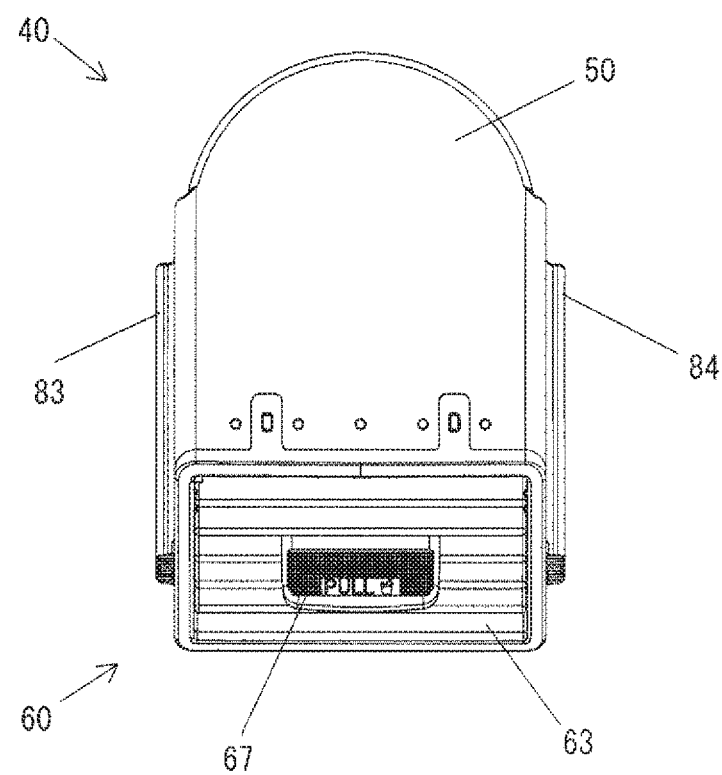

FIG. 9
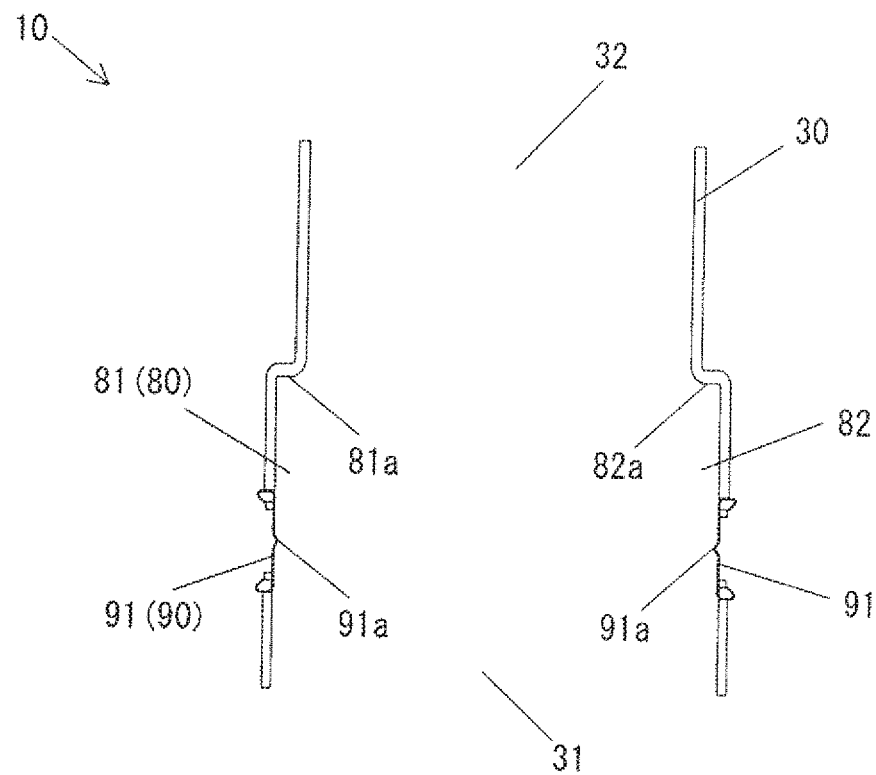
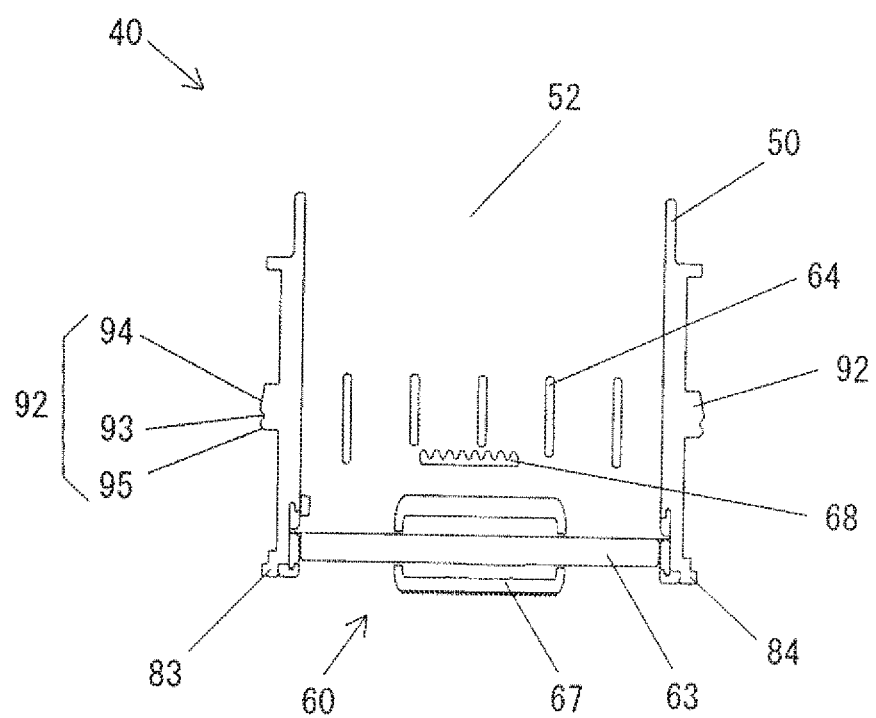

FIG. 32
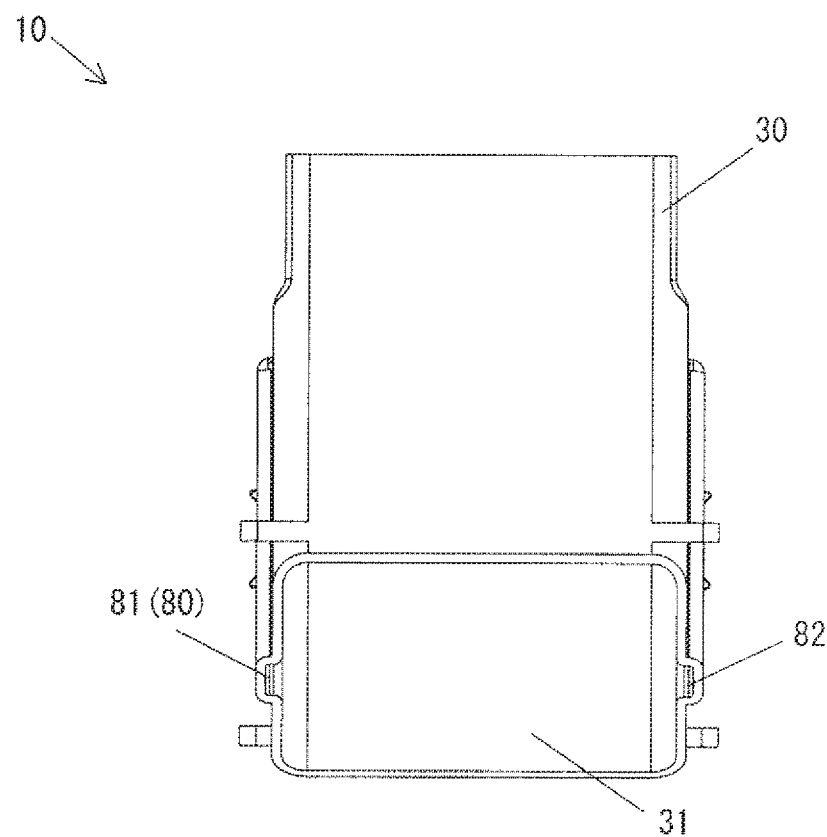
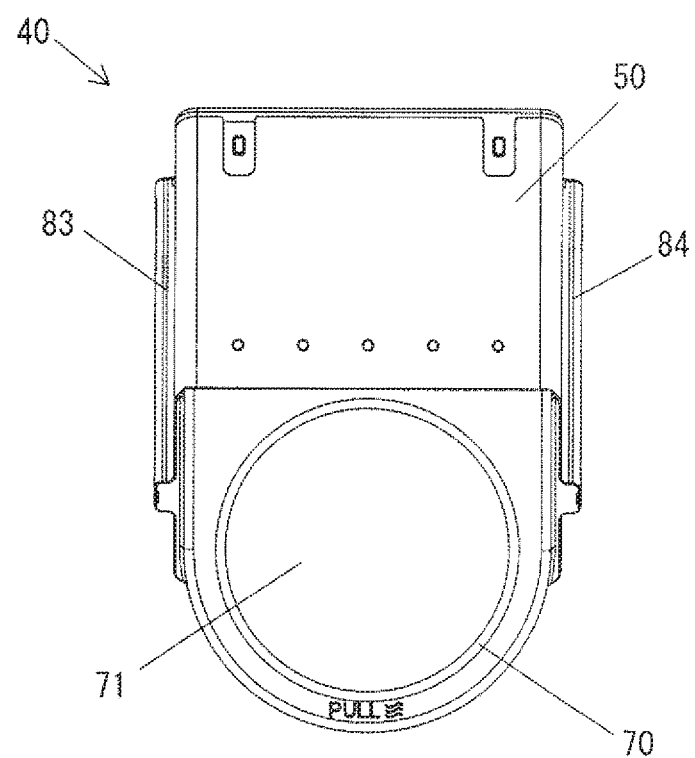

FIG. 47
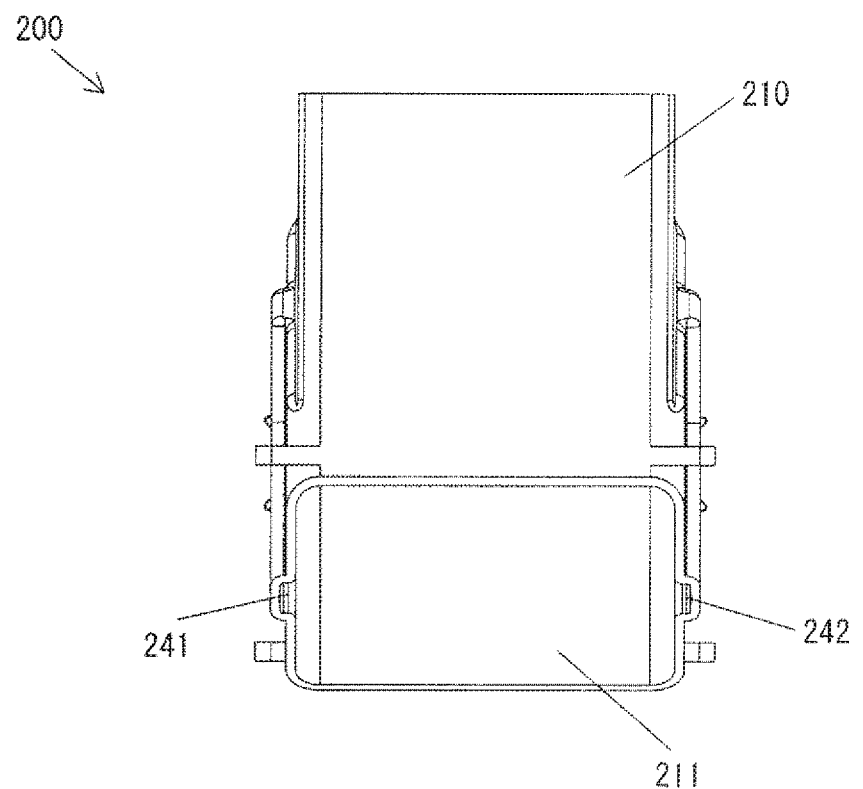
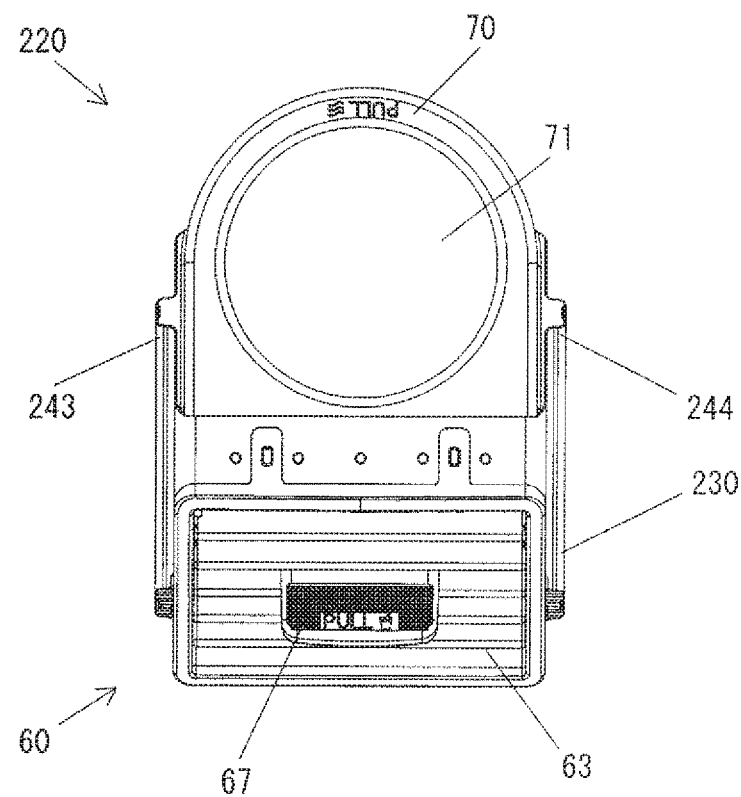

FIG. 57
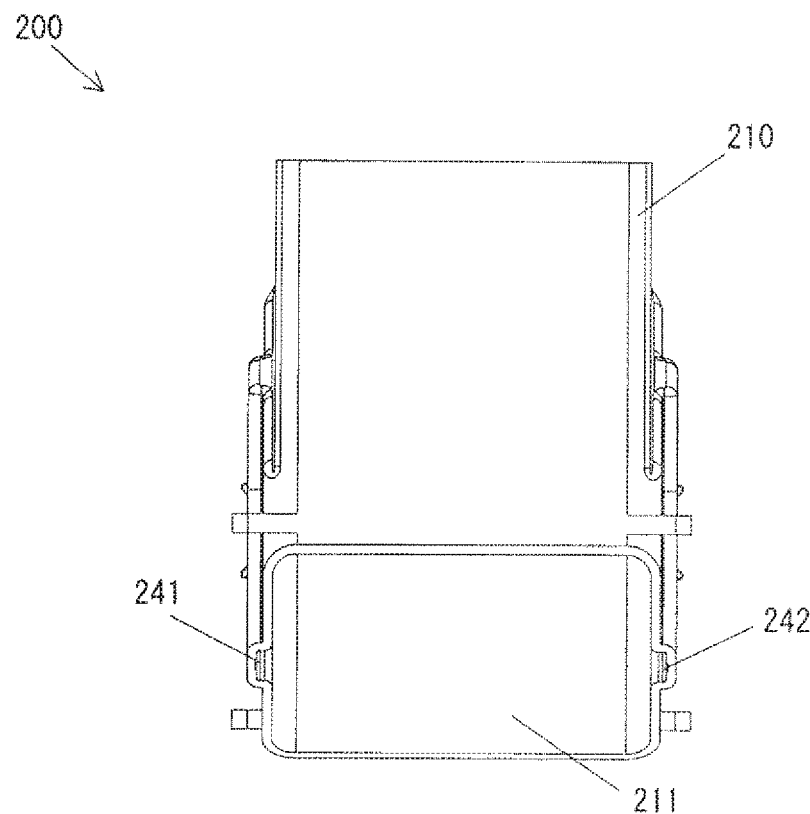
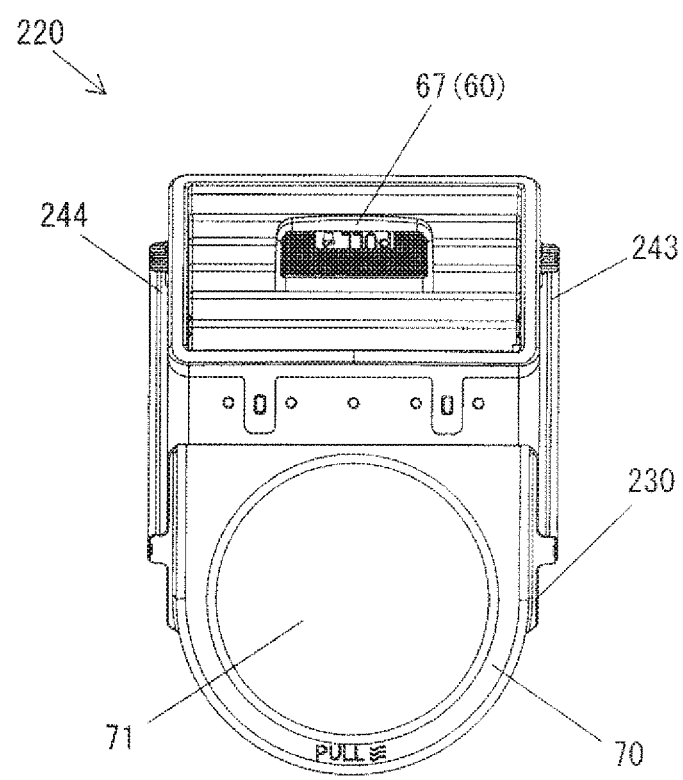

AIR VENT UNIT SERVING AS CONTAINER HOLDER

FIELD OF TECHNOLOGY

The present invention relates to an air vent unit serving as a container holder.

BACKGROUND ART

Conventionally, there is known a "register for automobile" wherein on both sides of a register case, a guide groove for guiding a slide arm of a register barrel which can store a beverage is formed in a front-back direction (see paragraph [0006] and FIG. 1 of Patent Document 1).

The aforementioned conventional register barrel is pivotally attached to a tip portion of the slide arm so as to be capable of turning over up and down by pins provided to project on side faces on both sides (see paragraphs [0007] and [0010], and FIG. 1 and FIG. 3 of the Patent Document 1).

Also, conventionally, there is known an "automobile insulating container" which stores a register grill and a container including a punched hole to which a can be inserted in an outlet, and which can be pulled out when the can is inserted (for example, see page 3, lines 5 to 15 of specification, and FIG. 1 and FIG. 2 of Patent Document 2).

PRIOR ART DOCUMENTS

Patent Documents

Patent Document 1: Japanese Patent Application Publication No. H08-58455
Patent Document 2: Japanese Utility Model Publication No. S63-201837

SUMMARY OF THE INVENTION

Problems to be Solved by the Invention

In the aforementioned conventional "register for automobile", however, since the slide arm receives a weight of the register barrel, there is a problem such that a load is applied to the slide arm when using in a pull-out state.

Also, in the aforementioned conventional "automobile insulating container", since the container can be stored from the pull-out state, there is a problem such that when the container is stored by mistake, there is a possibility that the container might fall down.

Therefore, the present invention is made in view of the problems that the aforementioned conventional technology has, and an object of the present invention is to provide a unit also serving as an air vent which does not require a space for providing a container holding portion and can stably hold a beverage container.

Additionally, another object of the present invention is to prevent the beverage container stored by mistake and held in the container holding portion from falling down by holding the container holding portion in such a way so as to be incapable of being pushed toward an inside of the outlet in a container-holding-portion attachment state.

Means for Solving the Problems

The present invention is made in order to obtain the aforementioned objects, and the first aspect of the present invention has the following characteristics.

First, an air vent unit serving as a container holder comprises the following structures.

(1) Vent Portion

A vent portion communicates with an outlet of an air conditioning device.

(2) Container Holding Portion

A container holding portion communicates with the vent portion, and can hold a container.

Secondly, in a vent-portion attachment state wherein the vent portion is attached to the outlet toward an interior side, the container holding portion is stored inside the outlet.

Thirdly, in a container-holding-portion attachment state wherein from the vent-portion attachment state, the air vent unit is removed from the outlet, and the vent portion is attached to the outlet, the container holding portion is held in such a way not to be pushed toward an inside of the outlet in a state wherein the container holding portion projects toward the interior side.

In addition to the aforementioned characteristics of the first aspect of the present invention, a second aspect of the present invention has the following characteristics.

First, the air vent unit has the following structures.

(1) Case

A case is hollow for storing the outlet therein.

(2) Unit main member

A unit main member can be attached and detached relative to the case, and comprises the vent portion and the container holding portion.

Secondly, the following structures are provided between the case and the unit main member.

(3) Guide projection (4) Guide groove A guide groove fits in a guide projection, and extends along an attachment/detachment direction of the unit main member.

According to the second aspect of the present invention, in addition to an effect of the first aspect of the present invention, the container holding portion of the unit main member can be stably held relative to the case by the guide projection and the guide groove provided between the case and the unit main member.

In addition to the aforementioned characteristics of the second aspect of the present invention, a third aspect of the present invention has the following characteristics.

Namely, the guide projection and the guide groove are provided respectively on at least one inside face in a right-and-left direction or an up-and-down direction of the case, and at least one outside face in a right-and-left direction or an up-and-down direction of the unit main member facing the aforementioned inside face.

Incidentally, in the first embodiment shown in FIG. 1 to FIG. 40, guide grooves (81 and 82) are positioned in a case (30) as shown in FIG. 12, and two guide grooves are provided to face each other on an inside face of a left side wall (100) and on an inside face of a right side wall (101).

Also, in the first embodiment, as shown in FIG. 19, guide projections (83 and 84) are positioned in a unit main member (40), and two guide projections are provided to be arranged back to back on an outside face of a first side face (110) and on an outside face of a second side face (111).

Furthermore, in a third embodiment shown in FIG. 66, there is shown an example of an embodiment wherein one guide projection is provided in the right-and-left direction, and in a fourth embodiment shown in FIG. 67, and a fifth embodiment shown in FIG. 68, there are shown examples of embodiments wherein one guide projection is provided in the up-and-down direction, respectively.

According to the third aspect of the present invention, in addition to an effect of the aforementioned second aspect of the present invention, the guide projection and the guide groove are respectively provided on the inside face of the case and the outside face of the unit main member facing the aforementioned inside face, so that the container holding portion of the unit main member can be stably held relative to the case.

The fourth embodiment of the present invention has the following characteristics in addition to the characteristics of the aforementioned second aspect or third aspect of the present invention.

First, in the container holding portion, there is provided a container insertion hole which can insert the container.

Secondly, in a state wherein the vent portion is attached by facing the outlet, and the container insertion hole faces downward, there is provided an erroneous-assembly prevention device for preventing the guide projection from fitting into the guide groove.

According to the fourth aspect of the present invention, in addition to an effect of the aforementioned second aspect or third aspect of the present invention, in the state wherein the vent portion is attached to face the outlet, and the container insertion hole which can insert a beverage container faces downward, the guide projection is prevented from fitting into the guide groove so as to prevent an erroneous assembly.

A fifth aspect of the present invention has the following characteristics in addition to the aforementioned characteristics of the fourth aspect of the present invention.

First, the guide projection and the guide groove are provided respectively on the inside face facing in the right-and-left direction or the up-and-down direction of the case, and on the outside face facing in the right-and-left direction or the up-and-down direction of the unit main member facing the aforementioned facing inside face.

Incidentally, in the first embodiment shown in FIG. 1 to FIG. 40, the guide grooves (81 and 82) are positioned in the case (30) as shown in FIG. 12, and the two guide grooves are provided to face each other on the inside face of the left side wall (100) and on the inside face of the right side wall (101).

Also, in the first embodiment, as shown in FIG. 19, the guide projections (83 and 84) are positioned in the unit main member (40), and the two guide projections are provided to be arranged back to back on the outside face of the first side face (110) and on the outside face of the second side face (111).

Secondly, the erroneous-assembly prevention device is formed such that a groove width, or a height position in the up-and-down direction or a position in the right-and-left direction of the facing guide grooves is differentiated from each groove.

Incidentally, in the first embodiment, as shown in FIG. 11 to FIG. 13, the guide grooves (81 and 82) are positioned in the case (30), and the groove width of the guide grooves (81 and 82) are differentiated from each groove.

Also, in a sixth embodiment shown in FIG. 69, and a seventh embodiment shown in FIG. 70, there are shown embodiments wherein height positions in the up-and-down direction are differentiated from each other. Also, in an eighth embodiment shown in FIG. 71 and a ninth embodiment shown in FIG. 72, there are shown embodiments wherein positions in the right-and-left direction are differentiated from each other.

According to the fifth aspect of the present invention, in addition to an effect of the aforementioned fourth aspect of the present invention, the groove width, or the height position in the up-and-down direction or the position in the right-and-left direction of the facing guide grooves is differentiated from each groove so as to prevent the erroneous assembly.

A sixth aspect of the present invention has the following characteristics in addition to the characteristics of any one of the aforementioned second to fifth aspects of the present invention.

First, at least one portion of the vent portion of the unit main member fits in an inside of the case.

Secondly, in the container-holding-portion attachment state, a pushing prevention device for allowing the container holding portion to be incapable of being pushed toward the inside of the outlet is formed by a first abutment portion (for example, one end portion of the guide projection) positioned between the inside of the case and one portion of the vent portion to fit in the inside of the case, abutting against each other in a state wherein one portion of the vent portion fits in the inside of the case, and provided in one portion of the vent portion; and a second abutment portion (for example, a terminal portion of the guide groove abutting against one end portion of the guide projection) provided inside the case.

Incidentally, in the first embodiment shown in FIG. 1 to FIG. 40, one end portion of the guide projections (83 and 84) is shown as an example of the first abutment portion, and terminal portions (81a and 82a) of the guide grooves (81 and 82) abutting against one end portion of the guide projections (83 and 84) are shown as examples of the second abutment portion, respectively. However, the first abutment portion and the second abutment portion are not limited to the aforementioned examples, and although it is not shown in the drawings, a projection may be provided inside the case (30) such that the unit main member (40) abuts against the projection thereof.

According to the sixth aspect of the present invention, in addition to an effect of any one of the aforementioned second to fifth aspects of the present invention, the first abutment portion and the second abutment portion abutting against the first abutment portion are respectively provided between the inside of the case and one portion of the vent portion to fit in the inside of the case so as to prevent pushing of the container holding portion toward the inside of the outlet in the container-holding-portion attachment state.

A seventh aspect of the present invention has the following characteristics in addition to the characteristics of the aforementioned sixth aspect of the present invention.

First, the first abutment portion is provided in one of either the guide projection or the guide groove.

Secondly, in another of either the guide projection or the guide groove, there is provided the second abutment portion abutting against the first abutment portion.

Incidentally, in the first embodiment shown in FIG. 1 to FIG. 40, one end portion of the guide projections (83 and 84) as the first abutment portion abuts against the terminal portions (81a and 82a) of the guide grooves (81 and 82) abutting against one end portion of the guide projections (83 and 84) as the second abutment portion.

According to the seventh aspect of the present invention, in addition to an effect of the aforementioned sixth aspect of the present invention, the first abutment portion and the second abutment portion abutting against the first abutment portion are respectively provided in the guide projection and the guide groove so as to prevent pushing of the container holding portion toward the inside of the outlet in the container-holding-portion attachment state.

An eighth aspect of the present invention has the following characteristics in addition to the characteristics of the aforementioned seventh aspect of the present invention.

First, the first abutment portion is formed by the guide projection.

Secondly, the second abutment portion is formed by the guide groove, and is positioned in the terminal portion (for example, the terminal portion of the guide groove) in an insertion direction of the guide projection into the guide groove.

According to the eighth aspect of the present invention, in addition to an effect of the aforementioned seventh aspect of the present invention, the first abutment portion is formed by the guide projection, and the second abutment portion is formed by the guide groove, and is positioned in the terminal portion in the insertion direction of the guide projection into the guide groove so as to prevent pushing of the container holding portion toward the inside of the outlet in the container-holding-portion attachment state.

A ninth aspect of the present invention has the following characteristics in addition to the characteristics of the aforementioned first aspect of the present invention.

First, the container holding portion includes the following structures.

(1) Container Insertion Hole

In a container insertion hole, the container can be inserted.

(2) Container Support Portion

A container support portion supports a bottom of the container inserted through the container insertion hole.

Secondly, in the vent-portion attachment state, the container holding portion is stored inside the outlet by facing the container insertion hole downward.

Thirdly, in a state wherein the air vent unit (for example, the unit main member) is removed from the outlet, in a state wherein the air vent unit (for example, the unit main member) turns over in the up-and-down direction and the container insertion hole faces upward, a vent portion (60) is attached to face the outlet.

According to the ninth aspect of the present invention, in addition to the effect of the aforementioned first aspect of the present invention, in the state wherein the air vent unit is removed from the outlet, in the state wherein the air vent unit turns over in the up-and-down direction and the container insertion hole faces upward, the vent portion can be attached to face the outlet.

A tenth aspect of the present invention has the following characteristics in addition to the aforementioned characteristics of the first aspect of the present invention.

First, the container holding portion has the following structures.

(1) Container Insertion Hole

In the container insertion hole, the container can be inserted.

(2) Container Support Portion

The container support portion supports the bottom of the container inserted through the container insertion hole.

Secondly, in the vent-portion attachment state, the container holding portion is stored inside the outlet by facing the container insertion hole upward.

Thirdly, in the state wherein the air vent unit (for example, the unit main member) is removed from the outlet, in a state wherein the air vent unit (for example, the unit main member) turns over in a horizontal direction and the container insertion hole faces upward, the vent portion is attached by facing toward the outlet.

According to the tenth aspect of the present invention, in addition to the effect of the aforementioned first aspect of the present invention, in the state wherein the air vent unit is removed from the outlet, in the state wherein the air vent unit turns over in the horizontal direction and the container insertion hole faces upward, the vent portion can be attached by facing toward the outlet.

Effect of the Invention

According to the present invention, a unit serving as an air vent, which does not require a space special for providing the container holding portion and can stably hold the beverage container, can be provided.

Additionally, according to the present invention, in the container-holding-portion attachment state, the container holding portion is held in such a way not to be pushed toward the inside of the outlet, so that the beverage container stored by mistake and held in the container holding portion can be prevented from falling down.

BRIEF DESCRIPTION OF THE DRAWINGS

FIG. 7 is a plan view corresponding to FIG. 6.

FIG. 9 is a cross-sectional view taken along line A-A in FIG. 6.

FIG. 32 is a plan view of FIG. 31.

FIG. 47 is a plan view corresponding to FIG. 46.

FIG. 57 is a plan view of FIG. 56.

BEST MODES OF CARRYING OUT THE INVENTION

First Embodiment

Figure 1:
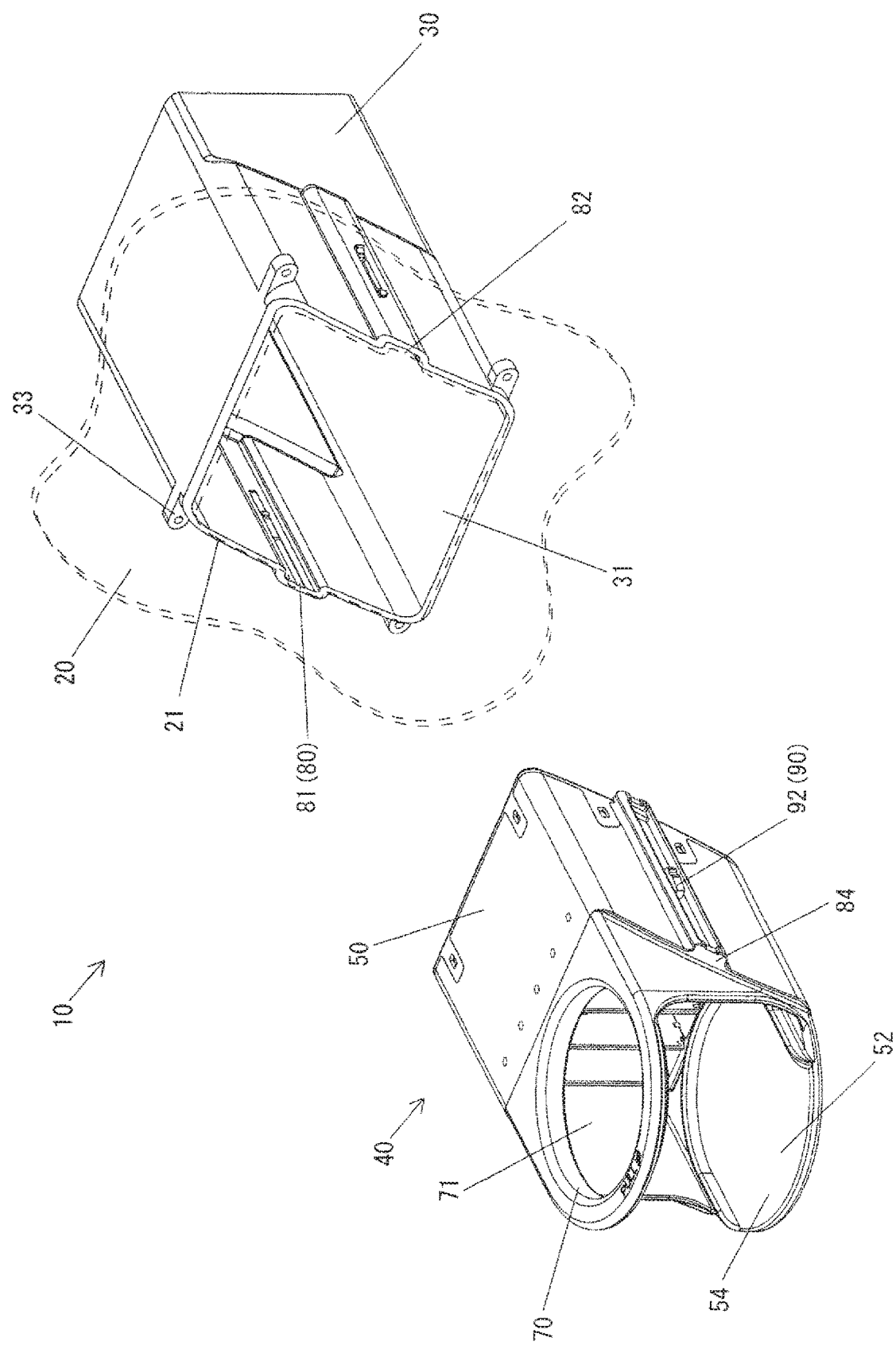
FIG. 1 is a perspective view of an air vent unit in a state wherein a container holding portion of a unit main member is removed according to the first embodiment of the present invention.

With reference to FIG. 1 to FIG. 4, the first embodiment of the present invention will be explained.

In FIG. 1 to FIG. 4, the reference numeral 10 represents an air vent unit also serving as a container holder, and although it is not shown in the drawings, the air vent unit also serving as the container holder is attached to an inside of a vehicle such as an automobile and the like, and is attached to an outlet 21 of an in-vehicle air conditioning device (not shown in the drawings).

Incidentally, although the automobile is shown as an example of the vehicle, it is not limited to the above, and may be a train, an airplane, a ship, and the like.

As shown in FIG. 1 to FIG. 4, the outlet 21 passes through a panel 20 facing an inside of a room, and is formed in a square.

(Air Vent Unit 10)

Figure 3:
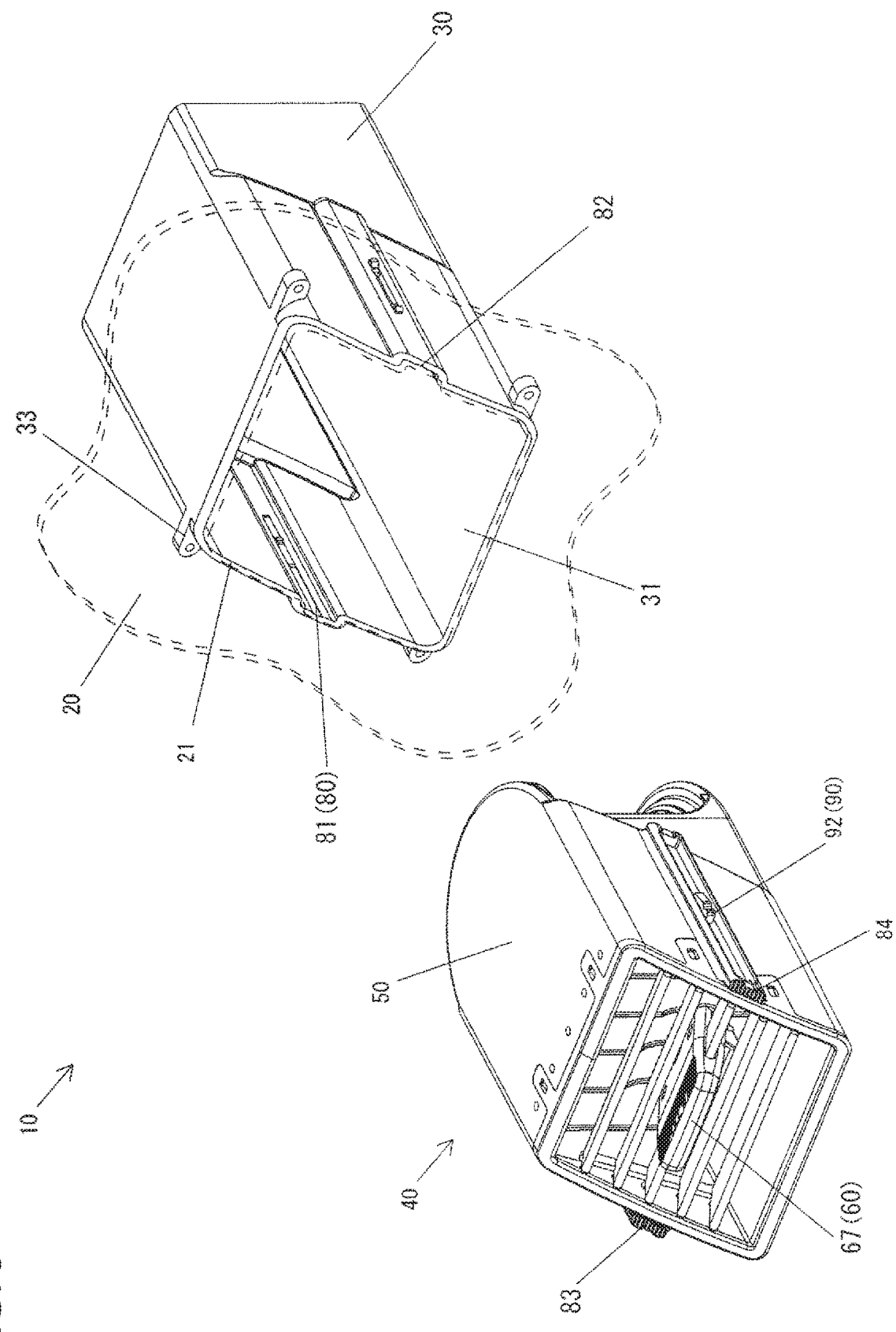
FIG. 3 is a perspective view of the air vent unit in a state wherein the vent portion of the unit main member is removed.
Figure 5:
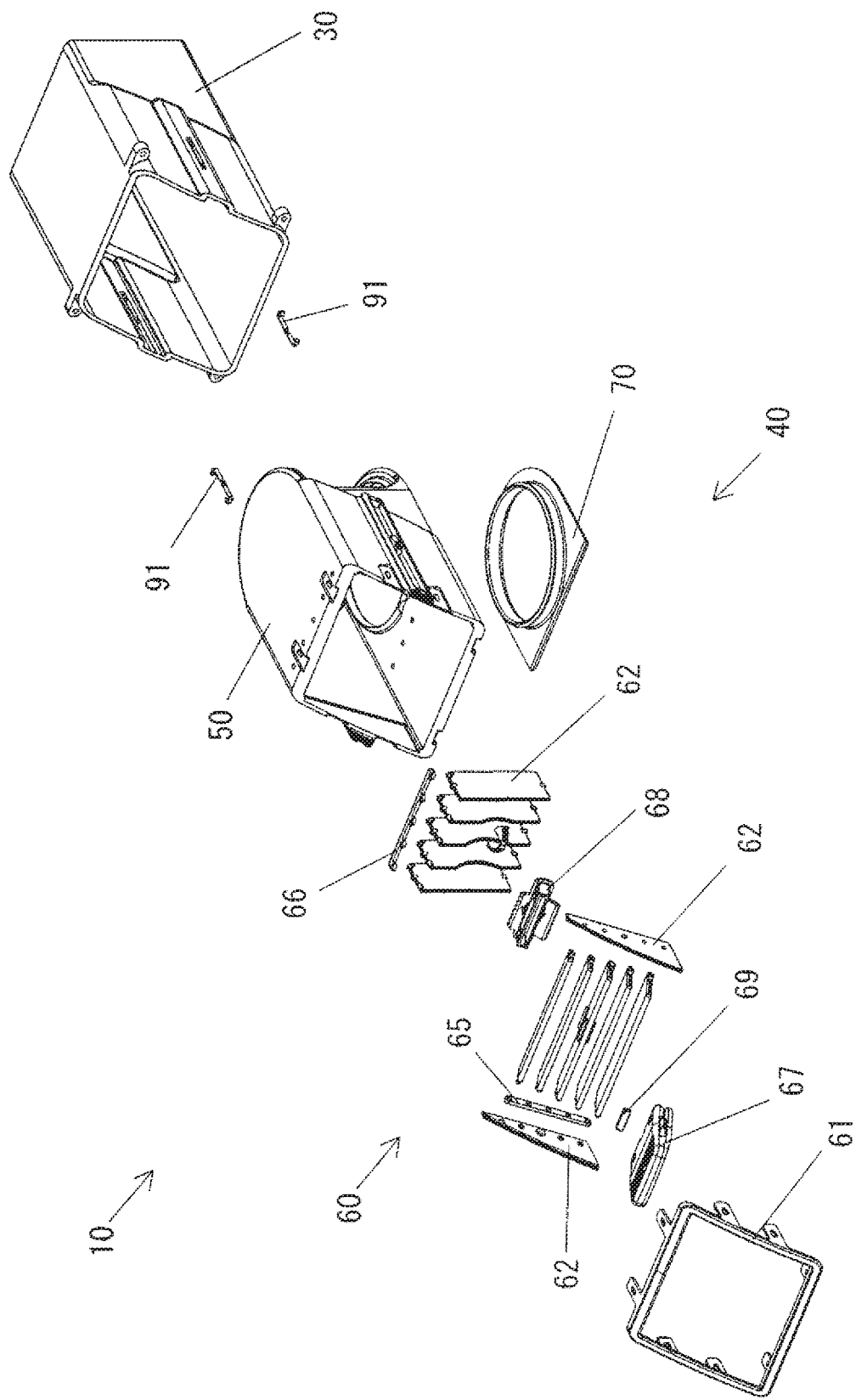
FIG. 5 is an exploded perspective view of the air vent unit.
Figure 6:
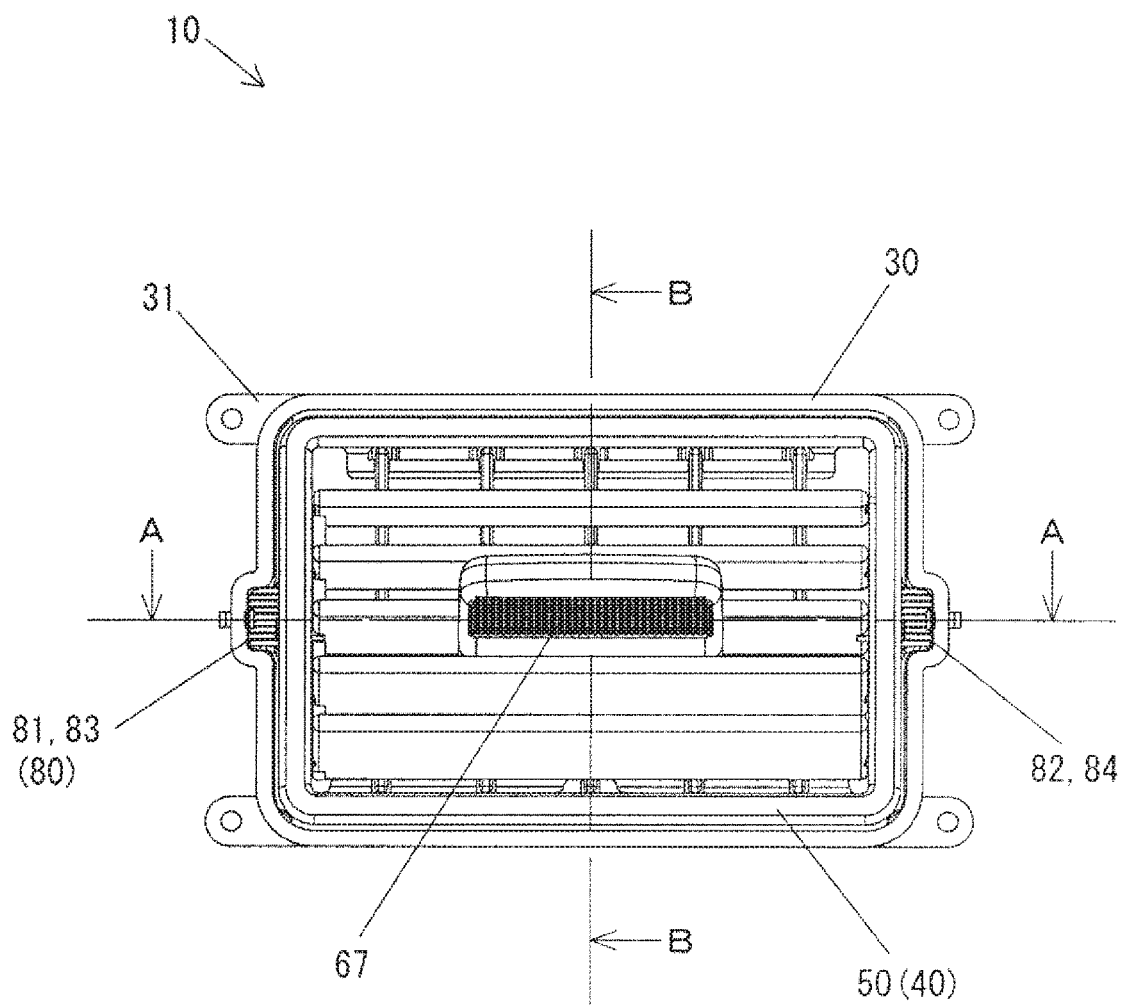
FIG. 6 is a front view of FIG. 3.
Figure 8:
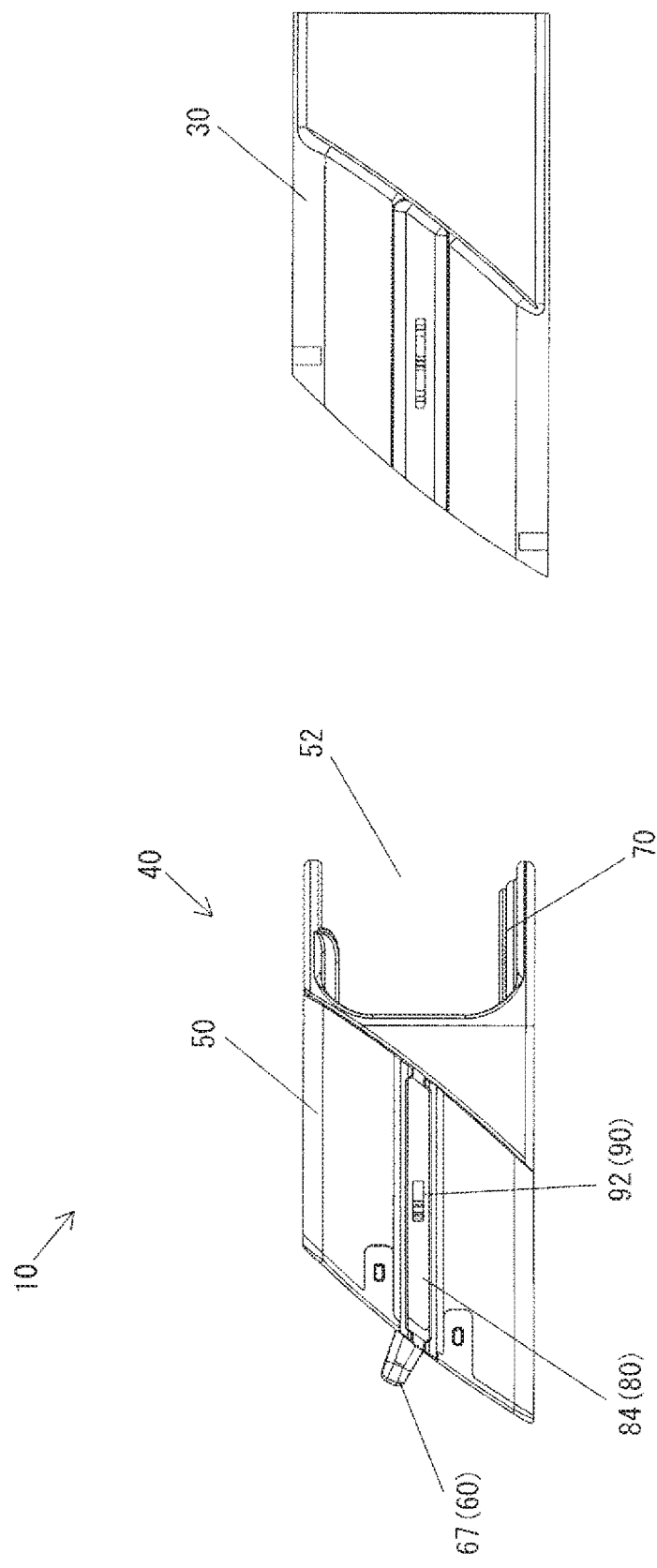
FIG. 8 is a side view corresponding to FIG. 6.
Figure 10:
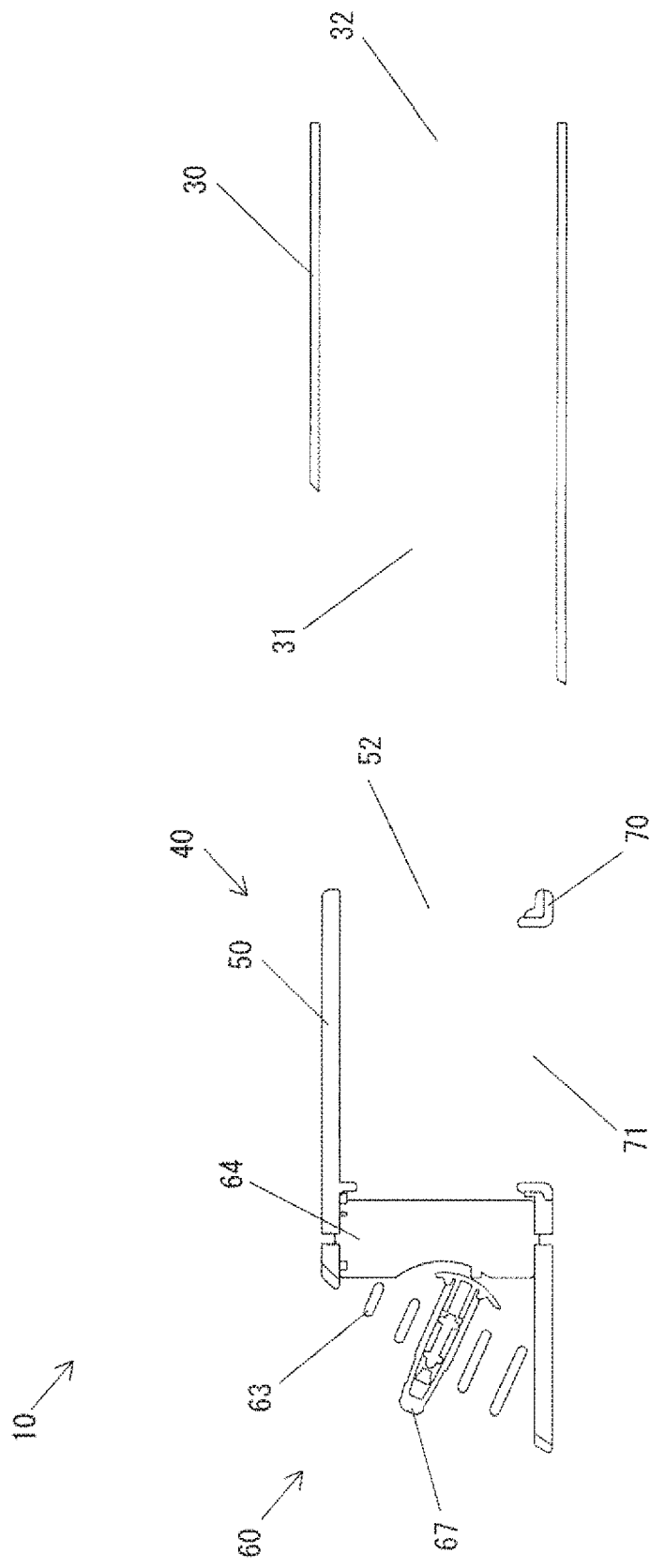
FIG. 10 is a cross-sectional view taken along line B-B in FIG. 6.

As shown in FIG. 3 and FIG. 5, the air vent unit 10 generally comprises the following parts.

Incidentally, the following (1) to (5) will be described later.

(1) Case 30
(2) Unit main member 40
(3) Erroneous-assembly prevention device 80
(4) Pushing prevention device
(5) Lock device 90

Incidentally, the parts of the air vent unit 10 are not limited to the aforementioned (1) to (5), and for example, the erroneous-assembly prevention device 80 or the lock device 90 may be omitted.

(Case 30)

As shown in FIG. 1 and FIG. 3, the case 30 is hollow to store the outlet 21 therein, and communicates with the outlet 21.

As shown in FIG. 11 to FIG. 17, the case 30 is formed in a rectangular cylindrical shape in which front and back faces are open, and an outer shape thereof corresponds to an inner shape of the outlet 21.

Also, four sides of the case 30 are surrounded by a left-and-right pair formed of a left side wall 100 and a right side wall 101, and an upper-and-lower pair formed of an upper wall 102 and a lower wall 103.

The case 30 is integrally formed of, for example, thermoplastic synthetic resin having appropriate rigidity. Incidentally, although the synthetic resin is shown as an example of a material of the case 30, it is not limited to the above, and may be made of metal.

The case 30 generally includes the following respective portions.

(1) Front Face Opening 31

Figure 11:
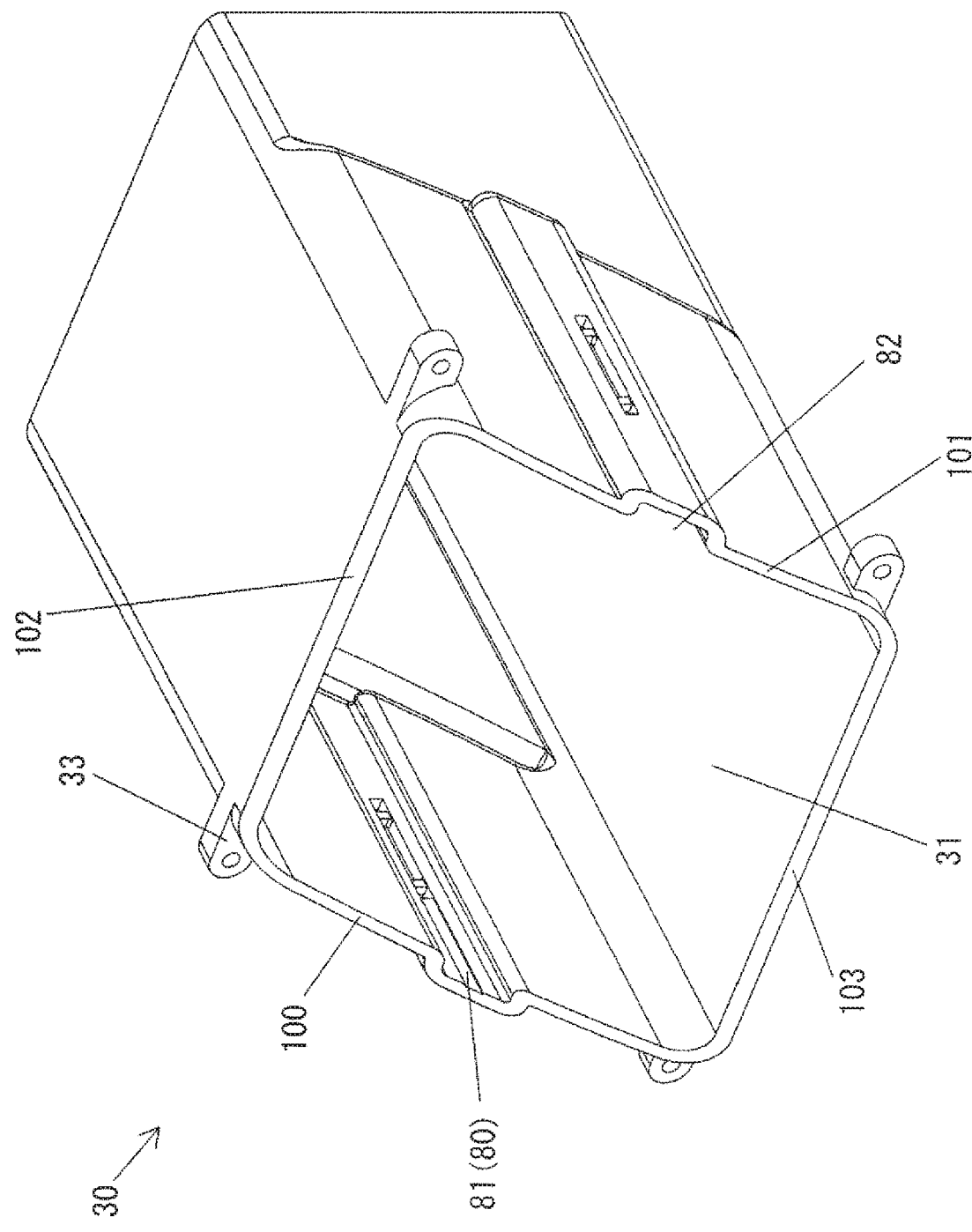
FIG. 11 is a perspective view of a case.
Figure 12:
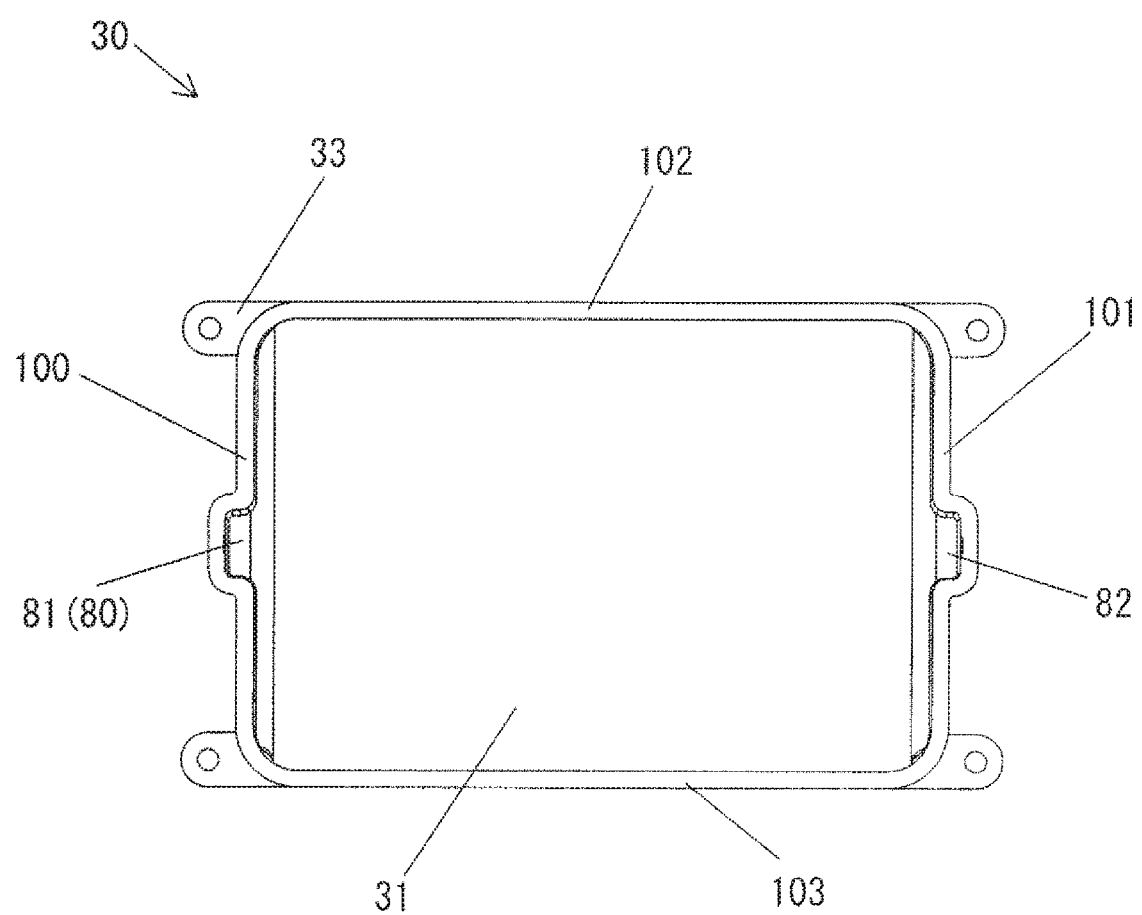
FIG. 12 is a front view corresponding to FIG. 11.
Figure 13:
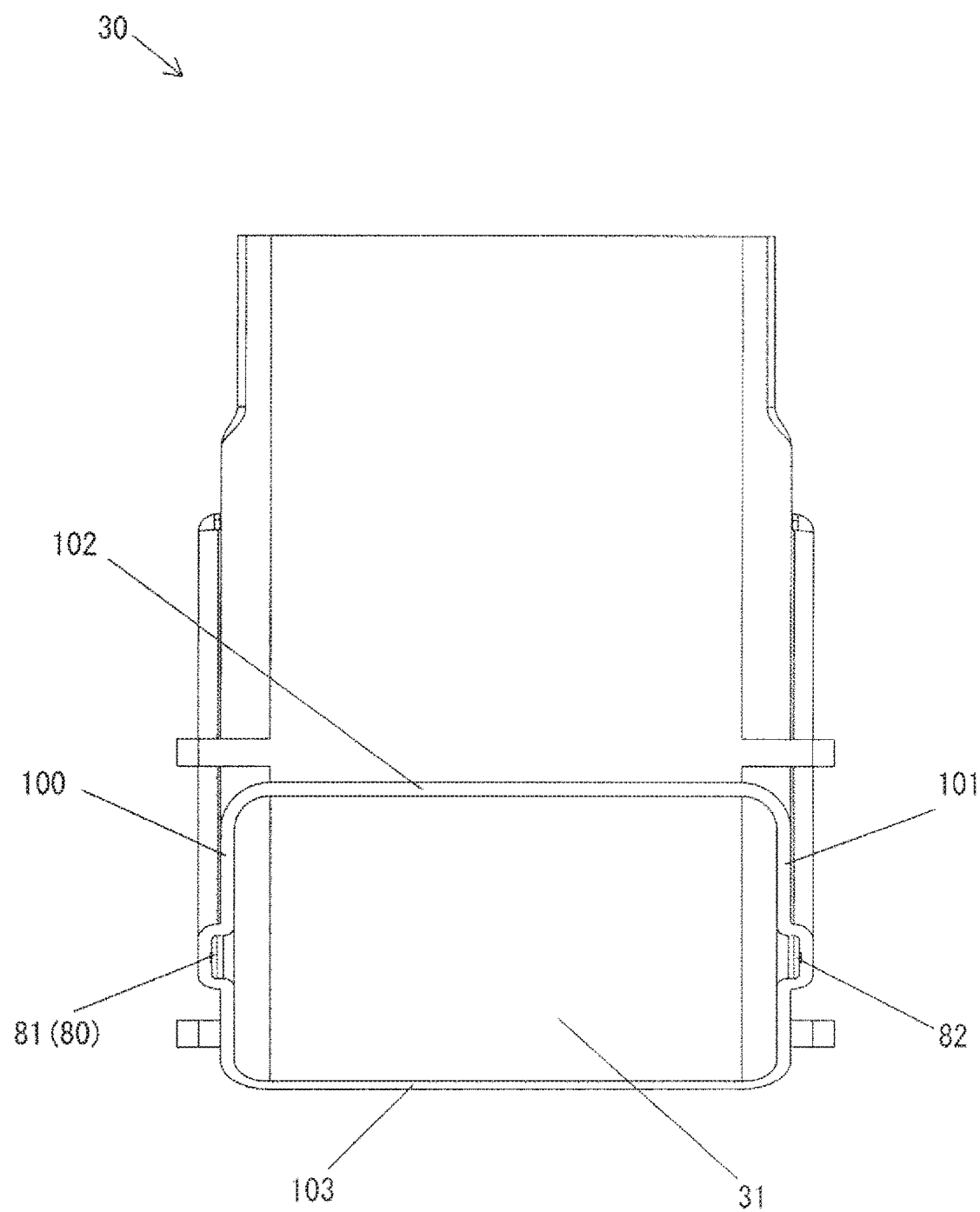
FIG. 13 is a plan view corresponding to FIG. 11.

As shown in FIG. 11 to FIG. 13, a front face opening 31 is positioned on a front face side of the case 30, and in a state wherein the case 30 is attached to the outlet 21, the front face opening 31 opens toward an interior side.

Figure 14:
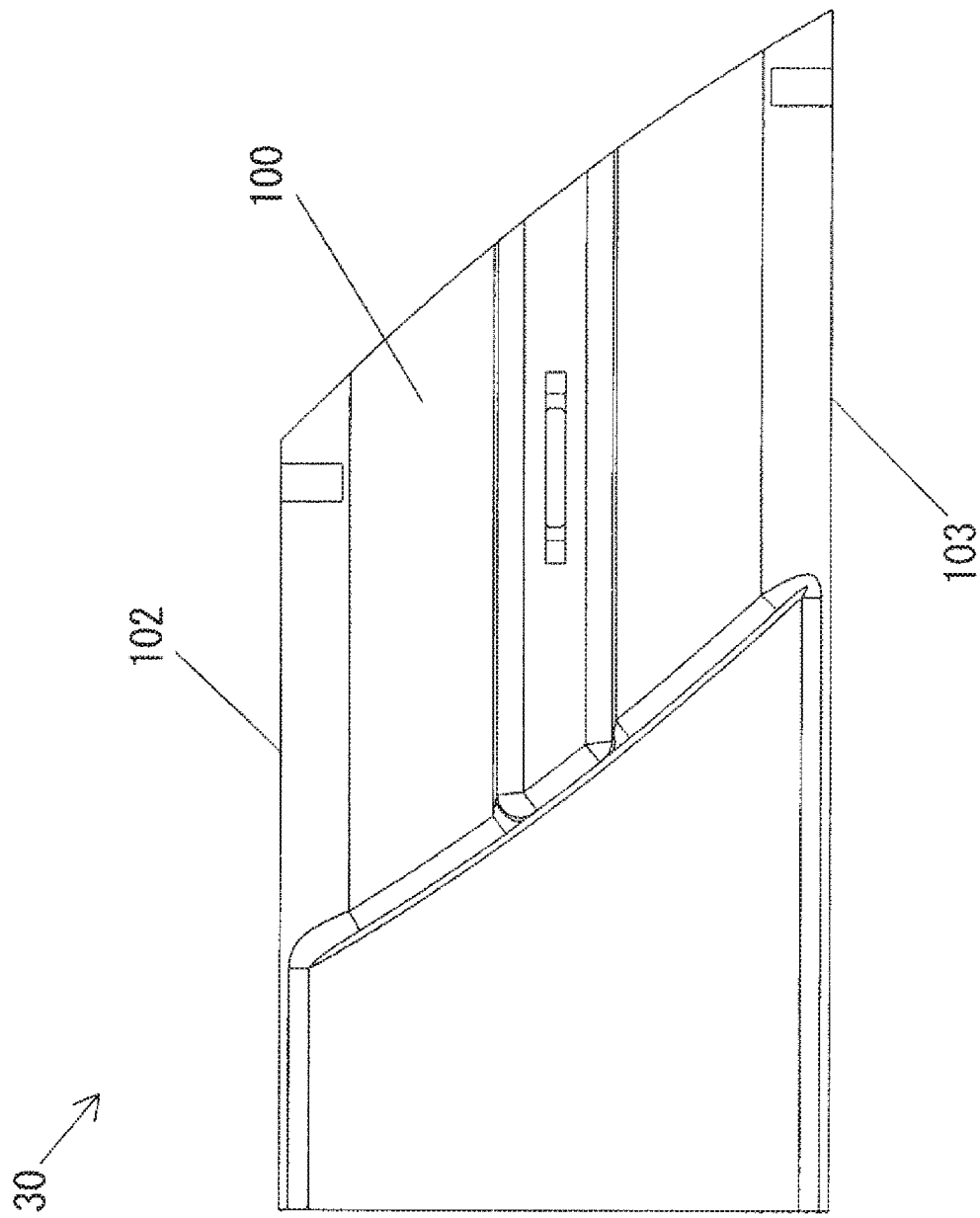
FIG. 14 is a left side view corresponding to FIG. 11.
Figure 15:
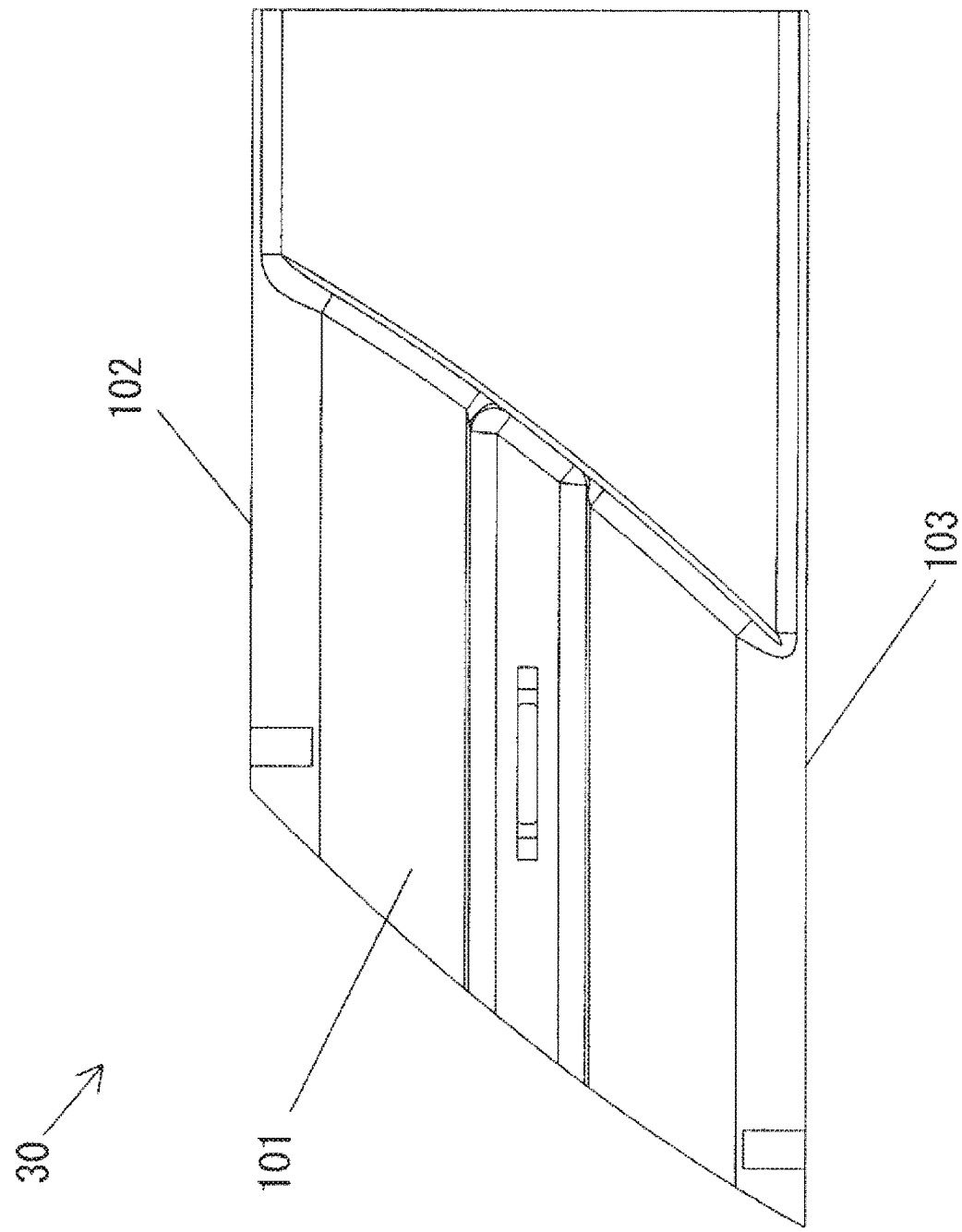
FIG. 15 is a right side view corresponding to FIG. 11.
Figure 16:
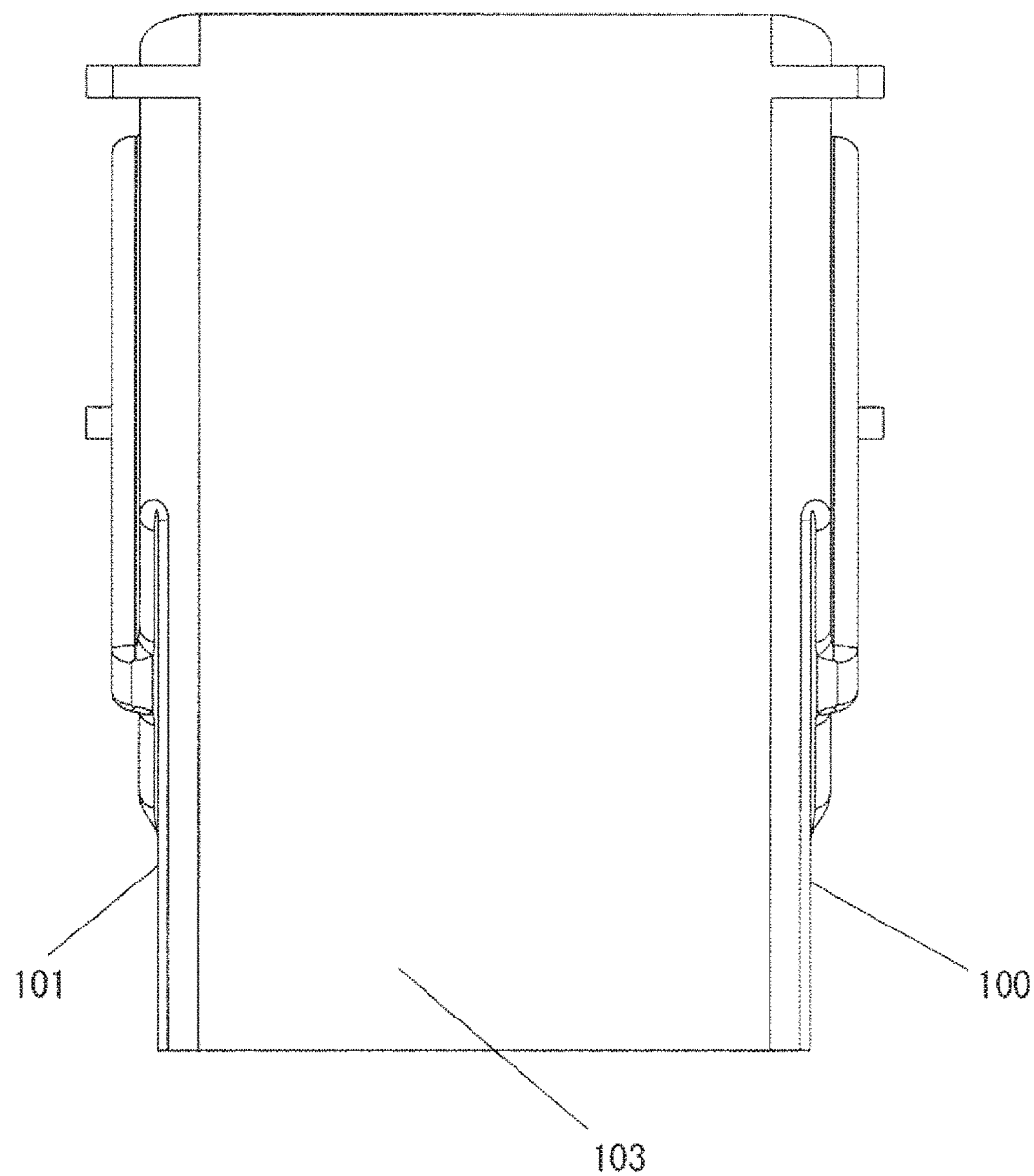
FIG. 16 is a bottom view corresponding to FIG. 11.

As shown in FIG. 14 and FIG. 15, an end face of the front face opening 31 obliquely inclines along a surface of a panel 20.

(2) Back Face Opening 32

Figure 17:
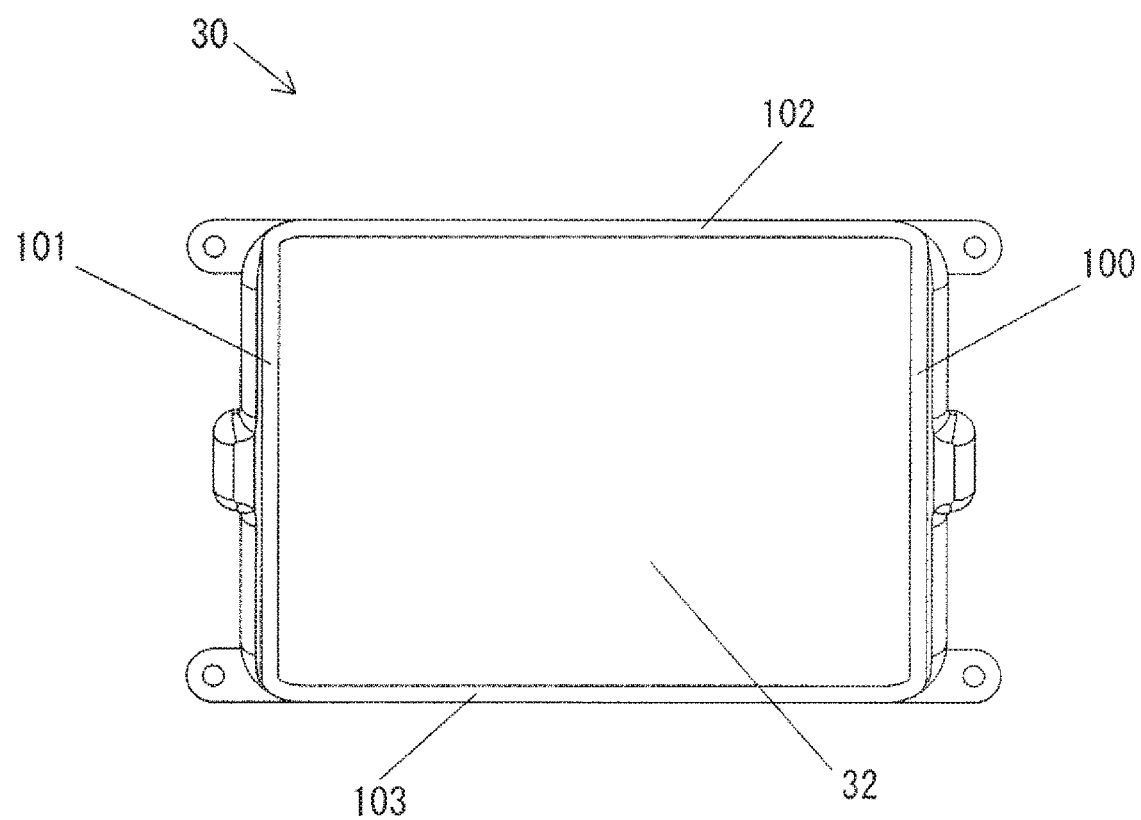
FIG. 17 is a rear view corresponding to FIG. 11.

As shown in FIG. 17, a back face opening 32 is positioned on a back face side of the case 30, and opens toward an inside of the panel 20. As shown in FIG. 14 and FIG. 15, an end face of the back face opening 32 is formed approximately vertically in the same drawings.

(3) Attachment Portions 33

As shown in FIG. 11 and FIG. 12, attachment portions 33 project in four directions from the end face of the front face opening 31, and although it is not shown in the drawings, the attachment portions 33 are screwed and fixed to the panel 20.

(Unit Main Member 40)

Figure 2:
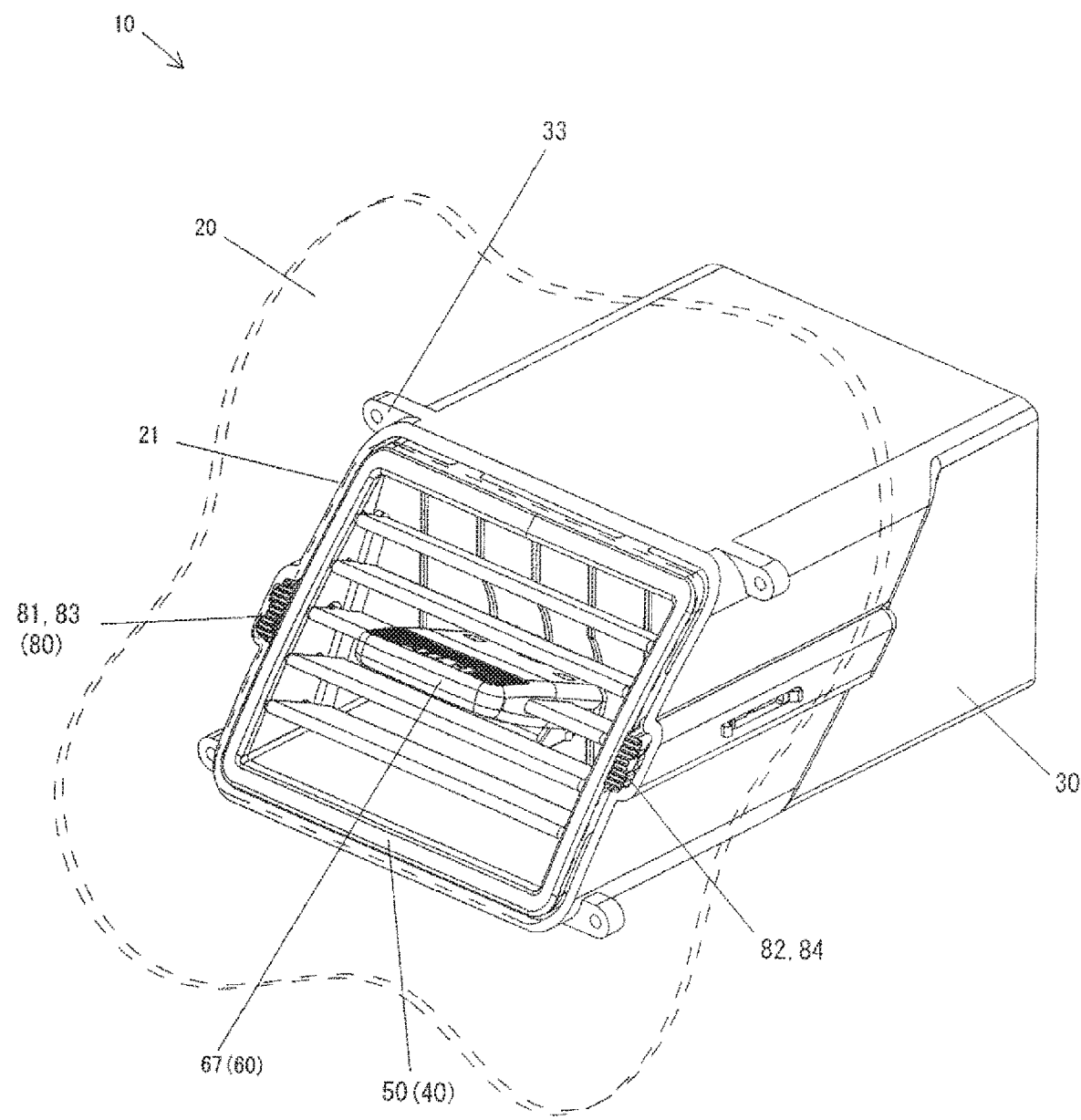
FIG. 2 is a perspective view of the air vent unit in a state wherein a vent portion of the unit main member is attached.
Figure 4:
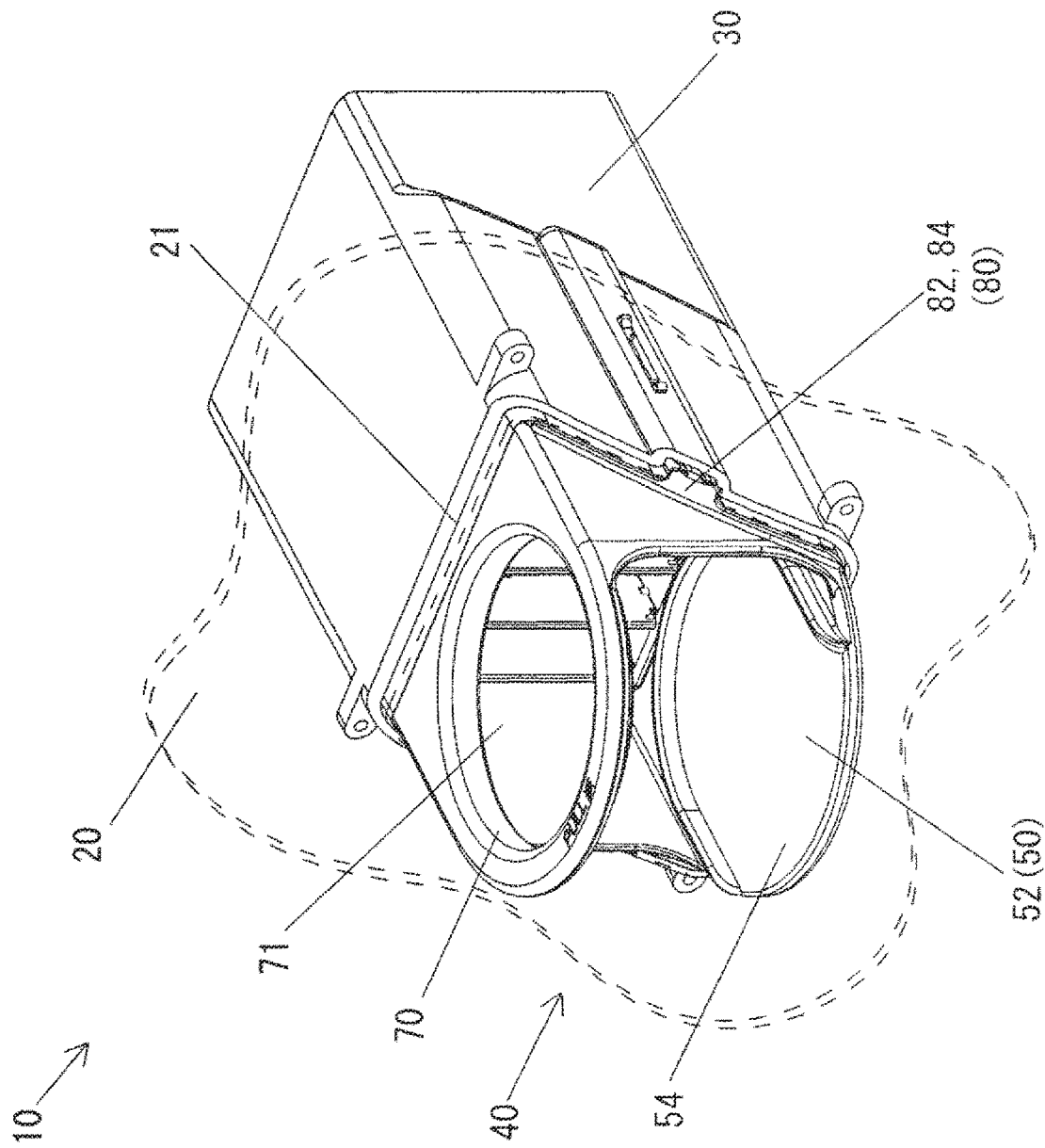
FIG. 4 is a perspective view of the air vent unit in a state wherein the container holding portion of the unit main member is attached.

As shown in FIG. 2 and FIG. 4, the unit main member 40 can be attached and detached relative to the case 30.

As shown in FIG. 1 and FIG. 3, the unit main member 40 generally comprises the following respective portions.

Incidentally, the following (1) to (3) will be described later.

(1) Housing 50
(2) Vent portion 60
(3) Container holding portion 70

Incidentally, the respective portions of the unit main member 40 are not limited to the aforementioned (1) to (3).

(Housing 50)

As shown in FIG. 1 to FIG. 4, the housing 50 can be stored inside the case 30, and can be removed from the case 30. Also, the housing 50 is hollow, and communicates with the outlet 21.

As shown in FIG. 18 to FIG. 24, the housing 50 is formed in a rectangular cylindrical shape in which front and back faces are open, and an outer shape thereof is set to have an inner shape of case 30 or less.

Also, four sides of the housing 50 are surrounded by a left-and-right pair of a first side wall 110 and a second side wall 111, and an upper-and-lower pair of an upper wall 112 and a lower wall 113.

The housing 50 is integrally formed of, for example, the thermoplastic synthetic resin having the appropriate rigidity. Incidentally, although the synthetic resin is shown as an example of the material of the housing 50, it is not limited to the above, and may be made of the metal.

The housing 50 generally includes the following respective portions.

(1) First Opening 51

Figure 18:
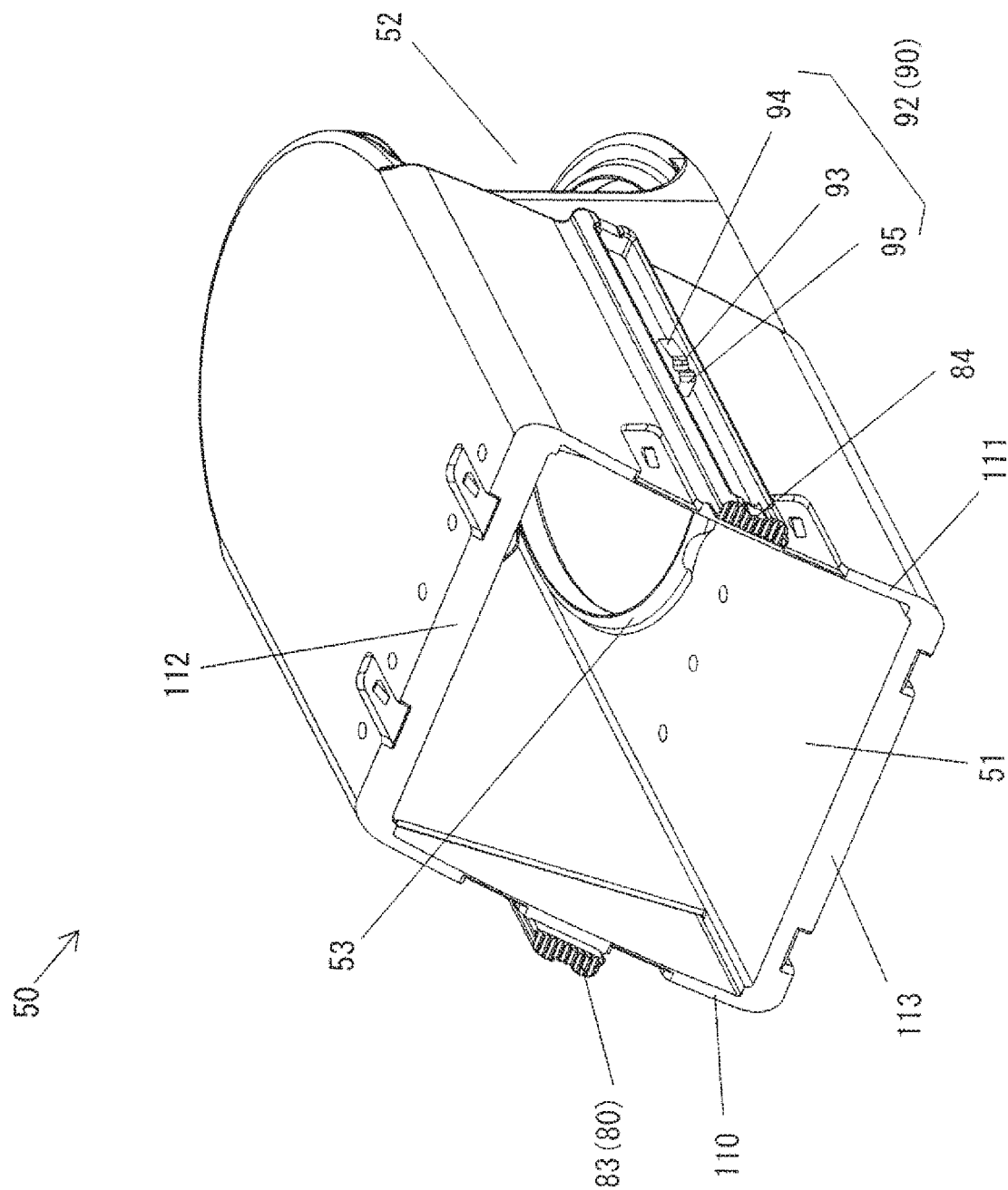
FIG. 18 is a perspective view of a housing.
Figure 19:
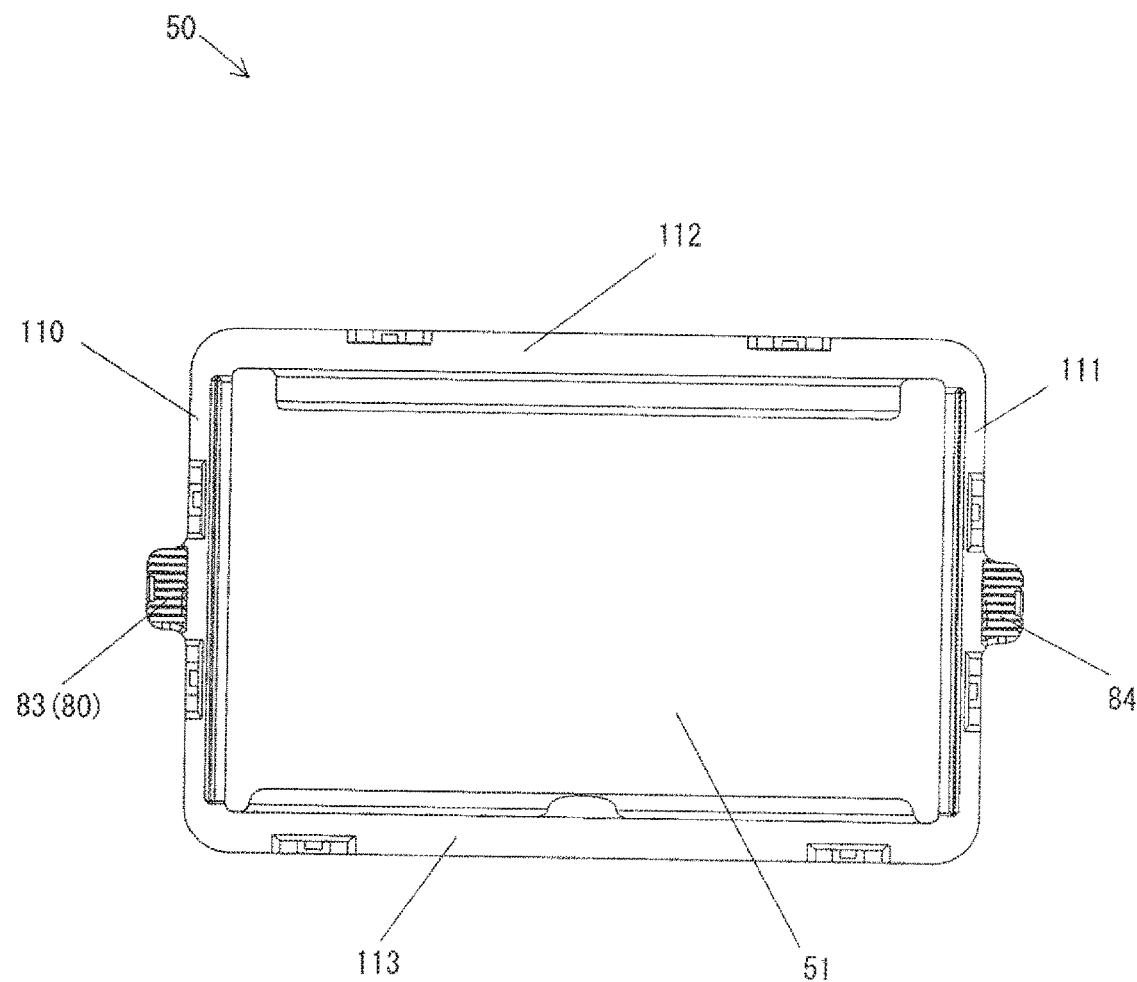
FIG. 19 is a front view corresponding to FIG. 18.
Figure 20:
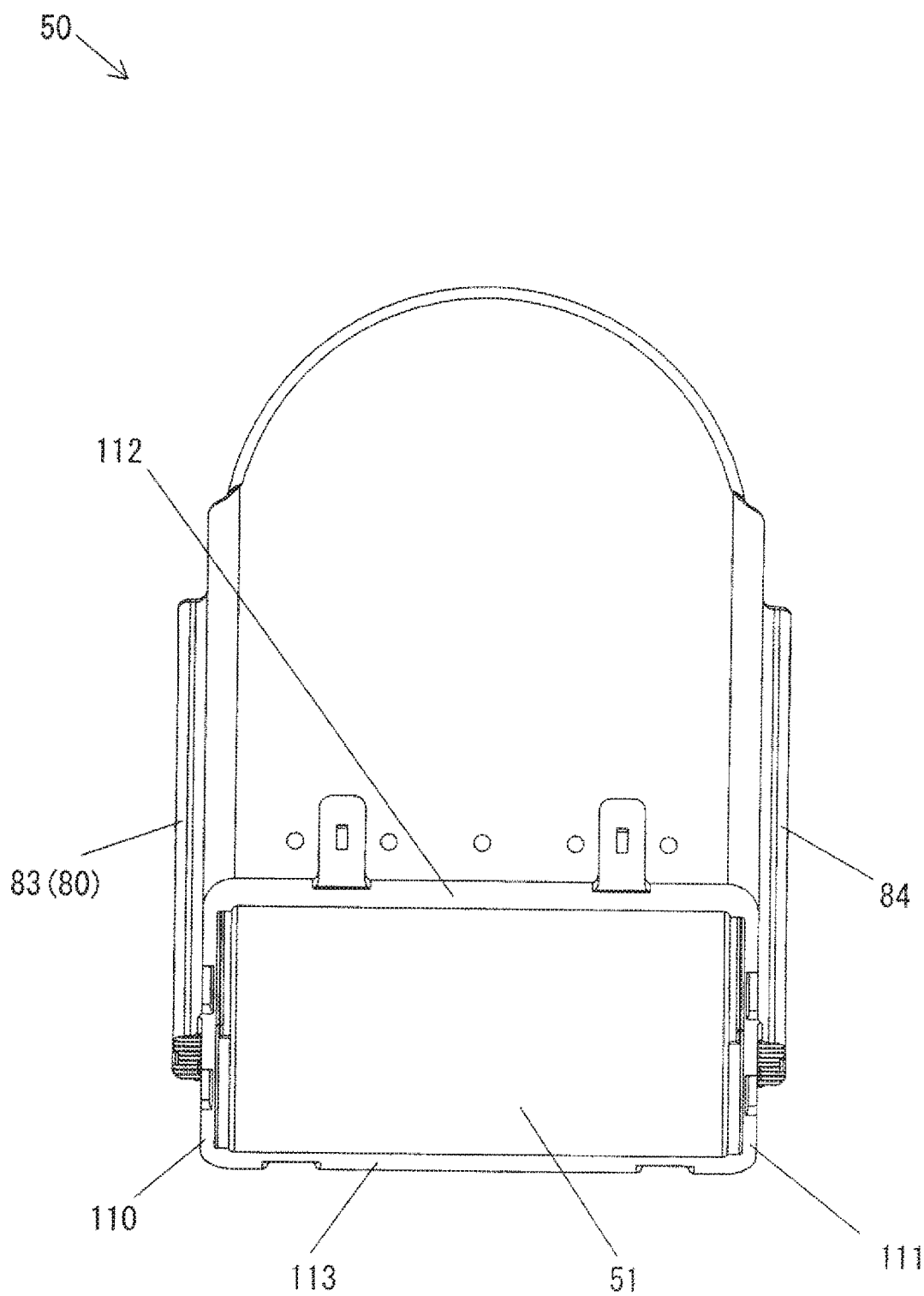
FIG. 20 is a plan view corresponding to FIG. 18.

As shown in FIG. 18 to FIG. 20, a first opening 51 is positioned on one side of front and back faces of the housing 50, and as shown in FIG. 5, the later-described vent portion 60 is disposed inside the first opening 51.

Figure 21:
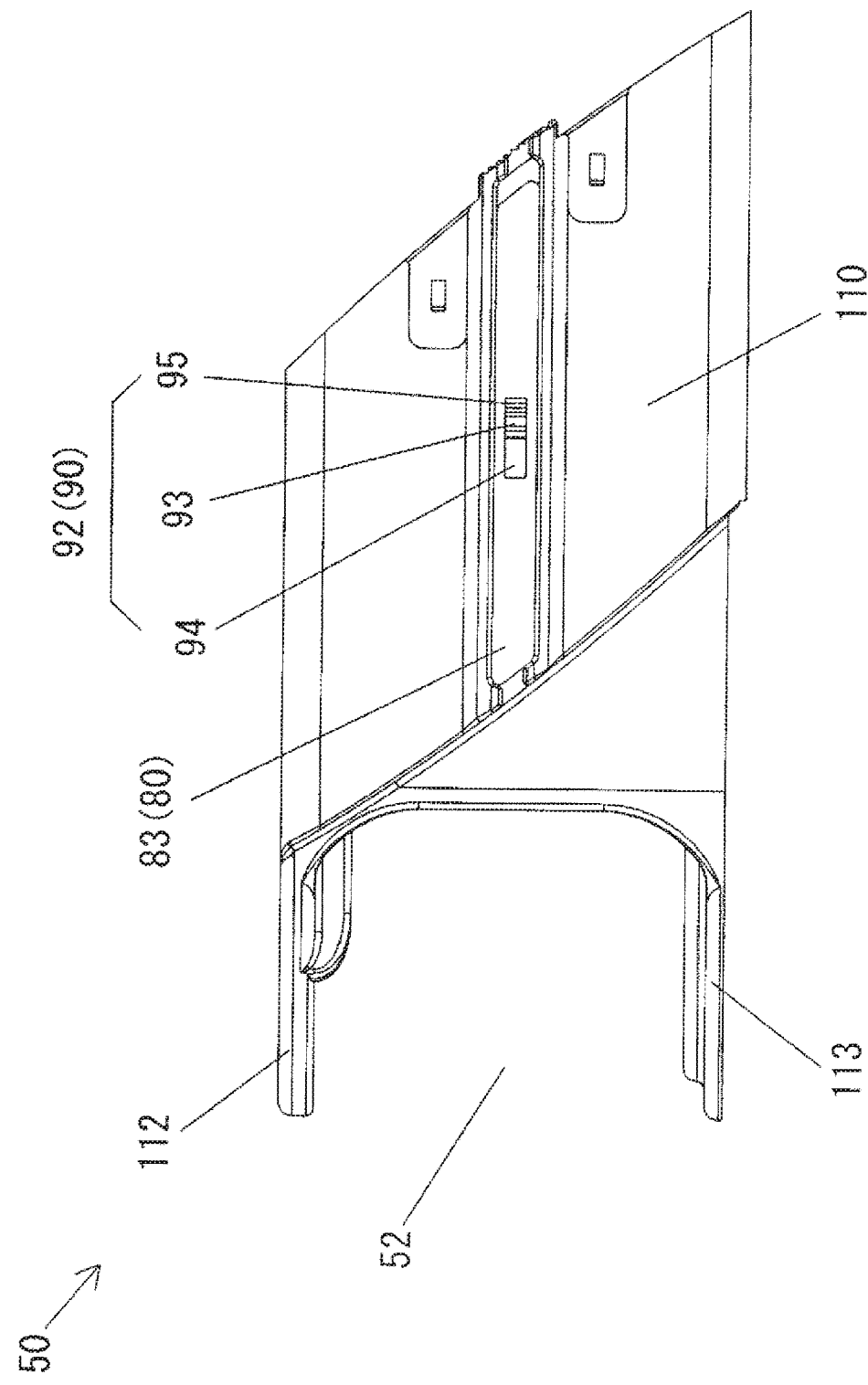
FIG. 21 is a left side view corresponding to FIG. 18.
Figure 22:
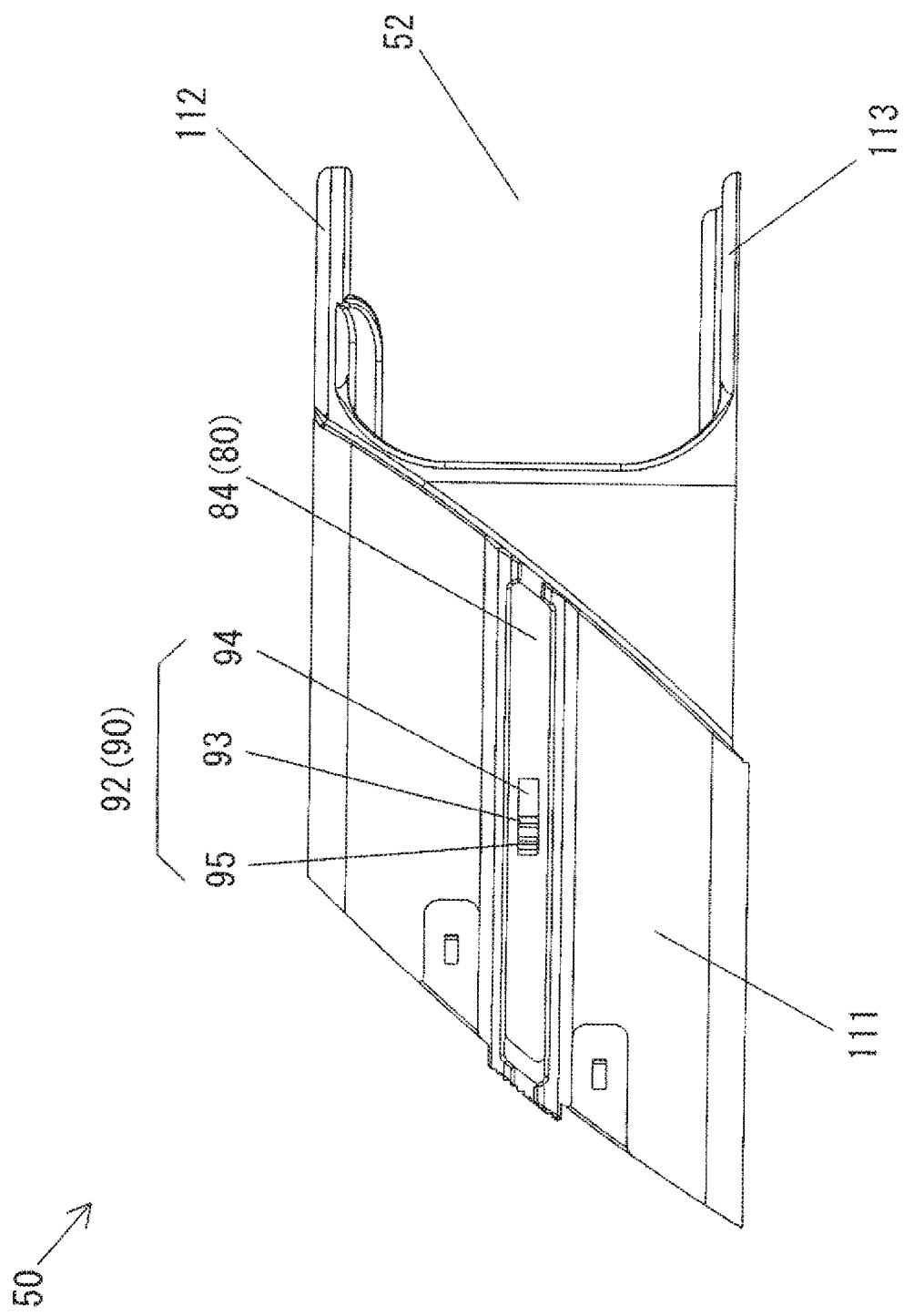
FIG. 22 is a right side view corresponding to FIG. 18.

As shown in FIG. 21 and FIG. 22, an end face of the first opening 51 obliquely inclines in a same manner as the end face of the front face opening 31.

(2) Second Opening 52

Figure 24:
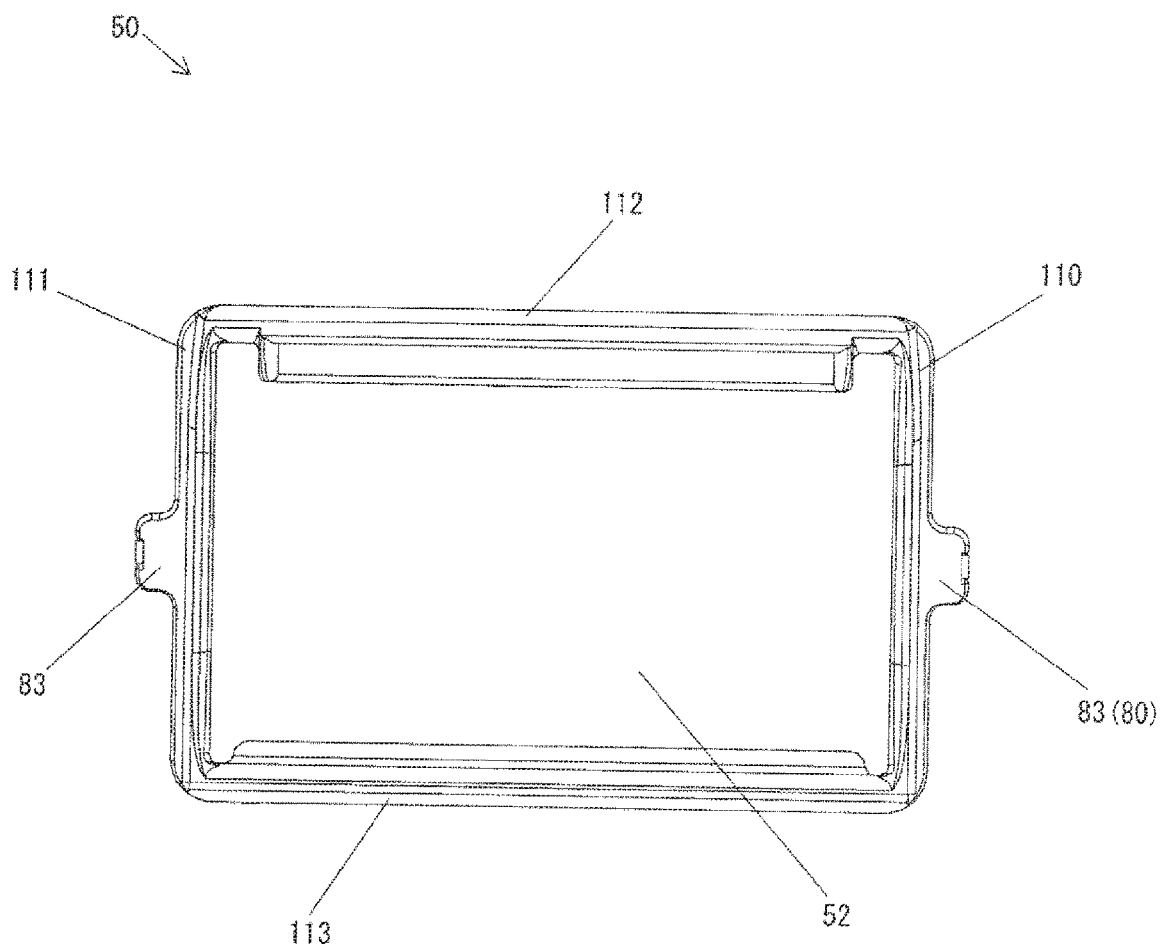
FIG. 24 is a rear view corresponding to FIG. 18.

As shown in FIG. 24, a second opening 52 is positioned on another side of the front and back faces of the housing 50, and as shown in FIG. 5, the later-described container holding portion 70 is disposed inside the second opening 52.

(3) Ring Attachment Portion 53

Figure 23:
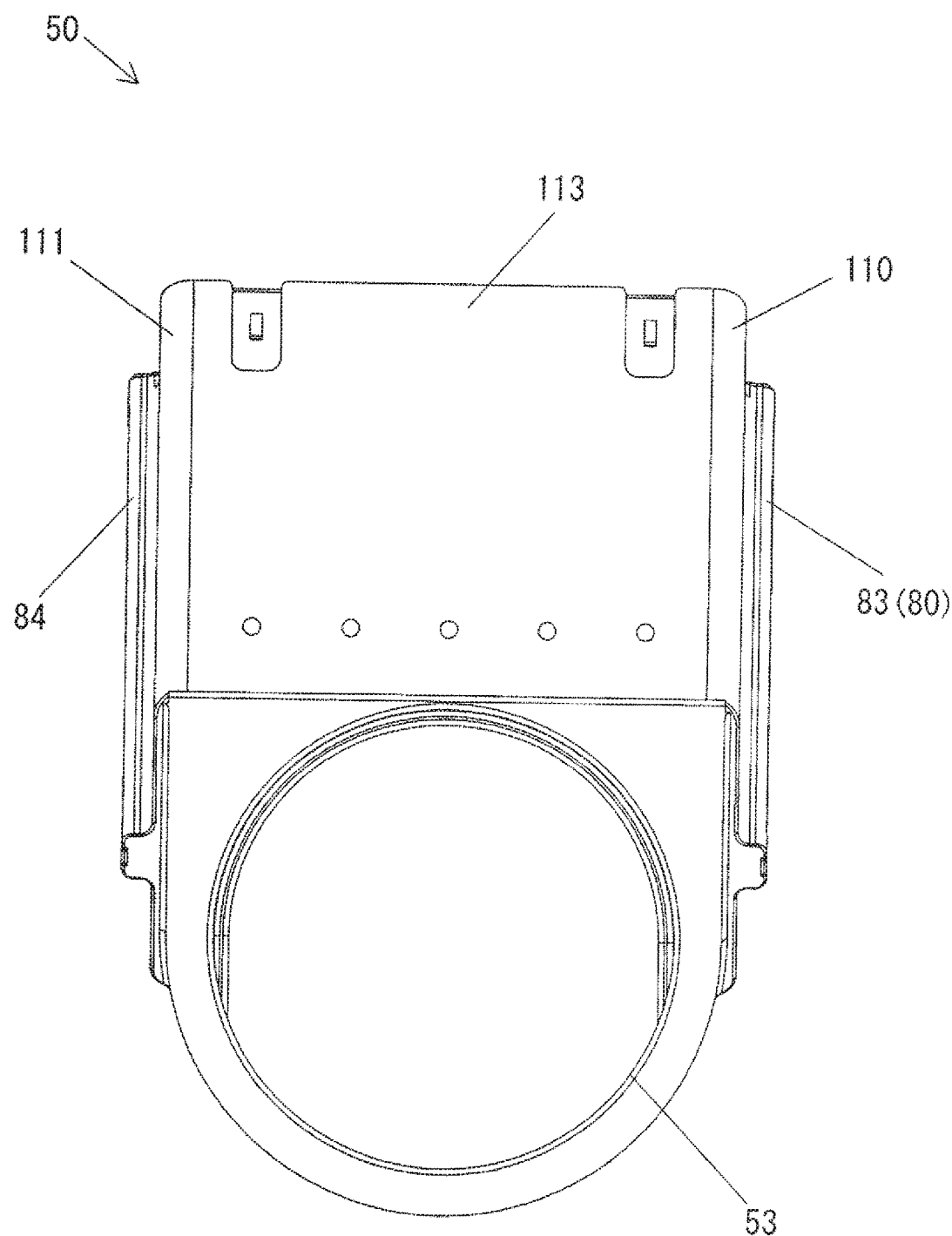
FIG. 23 is a bottom view corresponding to FIG. 18.

As shown in FIG. 18 and FIG. 23, a ring attachment portion is positioned inside the second opening 52, is formed in a circular hole shape, and passes through the lower wall 113 up and down. As shown in FIG. 5, the later-described ring-shaped container holding portion 70 is attached to the ring attachment portion 53.

(4) Container Support Portion 54

As shown in FIG. 1 and FIG. 4, a container support portion 54 supports a bottom of a container (not shown in the drawings) inserted through the later-described container holding portion 70 attached to the ring attachment portion 53. In the present embodiment, the container support portion 54 corresponds to a facing surface of the upper wall 112 facing the ring attachment portion 53 formed in the lower wall 113.

Incidentally, although the upper wall 112 is shown as an example of the container support portion 54, it is not limited to the above, and a portion having a concave shape into which the bottom of the container (not shown in the drawings) fits may be formed inside the housing 50.

(Vent Portion 60)

As shown in FIG. 2, the vent portion 60 communicates with the outlet 21 of the air conditioning device (not shown in the drawings). As shown in FIG. 5, the vent portion 60 is positioned inside the second opening 52 of the housing 50.

Figure 25:
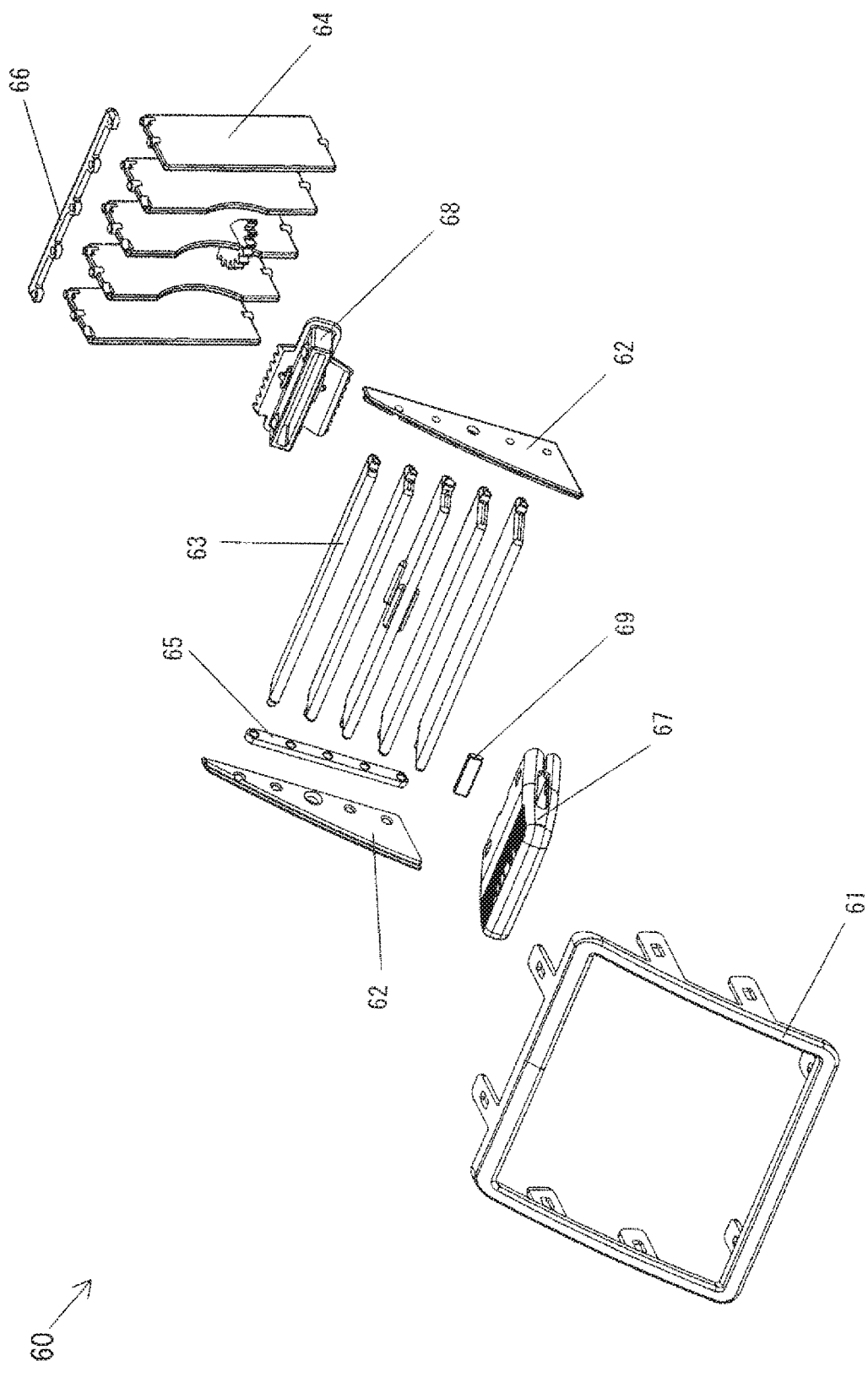
FIG. 25 is a partially enlarged view of FIG. 5.
Figure 26:
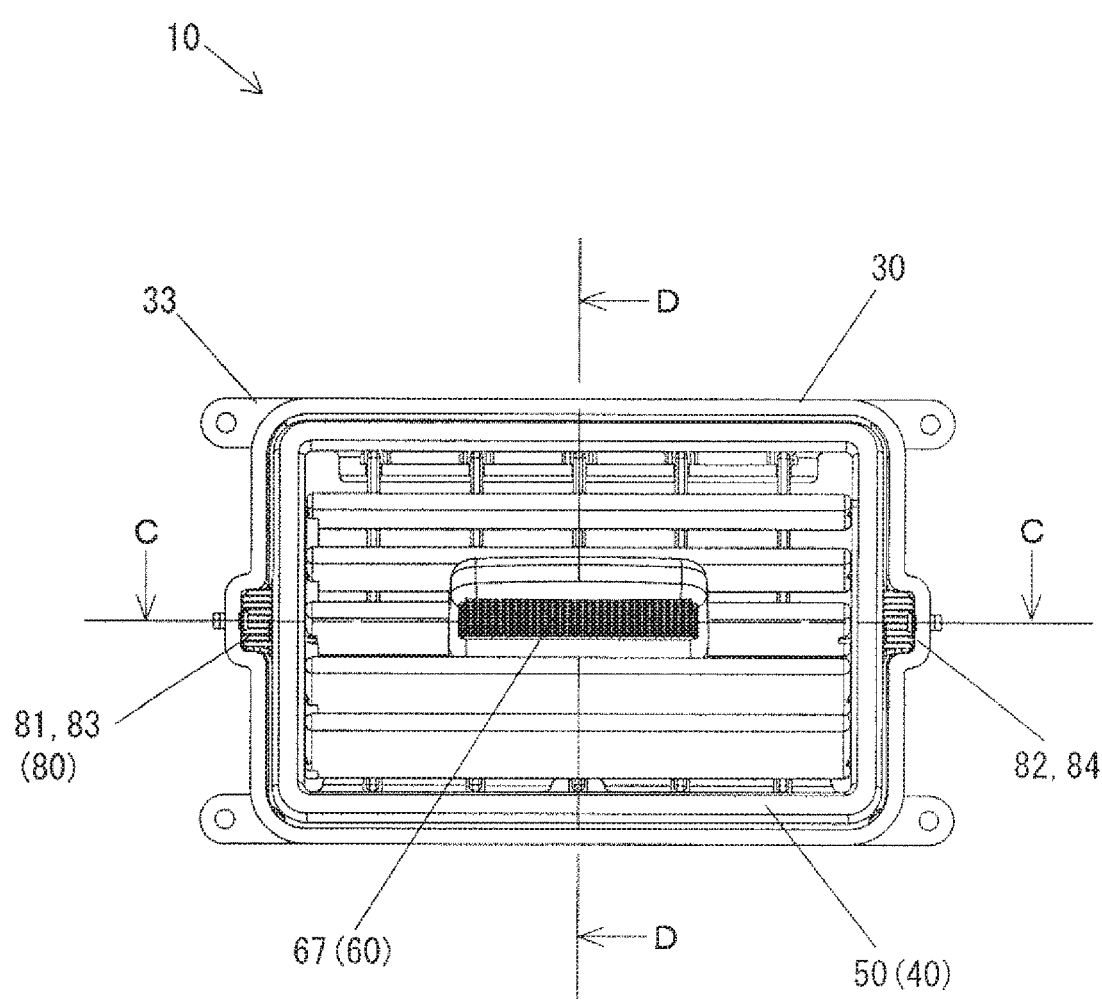
FIG. 26 is a front view of FIG. 2.
Figure 27:
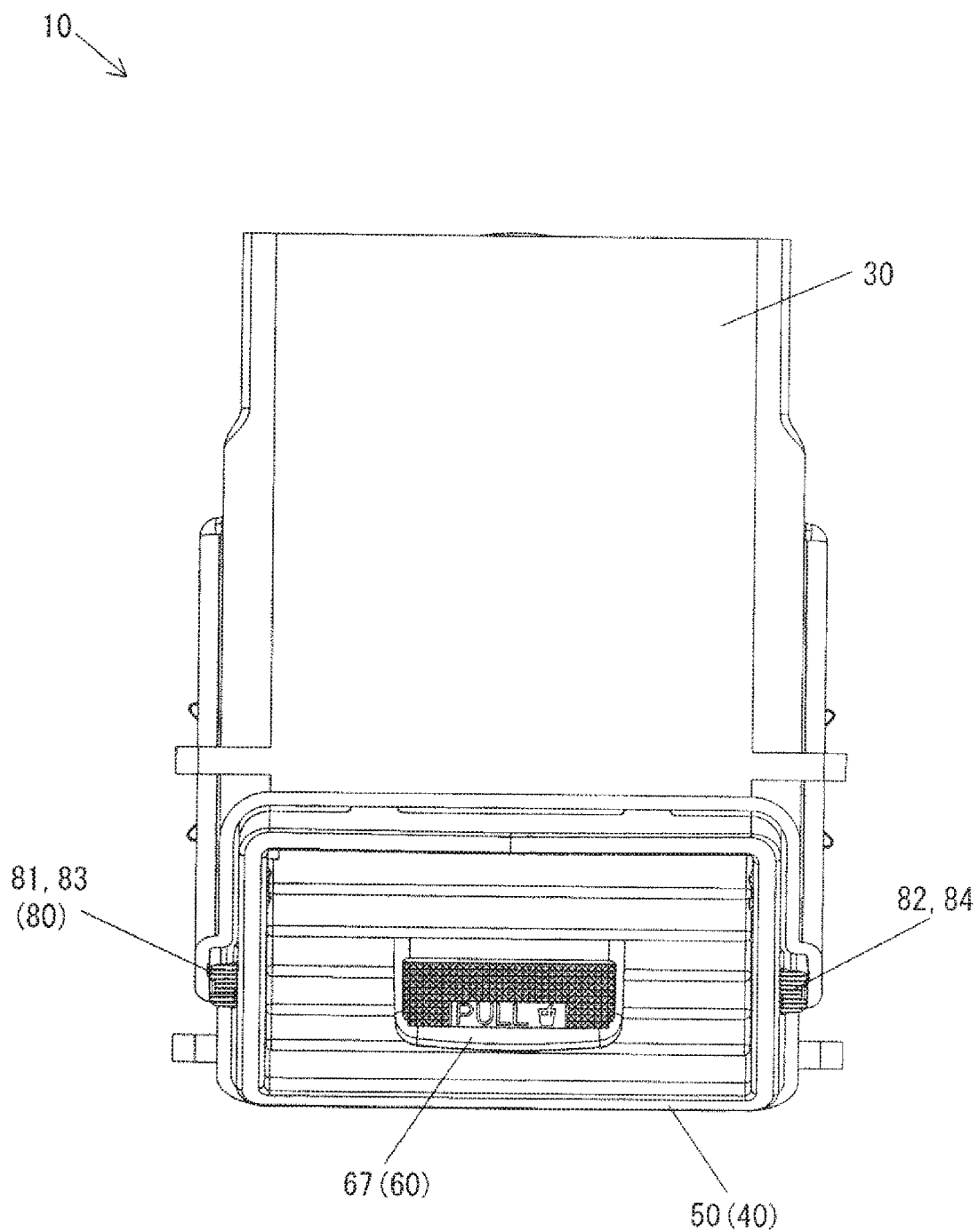
FIG. 27 is a plan view corresponding to FIG. 26.
Figure 28:
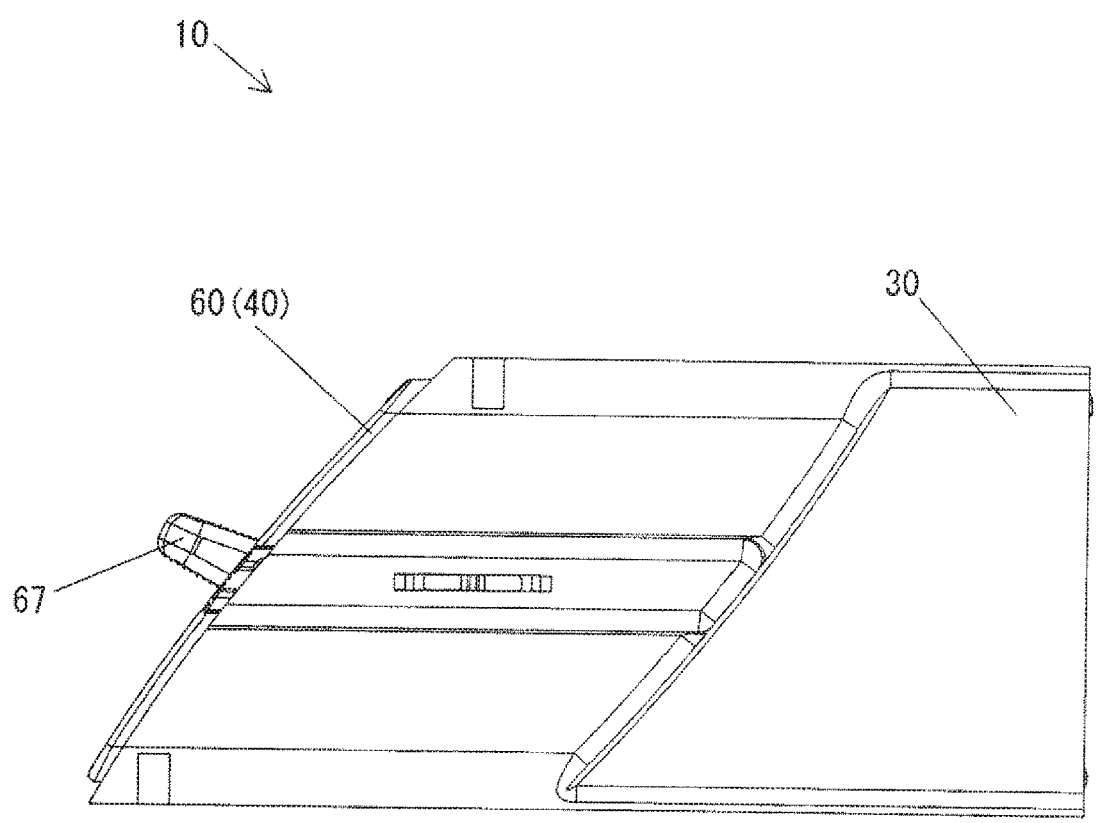
FIG. 28 is a side view corresponding to FIG. 26.

As shown in FIG. 25, the vent portion 60 generally includes the following parts.

The following (1) to (9) are integrally formed of, for example, the thermoplastic synthetic resin having the appropriate rigidity and elasticity. Incidentally, although the synthetic resin is shown as an example of the material of the parts, it is not limited to the above, and may be made of the metal.

Incidentally, the following (1) to (9) will be described later.

(1) Bezel 61
(2) Holders 62
(3) Transverse fins 63
(4) Longitudinal fins 64
(5) First link 65
(6) Second link 66
(7) Knob 67
(8) Knob gear 68
(9) Rubber 69

Incidentally, although the aforementioned (1) to (9) are shown as examples of the parts of the vent portion 60, they are not limited to the above, and, for example, only the transverse fins 63 may be provided, or only the longitudinal fins 64 may be provided.

(Container Holding Portion 70)

Figure 35:
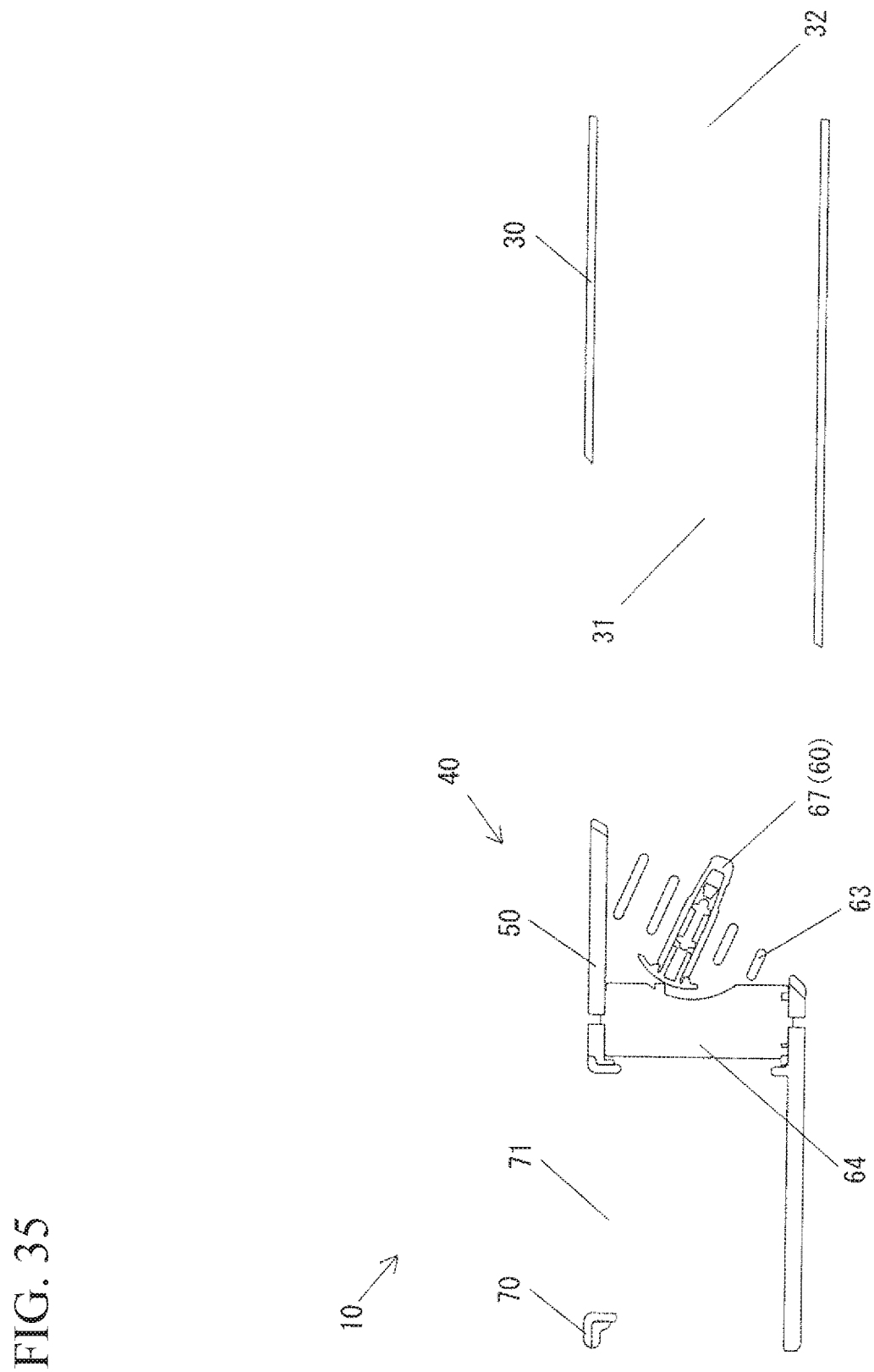
FIG. 35 is a cross-sectional view taken along line F-F in FIG. 31.

As shown in FIG. 35, the container holding portion 70 communicates with the vent portion 60, and can hold the container (not shown in the drawings) such as a beverage can, a plastic bottle, a bottle, a cup, and the like.

As shown in FIG. 5, the container holding portion 70 is formed in a ring shape, and is attached to the ring attachment portion 53 of the housing 50. The container holding portion 70 is integrally formed of, for example, the thermoplastic synthetic resin having the appropriate rigidity. Incidentally, although the synthetic resin is shown as an example of the material of the parts, it is not limited to the above, and may be made of the metal.

As shown in FIG. 1, the container holding portion 70 includes the following respective portions.

(1) Container Insertion Hole 71

The container (not shown in the drawings) can be inserted into a container insertion hole 71, which is formed in a circular shape which passes through up and down.

(Erroneous-Assembly Prevention Device 80)

As shown in FIG. 1 to FIG. 4, the erroneous-assembly prevention device 80 prevents guide projections 83 and 84 from fitting into guide grooves 81 and 82 in a state wherein the container insertion hole 71 faces downward when the vent portion 60 is attached toward the outlet 21.

As the erroneous-assembly prevention device 80, the following respective portions are provided between an inner face of the case 30 and the housing 50 facing the inner face of the case 30.

Incidentally, the following (1) and (2) will be described later.

(1) Guide projections 83 and 84
(2) Guide grooves 81 and 82

Incidentally, as the erroneous-assembly prevention device 80, the guide grooves 81 and 82 are provided on a case 30 side, and the guide projections 83 and 84 fitting into the guide grooves 81 and 82 are provided on a housing 50 side, however, they are not limited to the above, and the guide projections may be provided on the case 30 side, and the guide grooves may be provided on the housing 50 side.

(Guide Projections 83 and 84)

As shown in FIG. 18 to FIG. 24, the guide projections 83 and 84 are provided respectively on the first side wall 110 and the second side wall 111 on the left and right of the housing 50. The guide projections 83 and 84 are located back to back on an outside face of the first side wall 110 and an outside face of the second side wall 111 on the left and right of the housing 50, project in a convex shape outwardly to left and right from the respective outside faces, and extend long in an insertion direction of the unit main member 40 relative to the case 30.

As shown in FIG. 18, at one end portion of the guide projections 83 and 84, i.e. on a first opening 51 side, there are formed concave-convex portions, and at another end portion on an opposite side, i.e. on a second opening 52 side, there are no concave-convex portions. The concave-convex portions on one side are for distinguishing front and back of the housing 50, and for preventing an erroneous insertion in an assembly process, or an operation of the air vent unit 10.

Also, the left-and-right guide projections 83 and 84 are provided at a same height, and have different thicknesses in a height direction from each other.

In the guide projections 83 and 84, one first guide projection 83 is positioned in the first side wall 110 on a left side in FIG. 19.

Another second guide projection 84 is positioned in the second side wall 111 on a right side in FIG. 19, and the thickness in the height direction is set to be thick compared to the first guide projection 83.

(Guide Grooves 81 and 82)

As shown in FIG. 2 and FIG. 4, the guide grooves 81 and 82 fit in the guide projections 83 and 84 with each other, and as shown in FIG. 9, extend along an attachment/detachment direction of the unit main member 40.

As shown in FIG. 11 to FIG. 13, the guide grooves 81 and 82 are provided respectively on the left side wall 100 and the right side wall 101 on the left and right of the case 30. The guide grooves 81 and 82 are positioned to face an inside face of the left side wall 100 and the right side wall 101 on the left and right, are formed in the concave shape, and extend long in the insertion direction of the unit main member 40 relative to the case 30. As shown in FIG. 9, the guide grooves 81 and 82 open at end faces positioned on the interior side, and terminal portions 81a and 82a positioned on a back side are closed.

Also, the left-and-right guide grooves 81 and 82 are provided in a height same as that of the guide projections 83 and 84, and a groove width in the height direction differs from each groove by fitting in the guide projections 83 and 84.

In the guide grooves 81 and 82, the left-side guide groove 81 is positioned in the left side wall 100 on the left side in FIG. 12.

In the guide grooves 81 and 82, the right-side guide groove 82 is positioned in the right side wall 101 on the right side in FIG. 12, and corresponds to the thick second guide projection 84, and the groove width in the height direction is set to be wide compared to the left-side guide groove 81.

(Relation Between the Guide Projections 83 and 84, and the Guide Grooves 81 and 82)

In the guide projections 83 and 84, and the guide grooves 81 and 82, as shown in FIG. 2, in a vent-portion attachment state, the thin first guide projection 83 positioned on the left side in FIG. 2 of the housing 50 (the unit main member 40) fits into the narrow left-side guide groove 81 on the case 30 side, and the thick second guide projection 84 positioned on the right side in FIG. 2 of the housing 50 (the unit main member 40) fits into the wide right-side guide groove 82 on the case 30 side.

Figure 36:
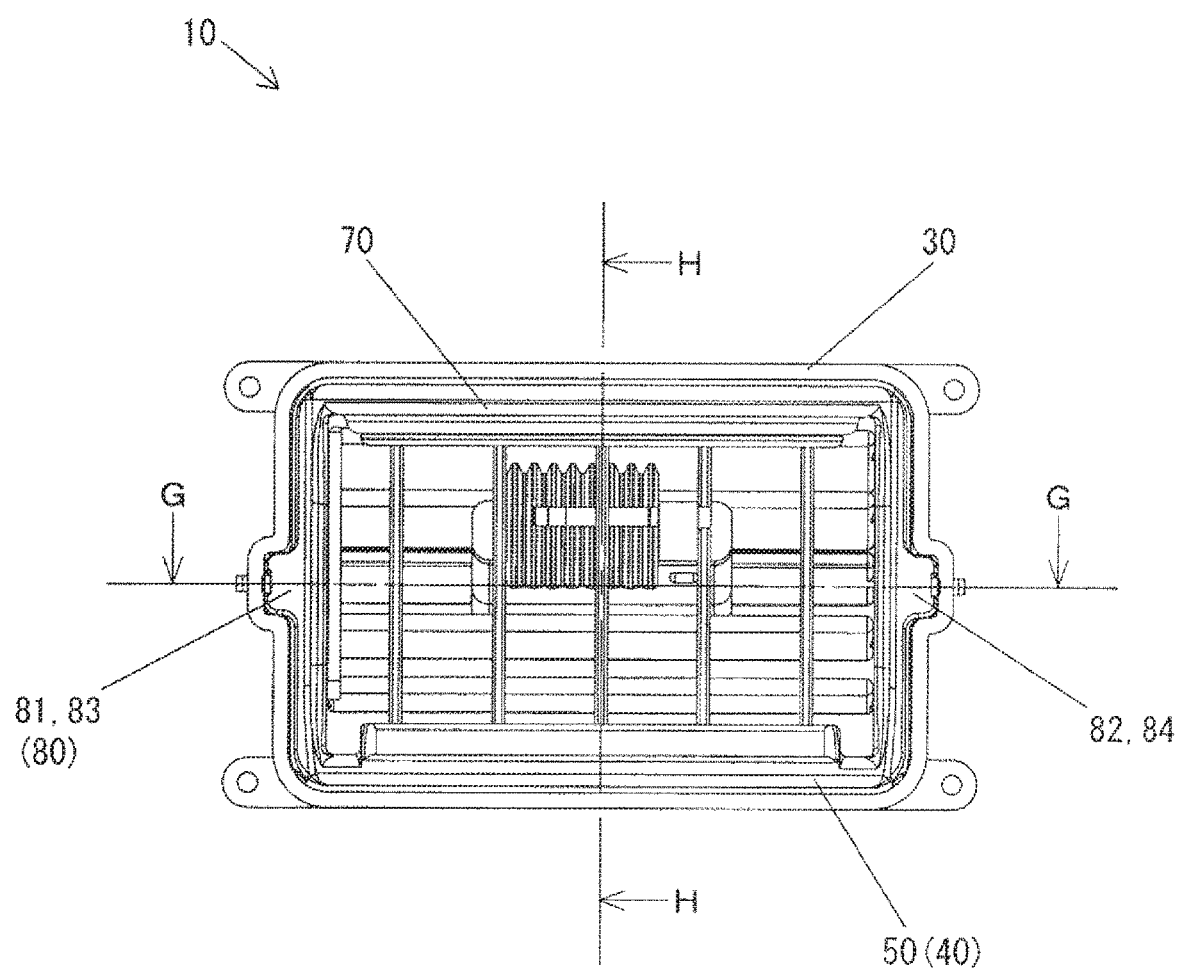
FIG. 36 is a front view of FIG. 4.
Figure 37:
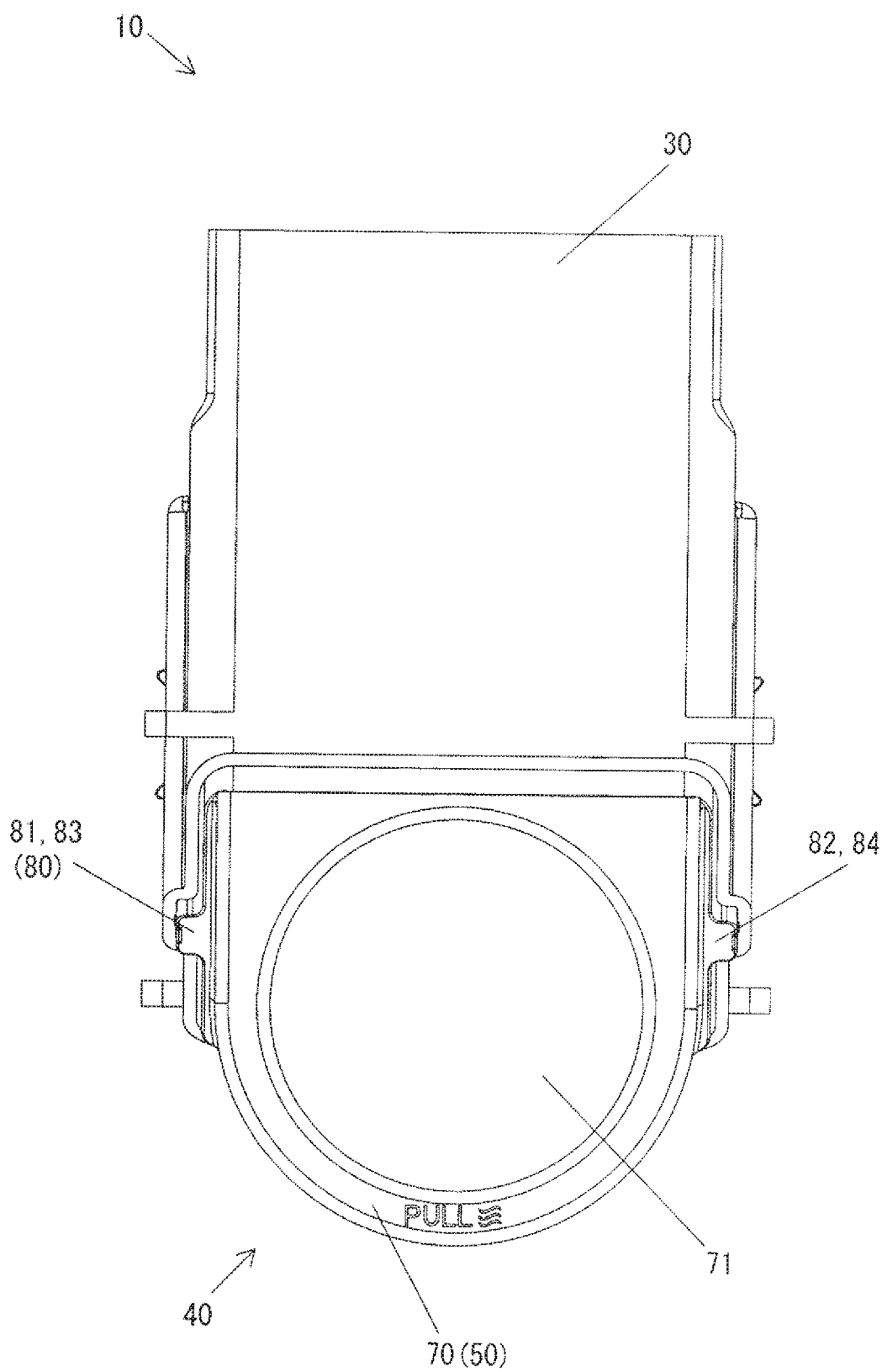
FIG. 37 is a plan view corresponding to FIG. 36.
Figure 38:
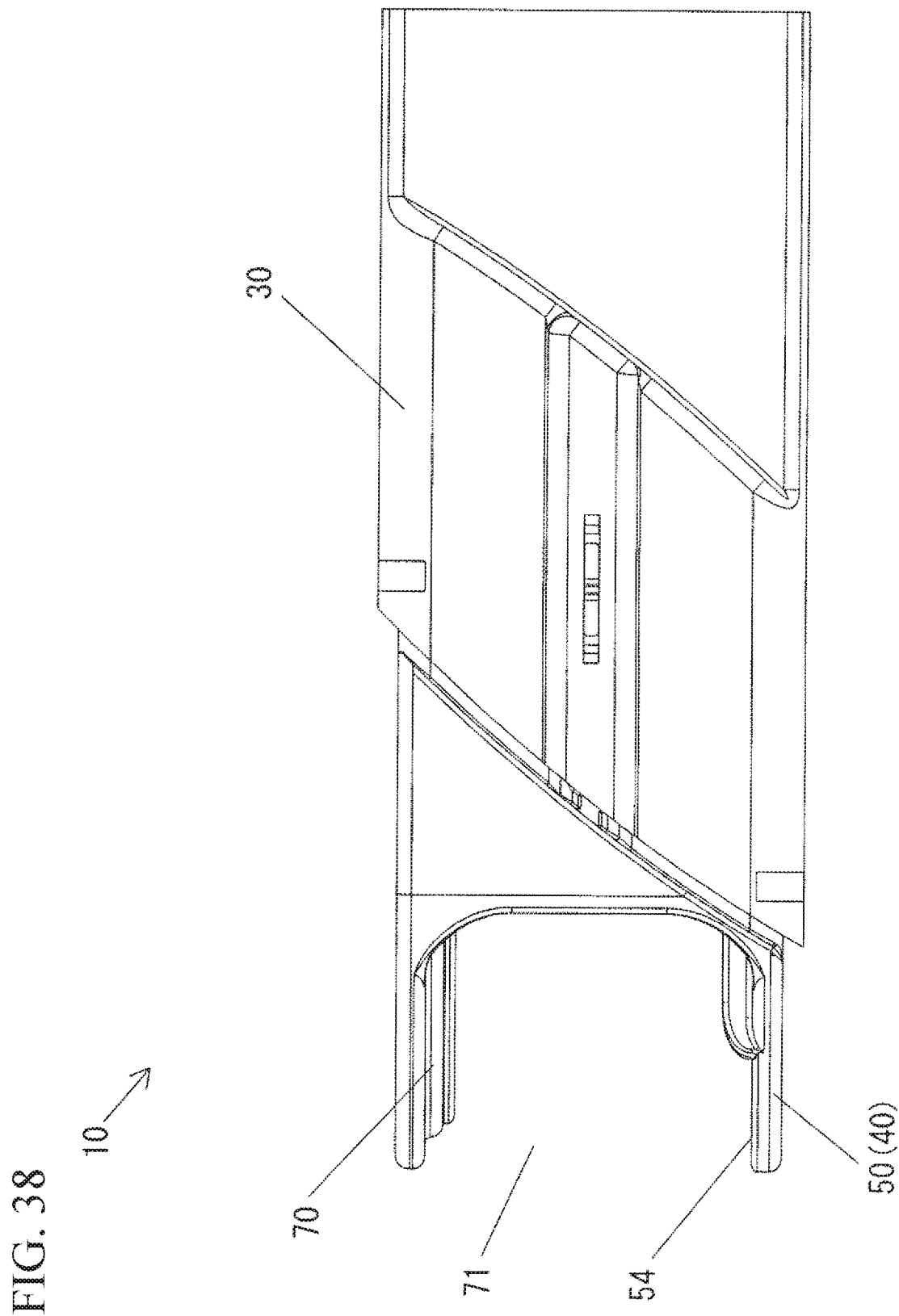
FIG. 38 is a side view corresponding to FIG. 36.

Also, as shown in FIG. 4 and FIG. 36, in a container-holding-portion attachment state as well, likewise, the thin first guide projection 83 positioned on the left side in FIG. 36 of the housing 50 (the unit main member 40) fits into the narrow left-side guide groove 81 on the case 30 side, and the thick second guide projection 84 positioned on the right side in FIG. 36 of the housing 50 (the unit main member 40) fits into the wide right-side guide groove 82 on the case 30 side.

On the other hand, although it is not shown in the drawings, in another direction, for example, in a state in FIG. 1, when the container insertion hole 71 faces downward, and the housing 50 is attempted to be inserted into the front face opening 31 of the case 30 from a vent-portion 60 side, the thick second guide projection 84 of the housing 50 (the unit main member 40) is positioned in the narrow left-side guide groove 81 on the case 30 side, so that the thick second guide projection 84 is prevented from fitting into the narrow left-side guide groove 81 so as to prevent an erroneous assembly.

Incidentally, for example, in a state in FIG. 3, in a case wherein the container insertion hole 71 faces downward, and the housing 50 is attempted to be inserted into the front face opening 31 of the case 30 from a container-holding-portion 70 side, it operates the same as well.

(Pushing Prevention Device)

The pushing prevention device makes the container holding portion 70 incapable of being pushed toward an inside of the outlet 21 in the container-holding-portion attachment state shown in FIG. 4.

Figure 39:
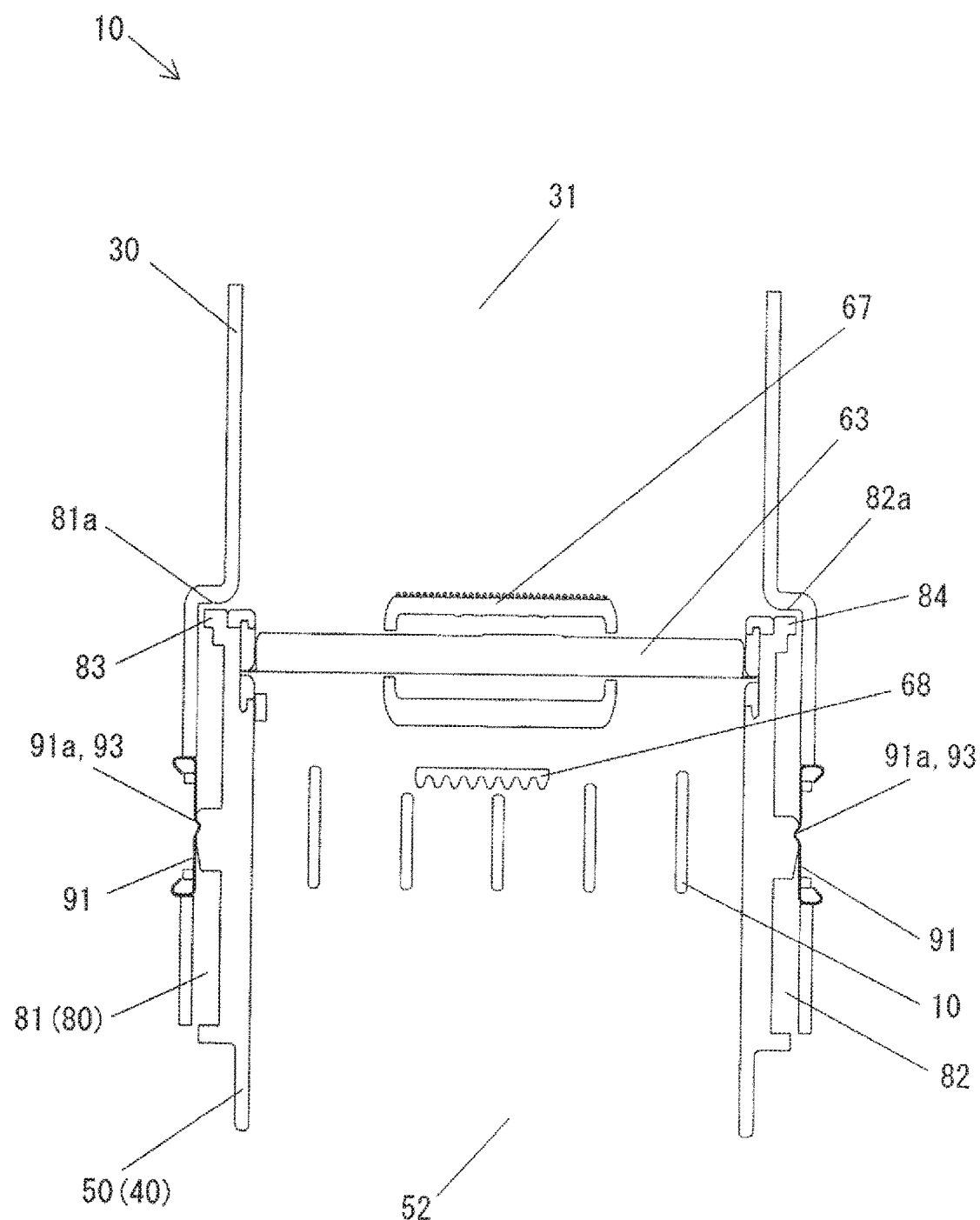
FIG. 39 is a cross-sectional view taken along line G-G in FIG. 36.
Figure 40:
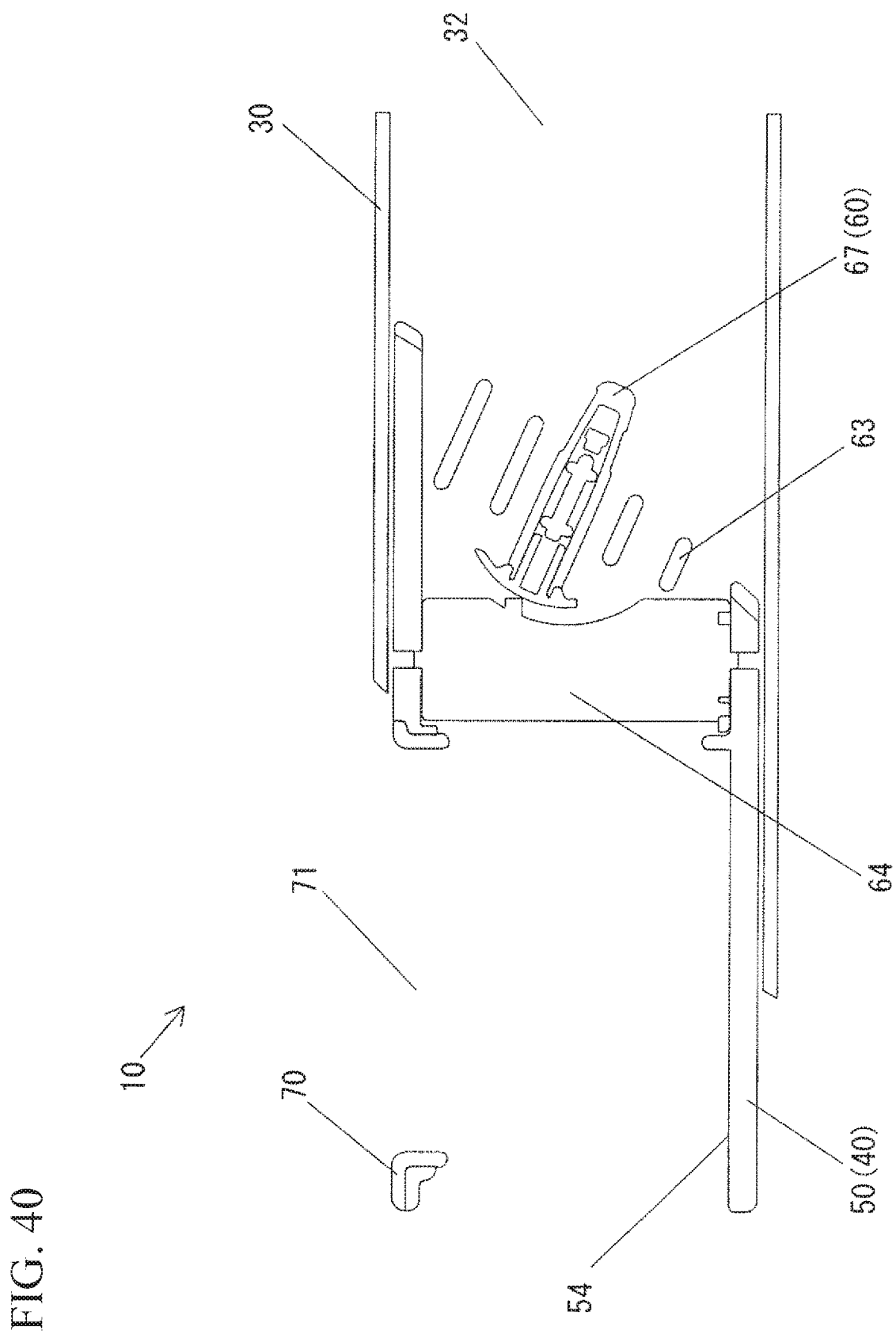
FIG. 40 is a cross-sectional view taken along line H-H in FIG. 36.

Specifically, as shown in FIG. 39 and FIG. 40, the pushing prevention device is formed by the following respective portions.

(1) First Abutment Portion

As shown in FIG. 39 and FIG. 40, a first abutment portion is positioned between the inside of the case 30 and one portion of the vent portion 60 to fit into the inside of the case 30, and when the one portion of the vent portion 60 fits into the inside of the case 30, the first abutment portion abuts against the inside of the case 30 with each other, and is provided at one portion of the bent portion (60). In the present embodiment, one end portion of the guide projections 83 and 84 corresponds to the first abutment portion.

(2) Second Abutment Portion

As shown in FIG. 39 and FIG. 40, a second abutment portion is provided inside the case 30, and in the present embodiment, the terminal portions 81a and 82a of the guide grooves 81 and 82, which abut against one end portion of the guide projections 83 and 84 correspond to the second abutment portion.

Incidentally, as the pushing prevention device, although one end portion of the guide projections 83 and 84 is shown as an example of the first abutment portion, and the terminal portions 81a and 82a of the guide grooves 81 and 82 which abut against one end portion of the guide projections 83 and 84 are shown as an example of the second abutment portion, respectively, it is not limited to the above, and although it is not shown in the drawings, a projection may be provided inside the case 30 so that the unit main member 40 abuts against the projection.

(Lock Device 90)

The lock device 90 is for locking the housing 50 (the unit main member 40) relative to the case 30 in the vent-portion attachment state shown in FIG. 2 and in the container-holding-portion attachment state shown in FIG. 4. Namely, the lock device 90 prevents the housing 50 (the unit main member 40) from projecting unexpectedly from the inside of the case 30 due to car vibrations and the like, and prevents the housing 50 (the unit main member 40) from coming out of the case 30.

As shown in FIG. 9, the lock device 90 is formed by the following respective portions.

Incidentally, the following (1) and (2) will be described later.

(1) Leaf springs 91
(2) Engagement portions 92

(Leaf Spring 91)

As shown in FIG. 9, leaf springs 91 are positioned on the case 30 side, and form a convex portion projecting toward the inside of the case 30.

Specifically, the leaf springs 91 are attached respectively to the left side wall 100 and the right side wall 101 on the left and right of the case 30. The leaf springs 91 elastically project toward an inside of the guide grooves 81 and 82, and engage the guide projections 83 and 84 on the housing 50 side.

Incidentally, the leaf springs 91 are attached respectively to the left side wall 100 and the right side wall 101 on the left and right of the housing 50, however, they are not limited to the above, and although it is not shown in the drawings, for example, the leaf springs may be attached to only one of either the left side wall 100 or the right side wall 101 on the left and right, or may be attached to both the upper wall 102 and the lower wall 103 on top and bottom, or attached to only one of either the upper wall 102 or the lower wall 103 on the top and bottom.

In a center of a length of each leaf springs 91, there is provided a convex portion 91a bending approximately in a V shape, and projecting toward the inside of the guide grooves 81 and 82.

(Engagement Portion 92)

As shown in FIG. 9, the engagement portions 92 are positioned on the housing 50 side, and in the vent-portion attachment state shown in FIG. 2, and in the container-holding-portion attachment state shown in FIG. 4, each engagement portion forms a concave portion which fits in each leaf spring 91 forming the convex portion.

Specifically, the engagement portions 92 are provided respectively in the guide projections 83 and 84 on the left and right of the housing 50.

Namely, as shown in FIG. 9 and FIG. 18, in the guide projections 83 and 84 on the left and right, there is formed a slide groove having a concave shape in a cross section into which the convex portions 91a of the leaf springs 91 positioned on the case 30 side fit and slide along a longitudinal direction of the guide projections 83 and 84. Incidentally, both end portions of the slide groove are closed.

Each engagement portion 92 rises in a mountain shape in a cross section from a bottom of the slide groove having the concave shape, and is positioned at a middle in a length direction of the slide groove.

As shown in FIG. 9, on a middle of each engagement portion 92, there is provided an engagement concave portion 93 having a concave shape into which the convex portion 91a of the leaf spring 91 fits.

On both sides of the engagement concave portion 93, there are respectively provided a first engagement convex portion 94 inclining upwardly toward the engagement concave portion 93, and positioned on the case 30 side in FIG. 9; and a second engagement convex portion 95 positioned on a side opposite to the first engagement convex portion 94 by sandwiching the engagement concave portion 93, and made short compared to the first engagement convex portion 94.

Incidentally, lengths of the first engagement convex portion 94 and the second engagement convex portion 95 are changed so as to change a pushing force of the housing 50 at a locking time or an unlocking time.

(Bezel 61)

As shown in FIG. 25, the bezel 61 is formed in a frame shape, and is attached to the first opening 51 of the housing 50.

(Holders 62)

As shown in FIG. 25, a left-and-right pair of holders 62 is provided, and is attached to the bezel 61 for rotatably supporting the later-described transverse fins 63.

(Transverse Fins 63)

As shown in FIG. 25, the transverse fins 63 have a fan-like shape and have a plurality of pieces, for example, five pieces. The transverse fins 63 are rotatably supported between the left-and-right holders 62, rotate up and down, and change a wind direction in an up-and-down direction.

Incidentally, although the five pieces of transverse fins 63 are shown as an example of the number of the transverse fins 63, they are not limited to the above provided that there is the plurality of pieces, and they may have 2 to 4 pieces, or six pieces or more.

(Vertical Fins 64)

As shown in FIG. 25, the vertical fins 64 are positioned on a back side of the transverse fins 63, have the fan-like shape, and have the plurality of pieces, for example, five pieces. The vertical fins 64 are rotatably supported between the upper wall 112 and the lower wall 113 of the housing 50, rotate in a right-and-left direction, and change the wind direction in the right-and-left direction.

Incidentally, the number of the pieces of the vertical fins 64 may differ from the number of the pieces of the transverse fins 63, and although the five pieces of vertical fins 64 are shown as an example, they are not limited to the above provided that there is the plurality of pieces, and may have two to four pieces, or six pieces or more.

(First Link 65)

As shown in FIG. 25, the first link 65 is positioned on one side of the left and right of the transverse fins 63, and rotates the five pieces of transverse fins 63 in the associated manner.

(Second Link 66)

As shown in FIG. 25, the second link 66 is positioned on an upper side of the transverse fins 64, and is for rotating the five pieces of vertical fins 64 in the associated manner.

(Knob 67)

As shown in FIG. 25, the knob 67 is attached to one piece of the transverse fins 63, rotates up and down integrally with the relevant transverse fin 63, and is slidably supported in the right-and-left direction along the relevant transverse fin 63. In the knob 67, an end portion on a front side projects outward from the first opening 51 so as to become operational. When the knob 67 is operated in the up-and-down direction, the five pieces of transverse fins 63 rotate in the up-and-down direction in the associated manner through the first link 65. As shown in FIG. 2, on an upper face of the knob 67, there is formed a nonslip concave-convex surface.

(Knob Gear 68)

As shown in FIG. 25, the knob gear 68 is attached to an end portion positioned on a back side of the knob 67, moves up and down integrally with the knob 67, and slides in the right-and-left direction. The knob gear 68 engages one piece of the vertical fins 64, and when the knob 67 slides in the right-and-left direction, the knob gear 68 integrally slides, and the five pieces of vertical fins 64 are associated through the second link 66 so as to rotate in the right-and-left direction. A rack-and-pinion mechanism is provided between the knob gear 68 and the relevant vertical fin 64 engaging the knob gear 68, and converts a slide movement of the knob gear 68 into a turning force of the vertical fin 64.

(Rubber 69)

As shown in FIG. 25, the rubber 69 is positioned between the knob 67 and the relevant transverse fin 63 engaging the knob 67, and is for preventing the knob 67 from unexpectedly sliding due to the car vibrations and the like.

(Vent-Portion Attachment State Shown in FIG. 2)

Next, a usage of the air vent unit 10 including the aforementioned structures will be explained. First, with reference to FIG. 2, the vent-portion attachment state will be explained.

In the vent-portion attachment state, as shown in FIG. 2, the unit main member 40 fits into the case 30 fixed in the outlet 21 of the panel 20 in a buried state, and at that time, the bent portion 60 faces the interior side.

Figure 29:
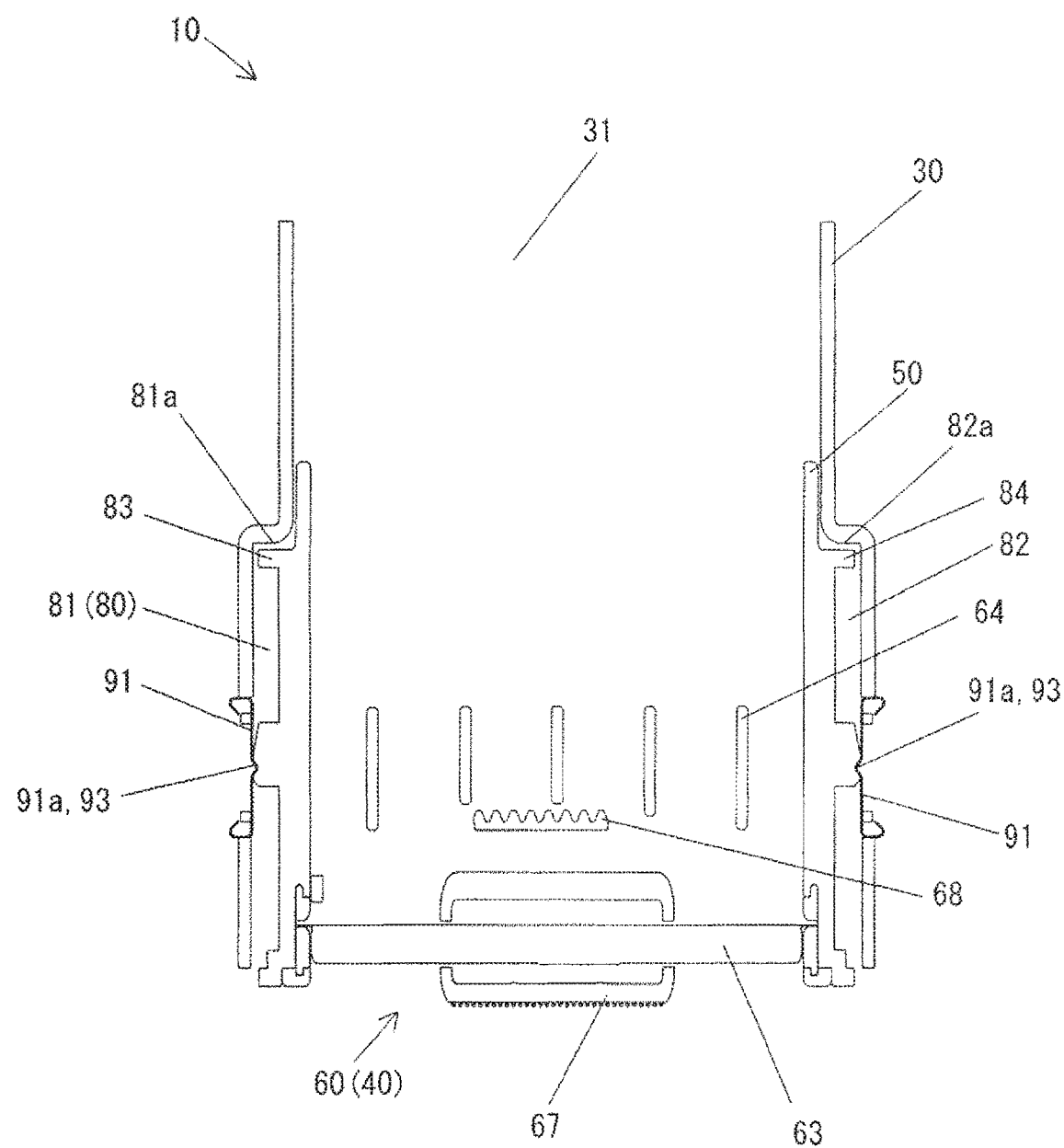
FIG. 29 is a cross-sectional view taken along line C-C in FIG. 26.
Figure 30:
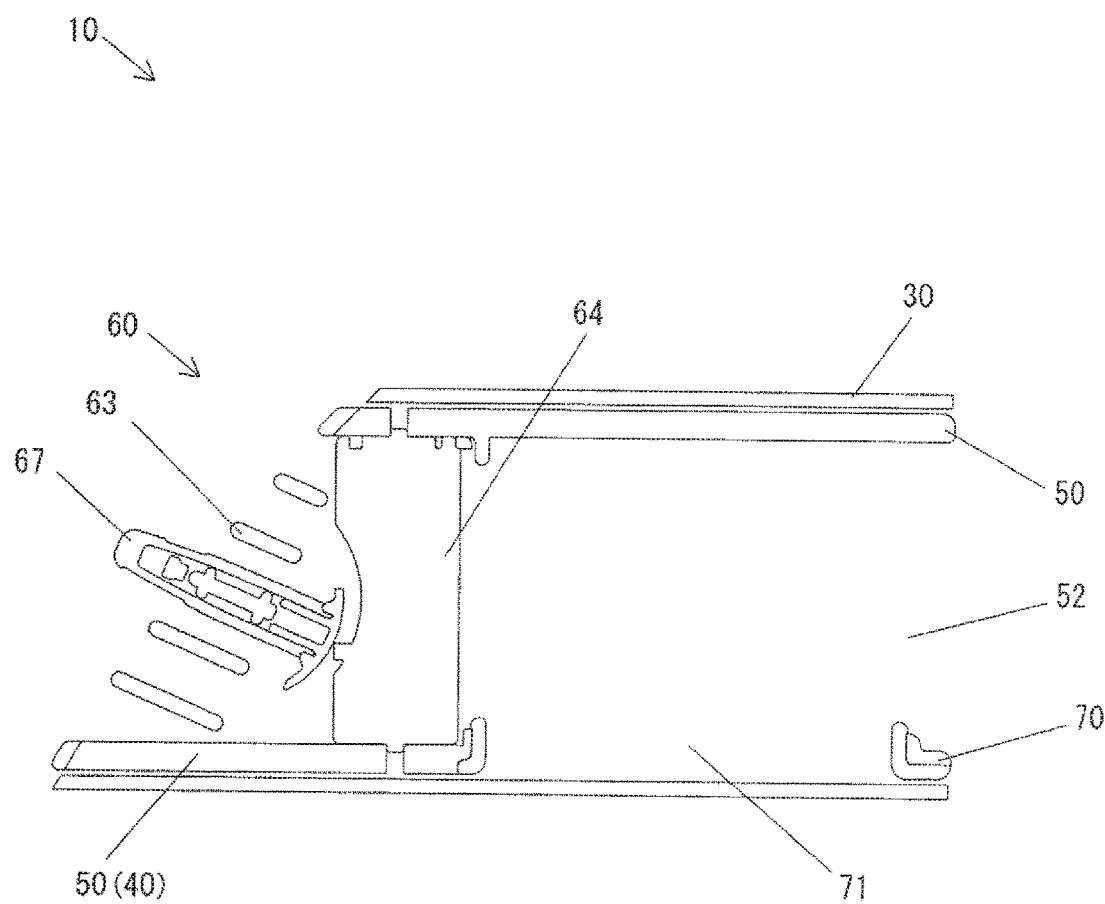
FIG. 30 is a cross-sectional view taken along line D-D in FIG. 26.
Figure 31:
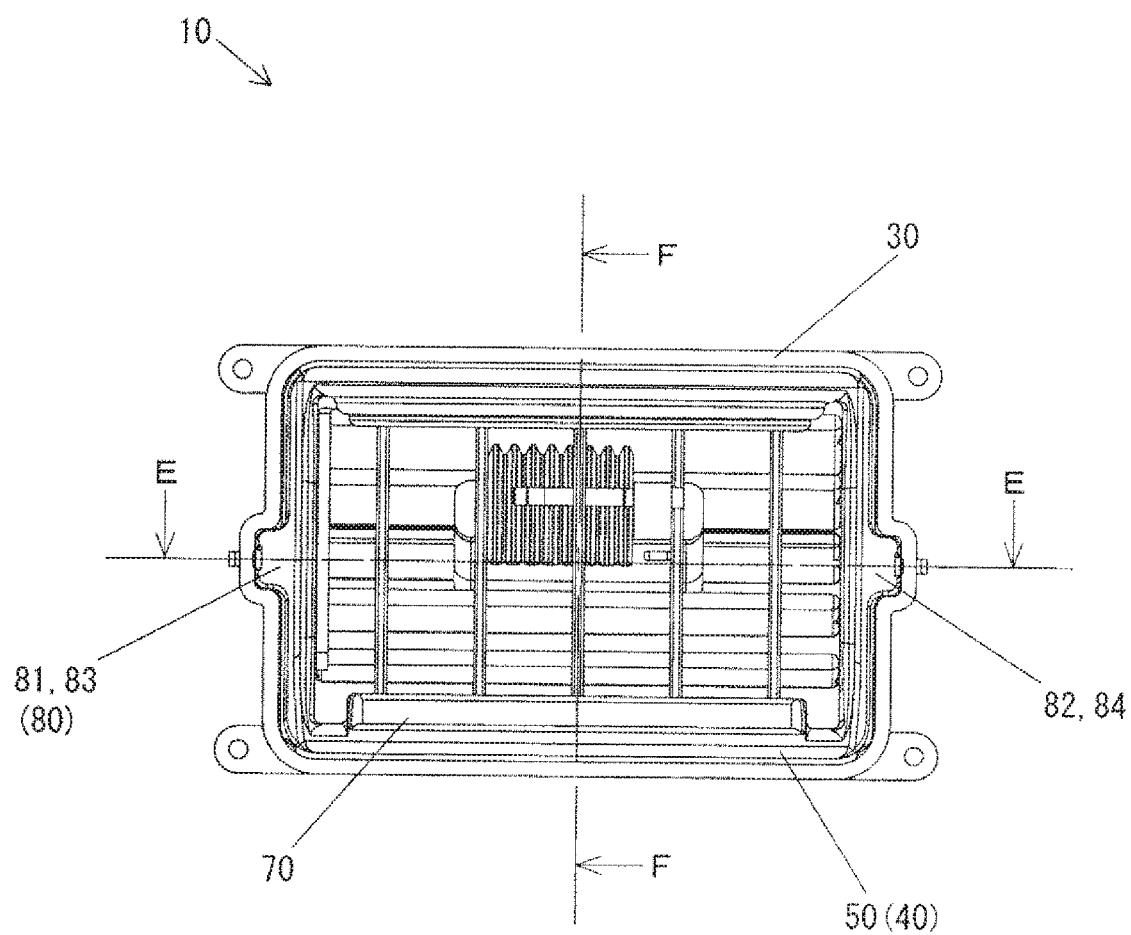
FIG. 31 is a front view of FIG. 1.
Figure 33:
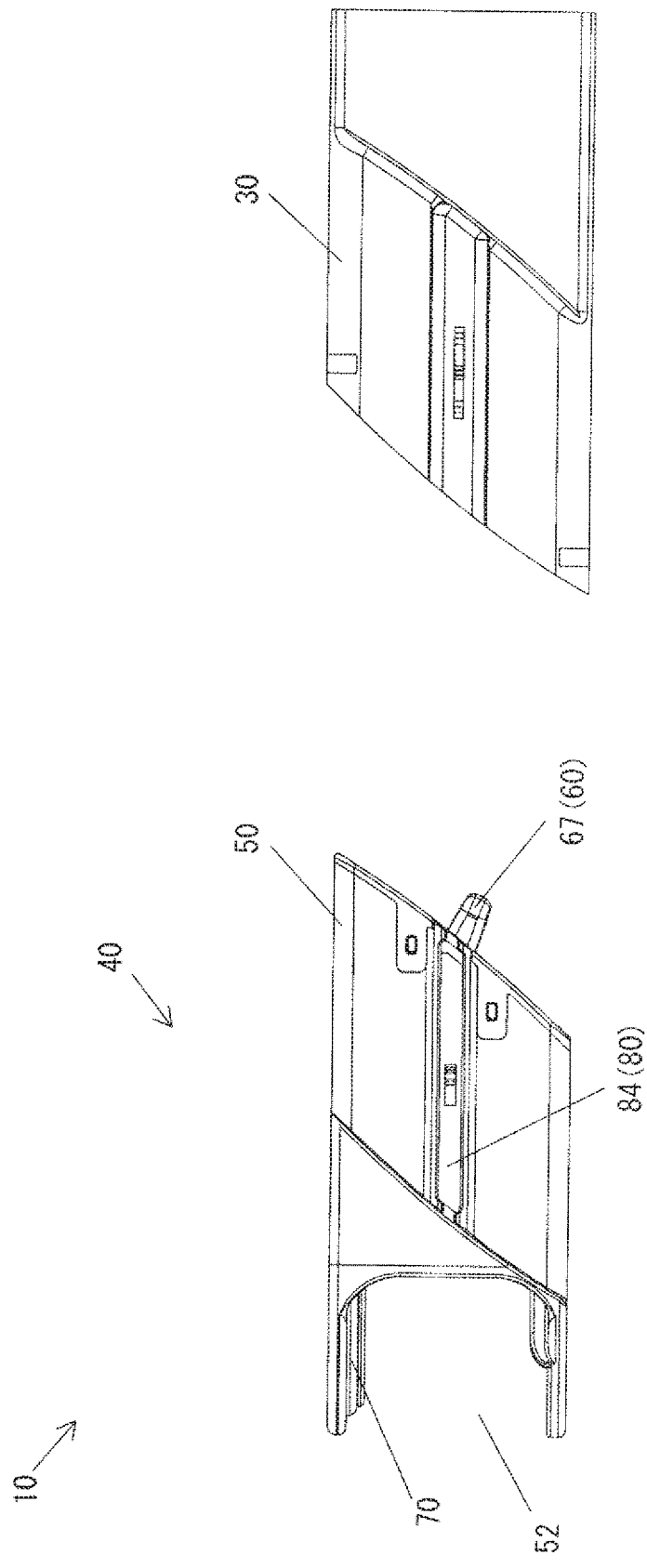
FIG. 33 is a side view of FIG. 31.
Figure 34:
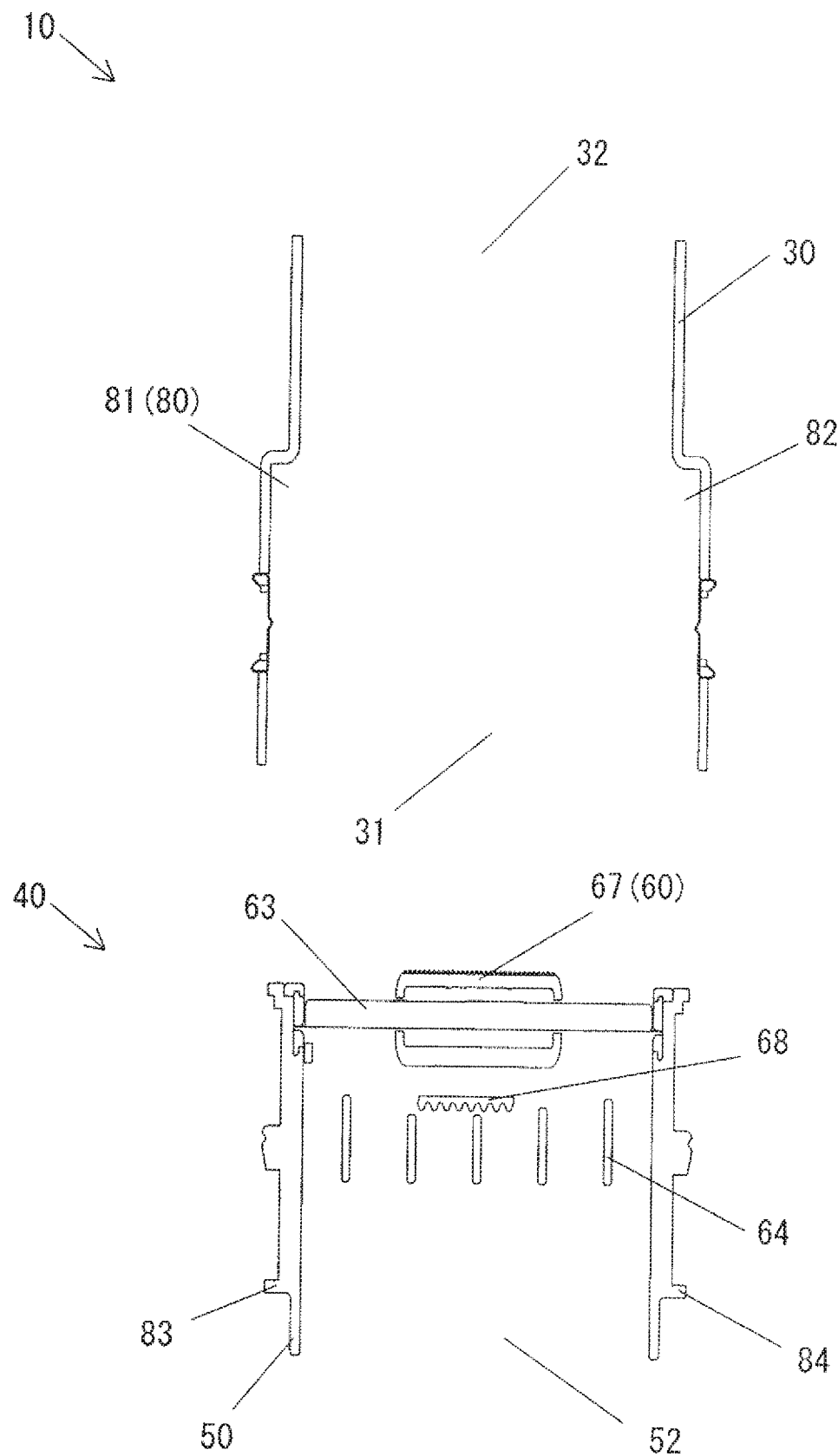
FIG. 34 is a cross-sectional view taken along line E-E in FIG. 31.

In the vent-portion attachment state, as shown in FIG. 29, the unit main member 40 is locked relative to the case 30 by the lock device 90. Also, the container holding portion 70 of the unit main member 40 is stored inside the case 30.

(Attachment State of the Unit Main Member 40 Shown in FIG. 1 and FIG. 3)

Next, in a case wherein the container holding portion 70 of the unit main member 40 is used, as shown in FIG. 3, first, the unit main member 40 is pulled out of the front face opening 31 of the case 30.

When the unit main member 40 is pulled out, the leaf springs 91 positioned on the case 30 side bend, and as shown in FIG. 29, the convex portions 91a fitted into the engagement concave portions 93 of the engagement portions 92 positioned on a unit-main-member 40 side disengage from the relevant engagement concave portions 93 so as to release a lock state of the lock device 90. After releasing the lock state, the unit main member 40 is pulled out of the case 30, and as shown in FIG. 3, the unit main member 40 is removed.

Next, the removed unit main member 40 turns over in the up-and-down direction, and as shown in FIG. 1, the container insertion hole 71 of the container holding portion 70 faces upward. At that time, the container holding portion 70 is positioned on a near side of an operator, and the vent portion 60 is positioned on a back side of the operator, i.e. toward the front face opening 31 of the case 30.

Here, "turning over in the up-and-down direction" means, in a case wherein an extended line of the engagement portion 92 on the unit-main-member 40 side in FIG. 3 is assumed as a horizontal shaft, rotating around the relevant horizontal shaft by 180 degrees. Incidentally, as "turning over up and down", although it is not shown in the drawings, an upper face and a lower face of the unit main member 40 turn over so as to face the container insertion hole 71 upward. At that time, the container holding portion 70 is positioned to face a front-face-opening 31 side of the case 30, and the vent portion 60 is positioned on the near side of the operator. After that, the vent portion 60 may rotate so as to face the front-face-opening 31 side of the case 30.

As shown in FIG. 1, when the removed unit main member 40 turns over in the up-and-down direction, the container insertion hole 71 of the container holding portion 70 faces upward, and at that time, the container holding portion 70 is positioned on the near side of the operator, and the vent portion 60 is positioned on the back side of the operator, i.e. toward the front face opening 31 of the case 30.

Also, the thin first guide projection 83 of the unit main member 40 is positioned on the left side in FIG. 1, and faces the left-side guide groove 81 having a narrow groove width of the case 30. The thick second guide projection 84 of the unit main member 40 is positioned on the right side in FIG. 1, and faces the right-side guide groove 82 having a wide groove width of the case 30.

(Container-Holding-Portion Attachment State Shown in FIG. 4)

Next, the unit main member 40 is attached to the case 30 so as to become the container-holding-portion attachment state shown in FIG. 4.

Namely, as shown in FIG. 1, the unit main member 40 removed with the container insertion hole 71 facing upward is matched and inserted into the front face opening 31 of the case 30 from the vent portion 60.

When the unit main member 40 is inserted from the vent portion 60, the thin first guide projection 83 fits into the left-side guide groove 81 having the narrow groove width of the case 30 as shown in FIG. 39. The thick second guide projection fits into the right-side guide groove 82 having the wide groove width.

As shown in FIG. 39, when the unit main member 40 is inserted further, the convex portion 91a of the leaf spring 91 positioned on the case 30 side fits into the engagement concave portion 93 of the engagement portion 92 positioned on the unit-main-member 40 side, and the lock device 90 comes to the lock state.

In the container-holding-portion attachment state shown in FIG. 4, when the unit main member 40 is attempted to be pushed into the case 30, upper end portions of the left-and-right guide projections 83 and 84 positioned on the unit-main-member 40 side in FIG. 39 abut against the closed terminal portions 81a and 82a of the left-and-right guide grooves 81 and 82 positioned on the case 30 side so as to prevent the unit main member 40 from being pushed.

(Second Embodiment with Reference to FIG. 41 to FIG. 65)

Next, with reference to FIG. 41 to FIG. 65, a second embodiment of the present invention will be explained.

Figure 43:
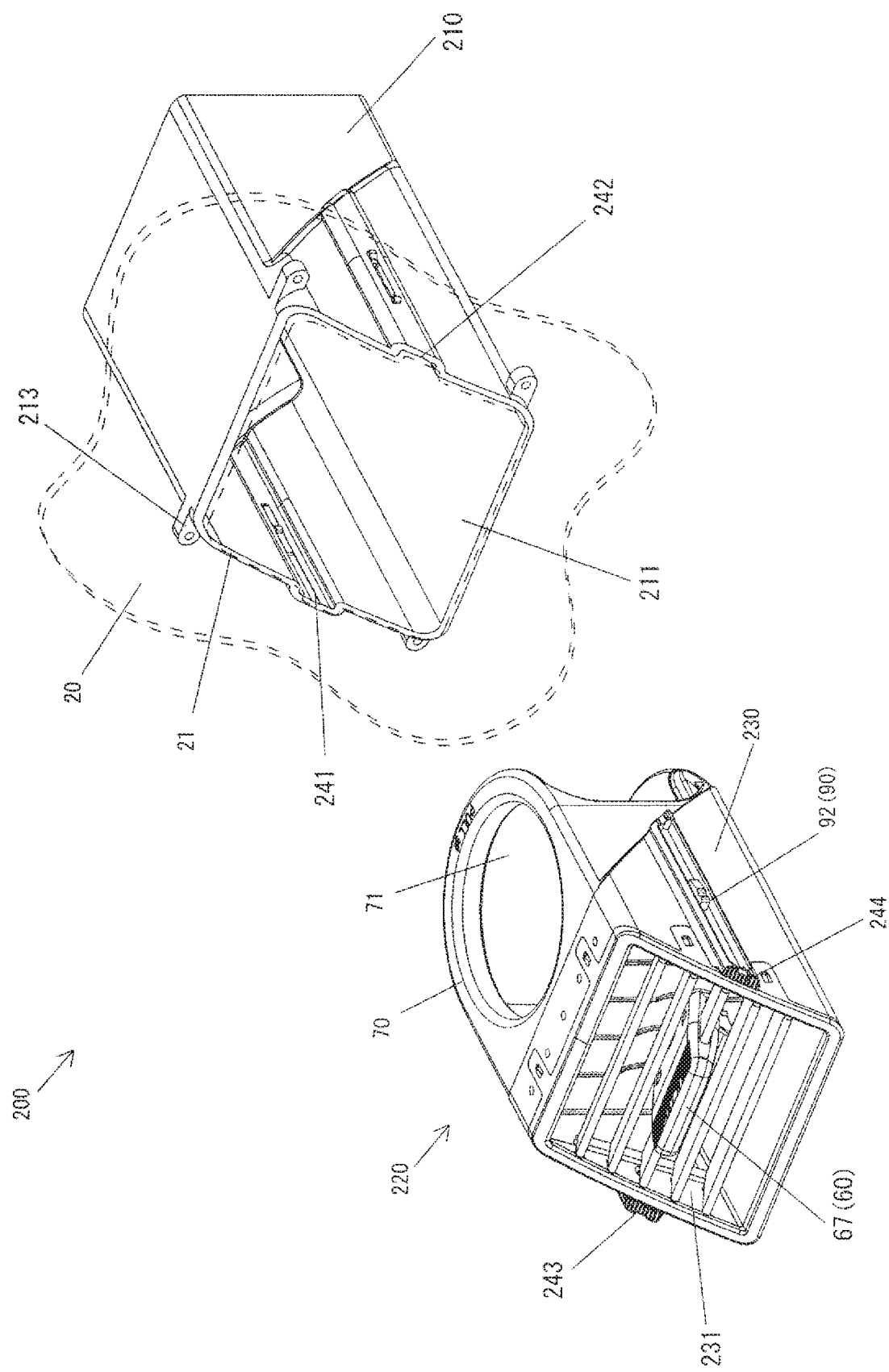
FIG. 43 is a perspective view of the air vent unit in the state wherein the vent portion of the unit main member is removed according to the second embodiment of the present invention.
Figure 44:
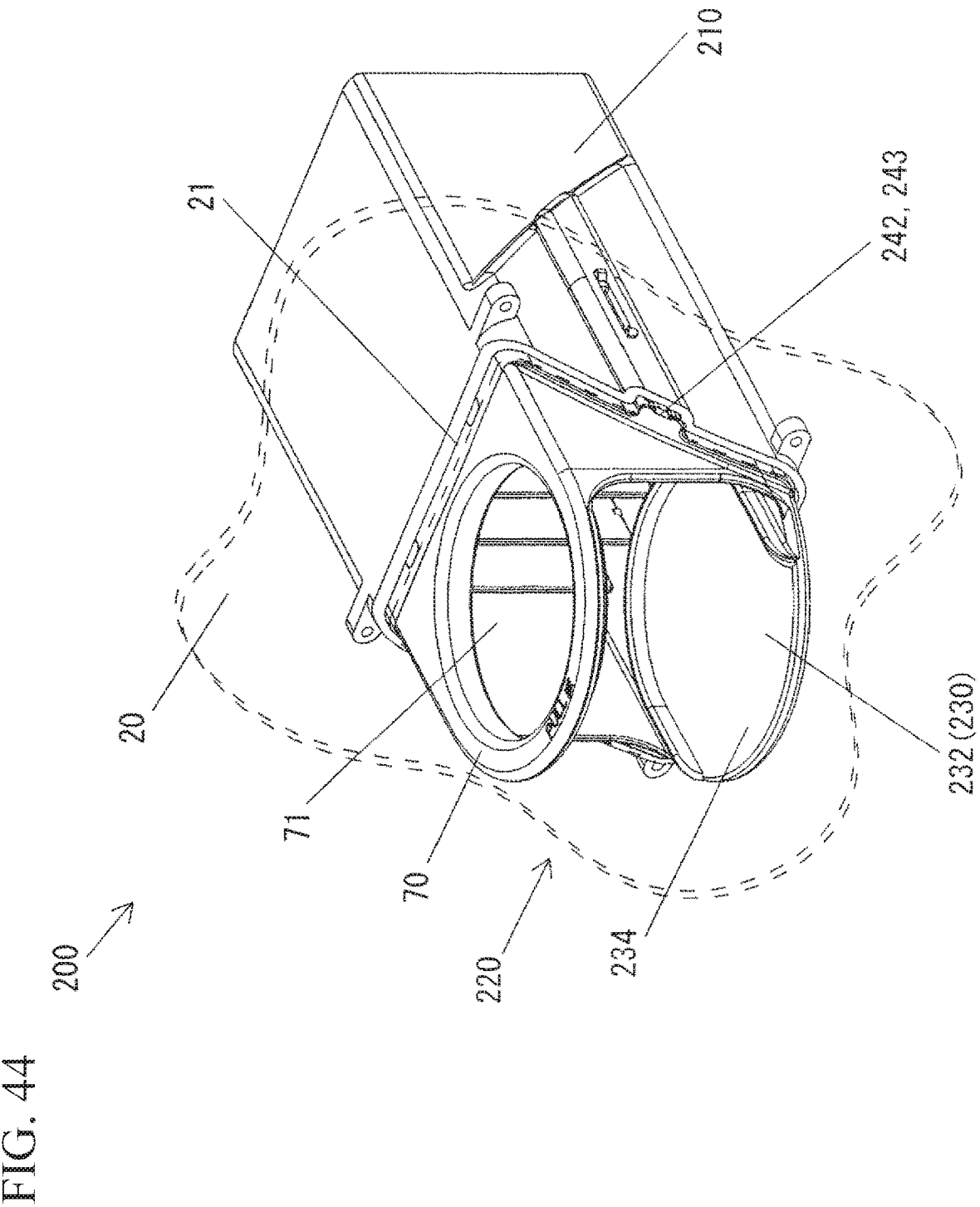
FIG. 44 is a perspective view of the air vent unit in the state wherein the container holding portion of the unit main member is attached according to the second embodiment of the present invention.

Characteristics of the second embodiment according to the present invention are such that in a state wherein an air vent unit 200, i.e. a unit main member 220, is removed from the outlet (a case 210) (see FIG. 43), the unit main member 220 turns over in a horizontal direction, and in a state wherein the container insertion hole 71 faces upward (see FIG. 41), as shown in FIG. 44, the vent portion 60 can be attached toward the outlet 21 (the case 210).

Figure 41:
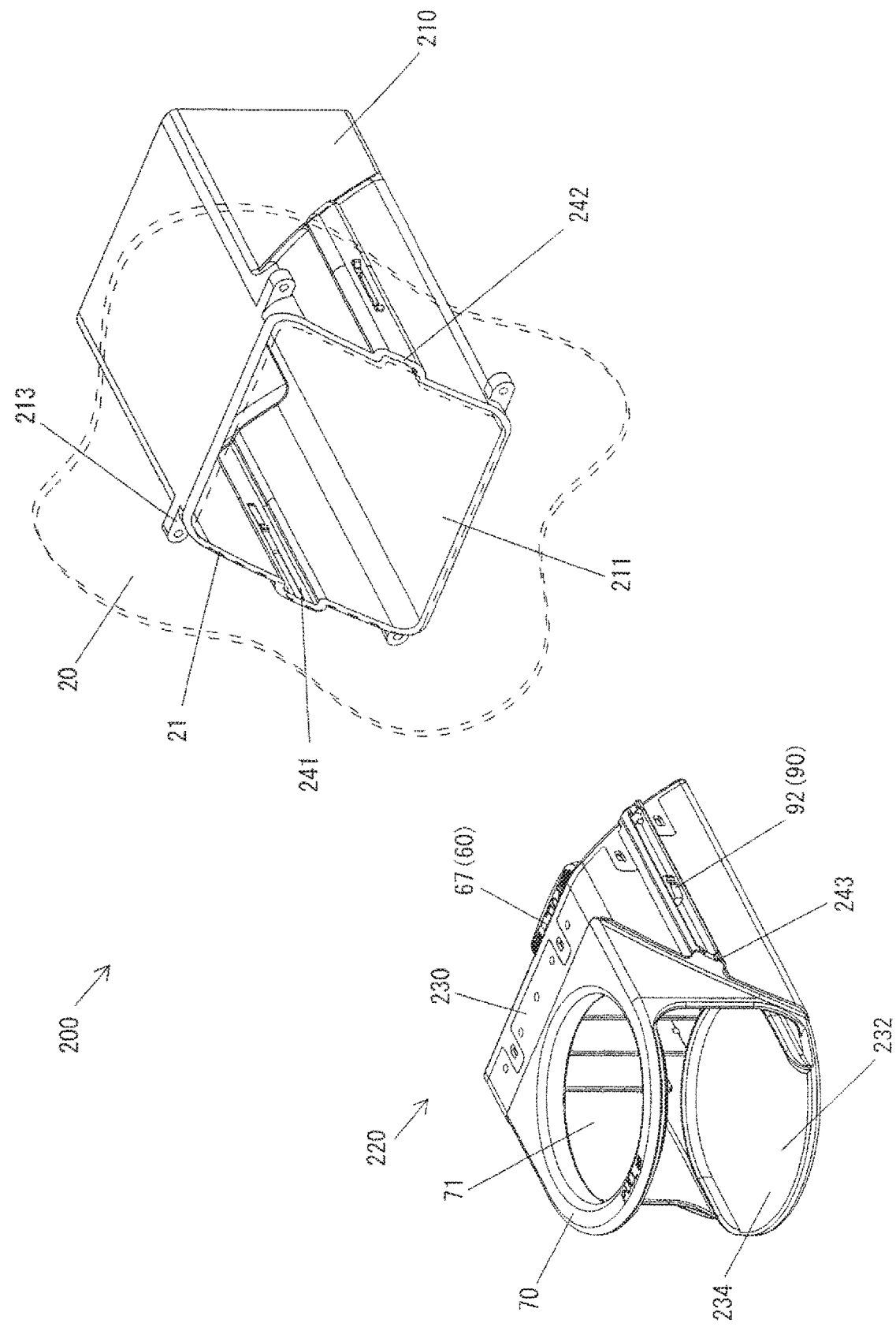
FIG. 41 is a perspective view of the air vent unit in the state wherein the container holding portion of the unit main member is removed according to a second embodiment of the present invention.

In the present embodiment, left-and-right directions of a first guide projection 243 and a second guide projection 244 provided in a housing 230 are reversed left and right between a state removed from the case 210 shown in FIG. 43, and a state wherein the container insertion hole 71 faces upward as shown in FIG. 41 by turning over the unit main member 220 in the horizontal direction.

Namely, in a state removed from the case 210 shown in FIG. 43 and FIG. 47, the first guide projection 243 is positioned on the left side in FIG. 47, and the second guide projection 244 is positioned on the right side.

On the other hand, as shown in FIG. 41 and FIG. 57, in the state wherein the container insertion hole 71 faces upward, the first guide projection 243 is positioned on the right side in FIG. 57, and the second guide projection 244 is positioned on the left side in FIG. 57.

Figure 46:
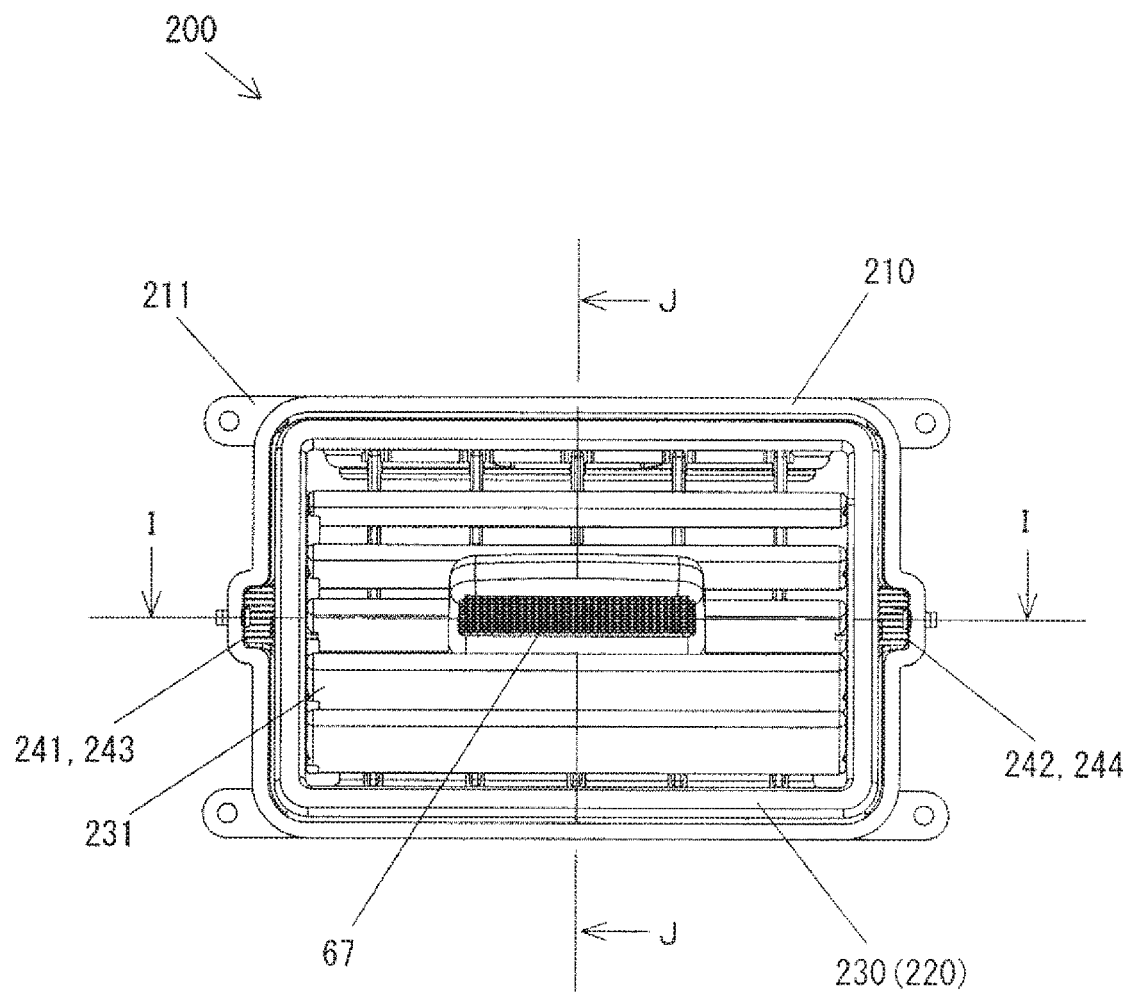
FIG. 46 is a front view of FIG. 43.
Figure 48:
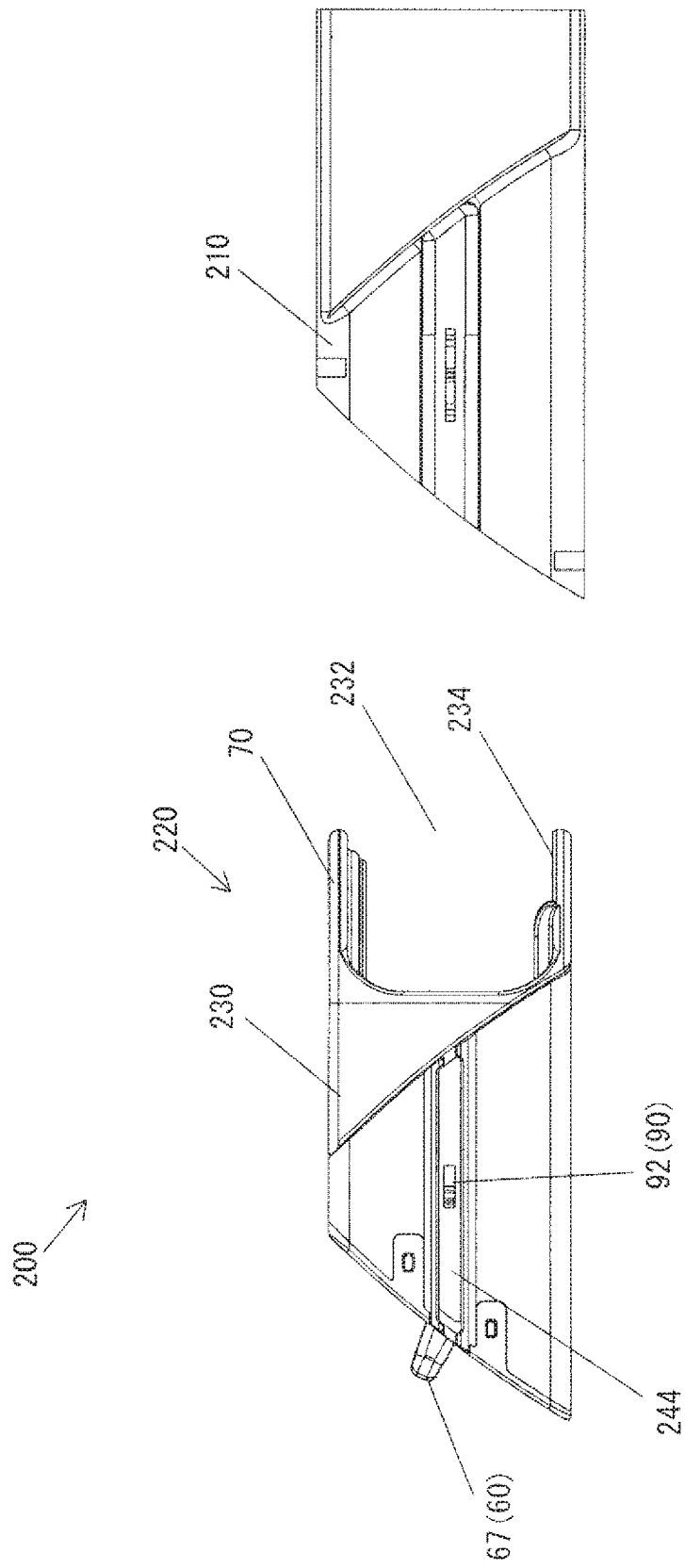
FIG. 48 is a side view corresponding to FIG. 46.
Figure 56:
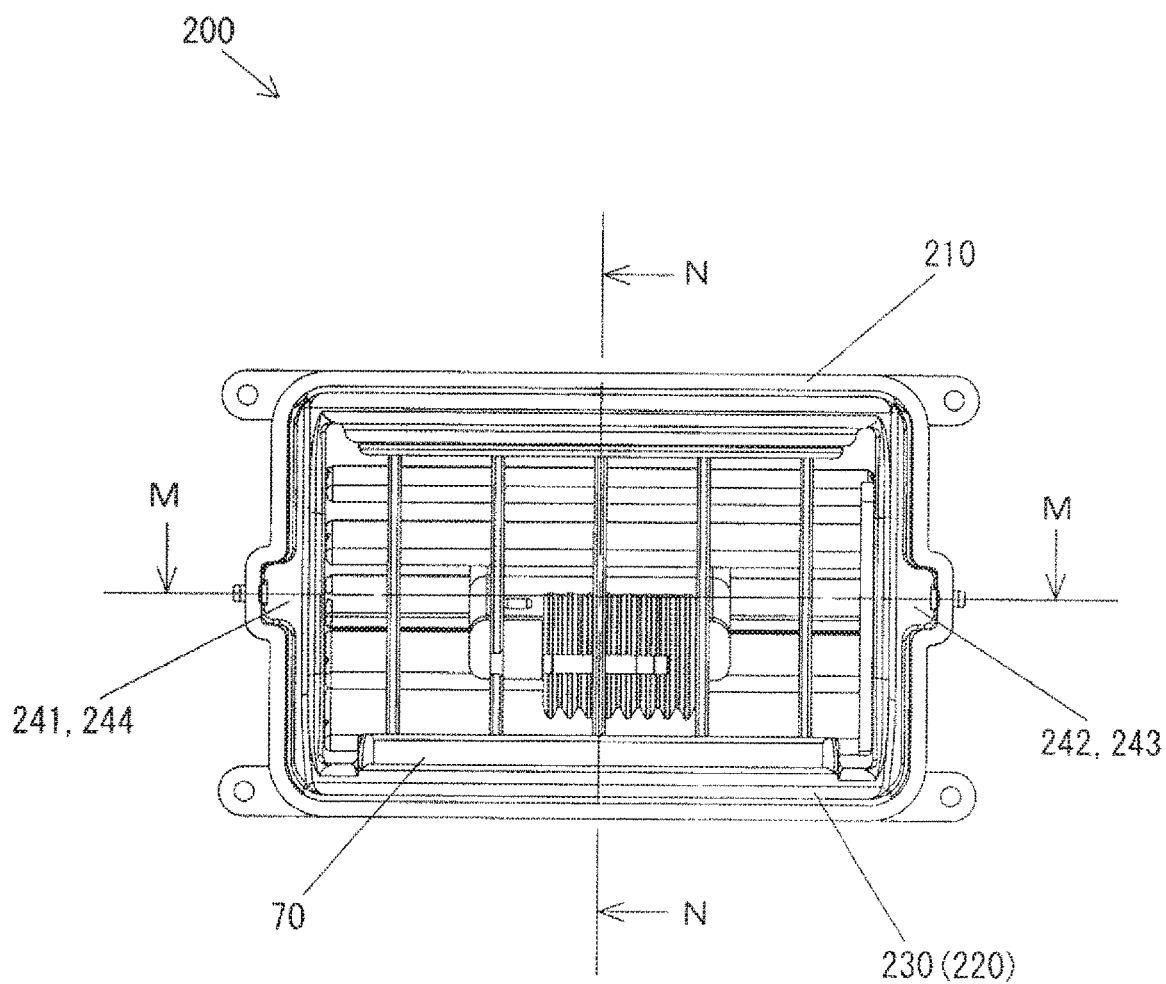
FIG. 56 is a front view of FIG. 41.
Figure 58:
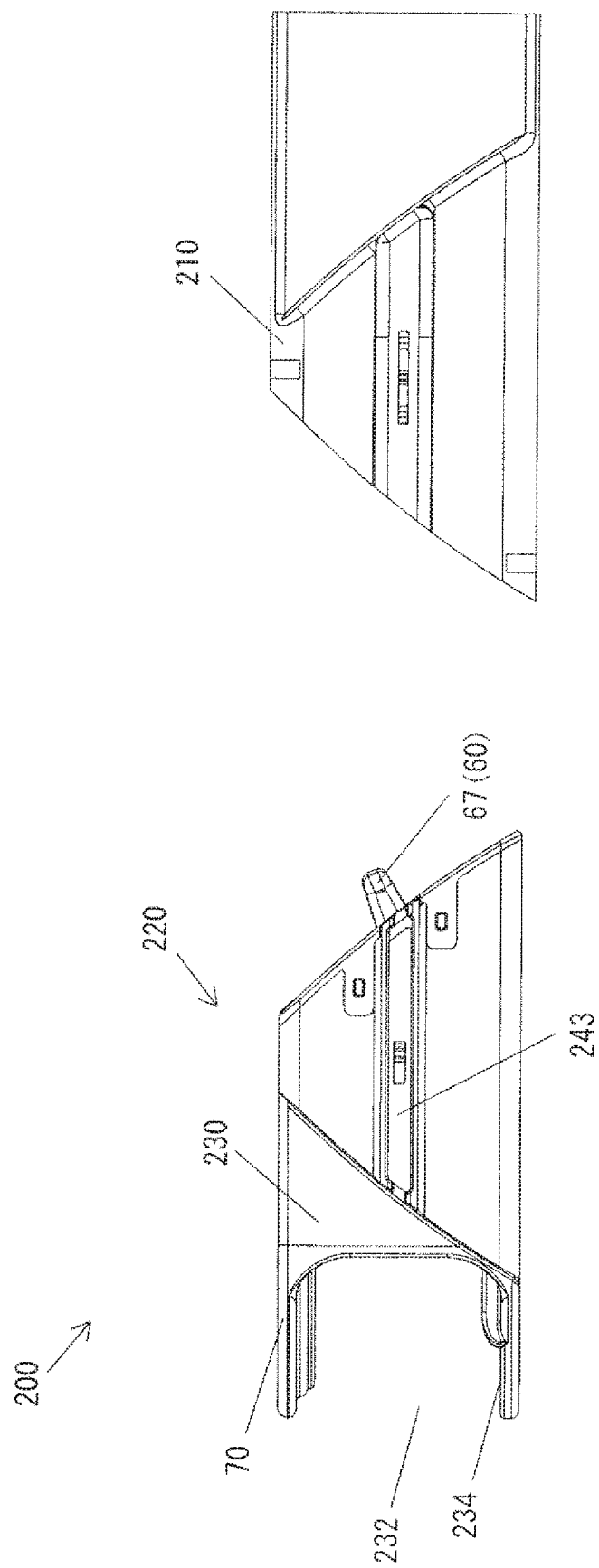
FIG. 58 is a side view of FIG. 56.
Figure 59:
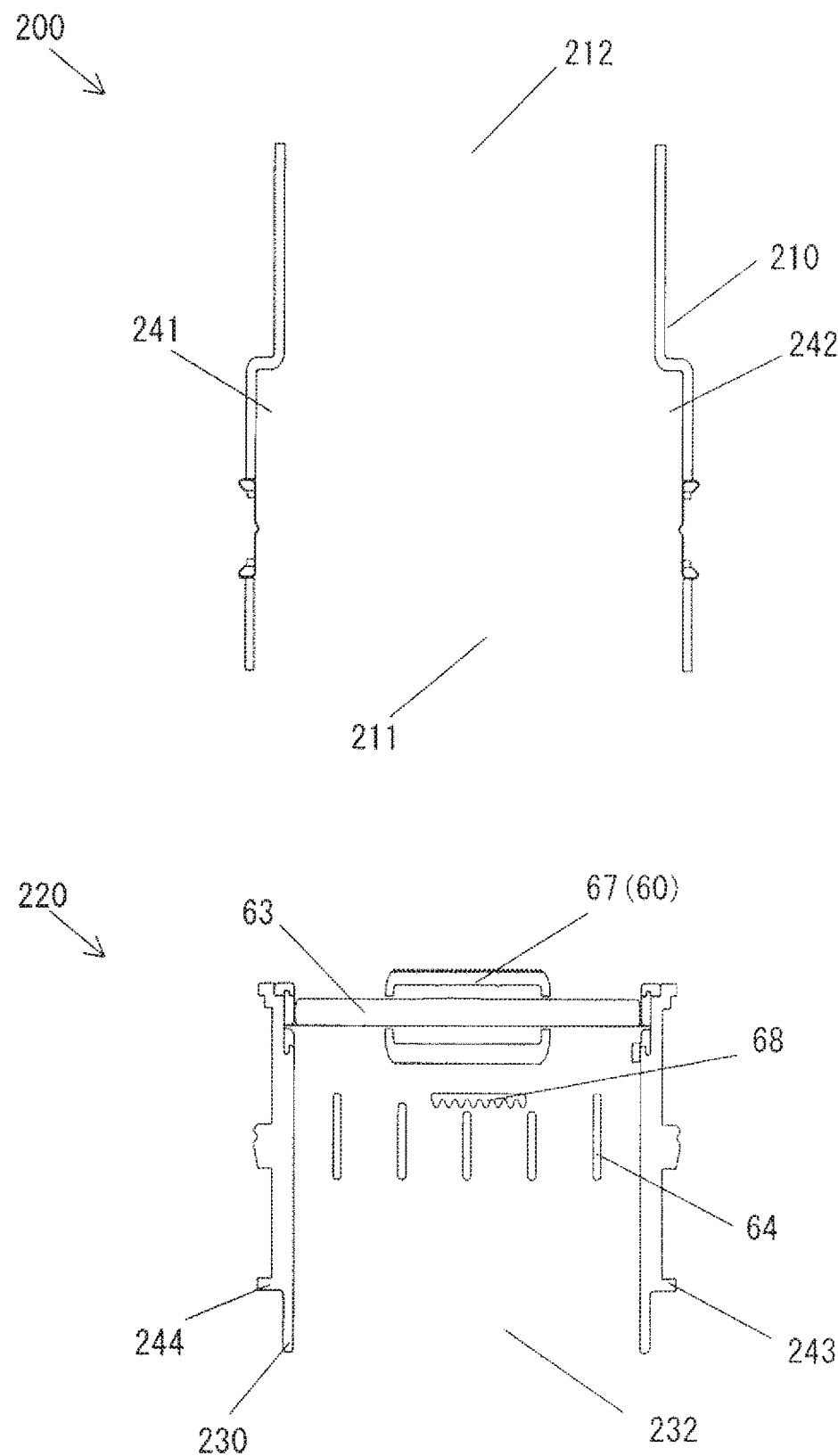
FIG. 59 is a cross-sectional view taken along line M-M in FIG. 56.
Figure 60:
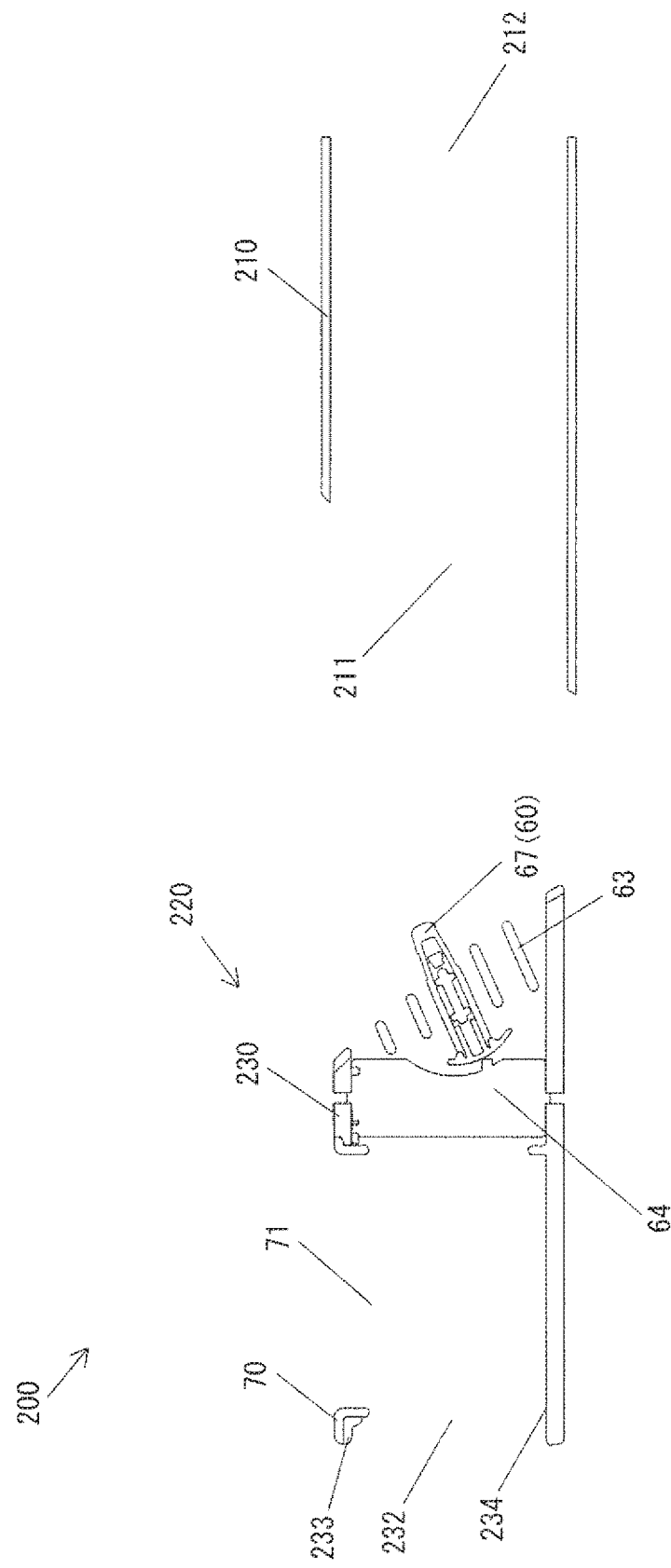
FIG. 60 is a cross-sectional view taken along line N-N in FIG. 56.
Figure 61:
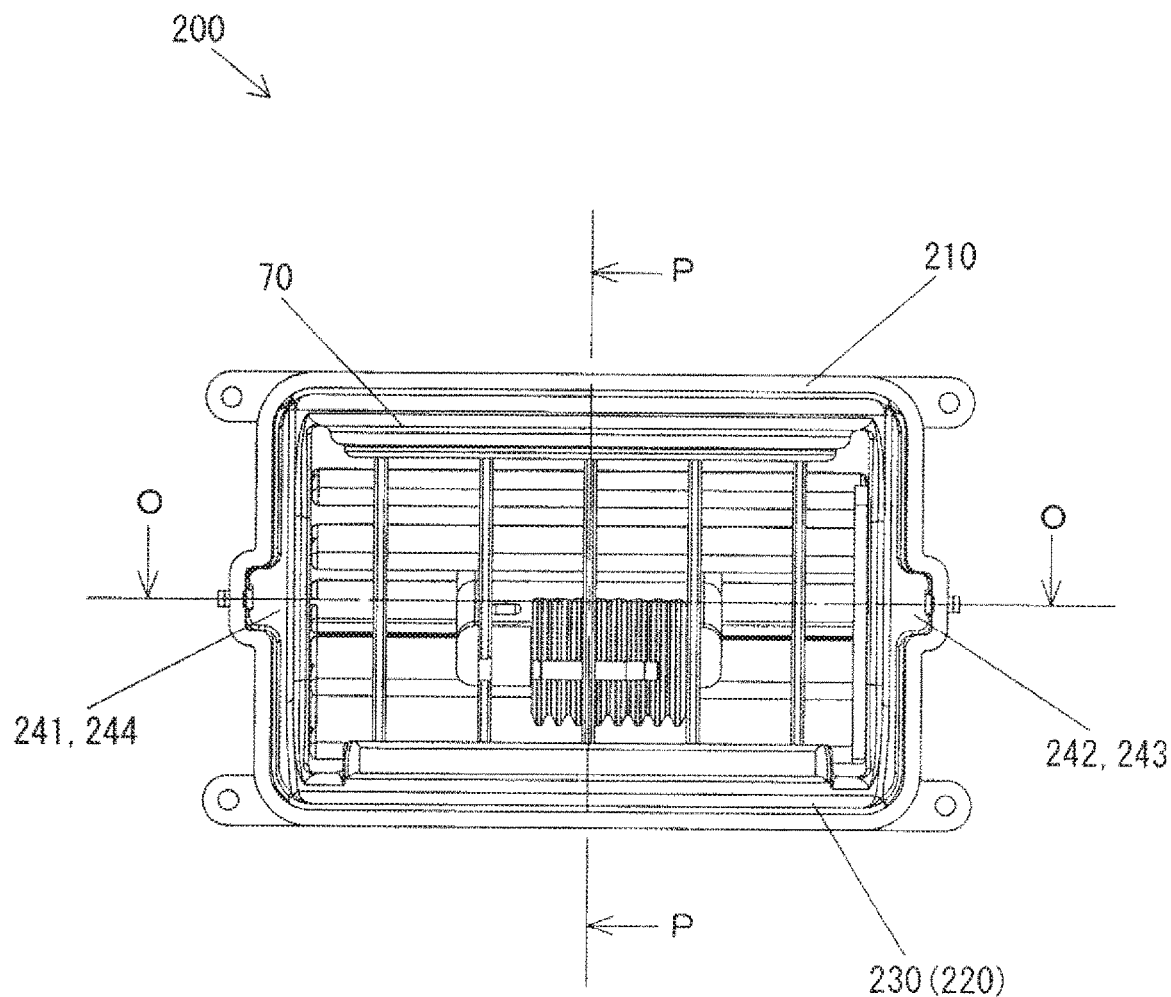
FIG. 61 is a front view of FIG. 44.
Figure 62:
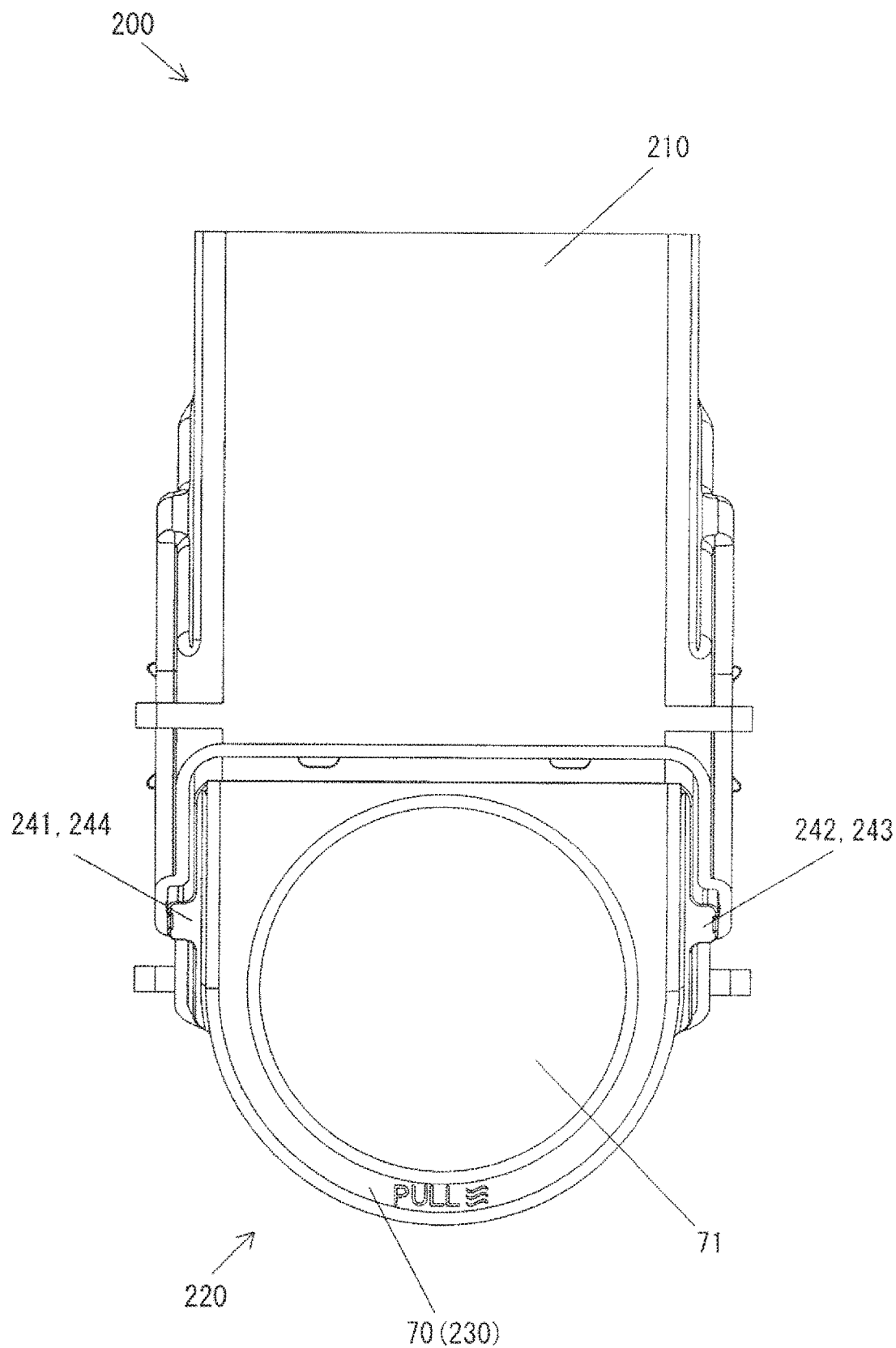
FIG. 62 is a plan view corresponding to FIG. 61.
Figure 63:
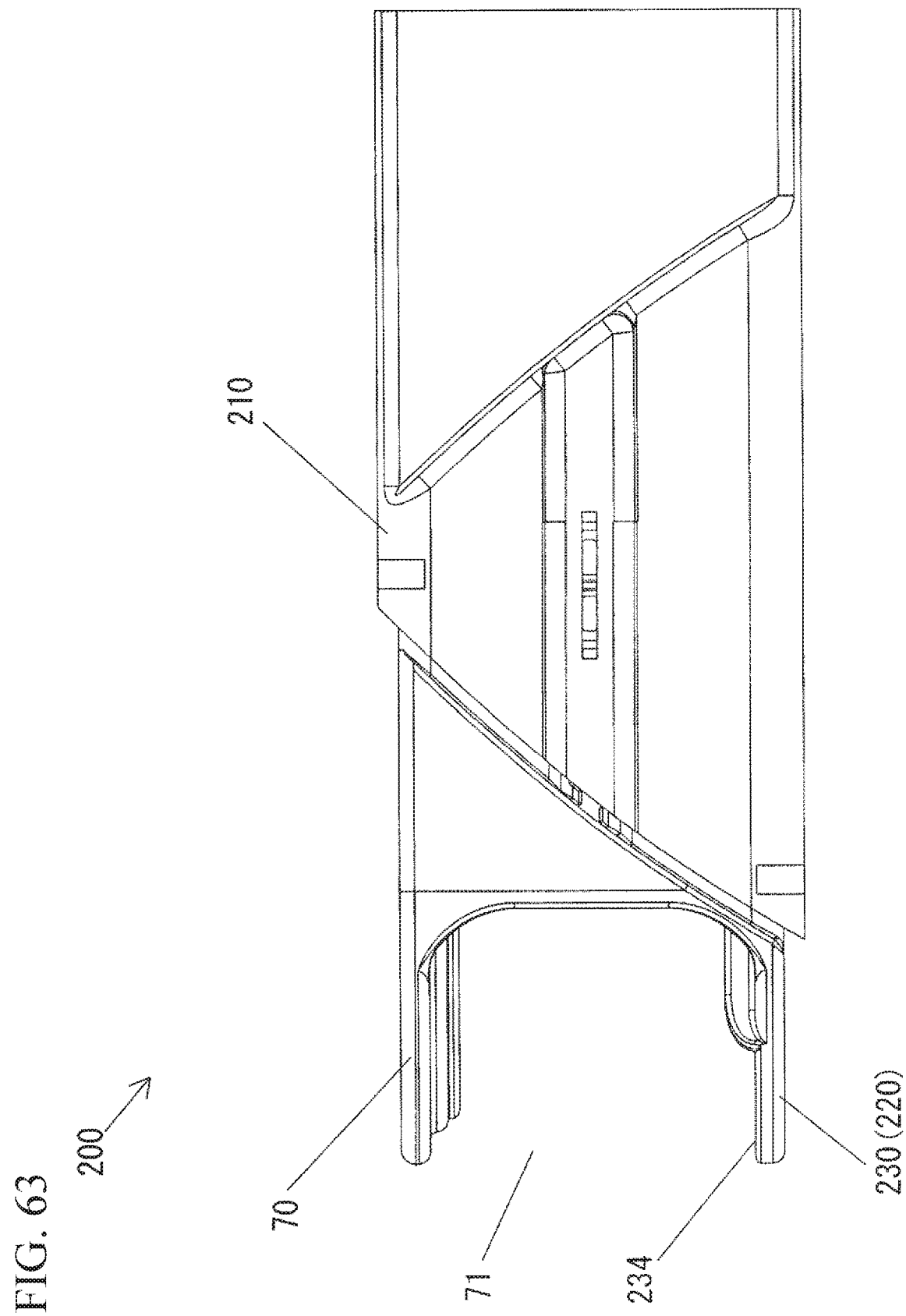
FIG. 63 is a side view corresponding to FIG. 61.

Consequently, the thickness in the height direction of the first guide projection 243 and the second guide projection 244 is equally formed as shown in FIG. 46 and FIG. 56. Also, for the similar reason, the groove width in the height direction of a left-side guide groove 241 and a right-side guide groove 242 on the left and right of the case 210 is equally formed as well.

(Air Vent Unit 200)

Figure 45:
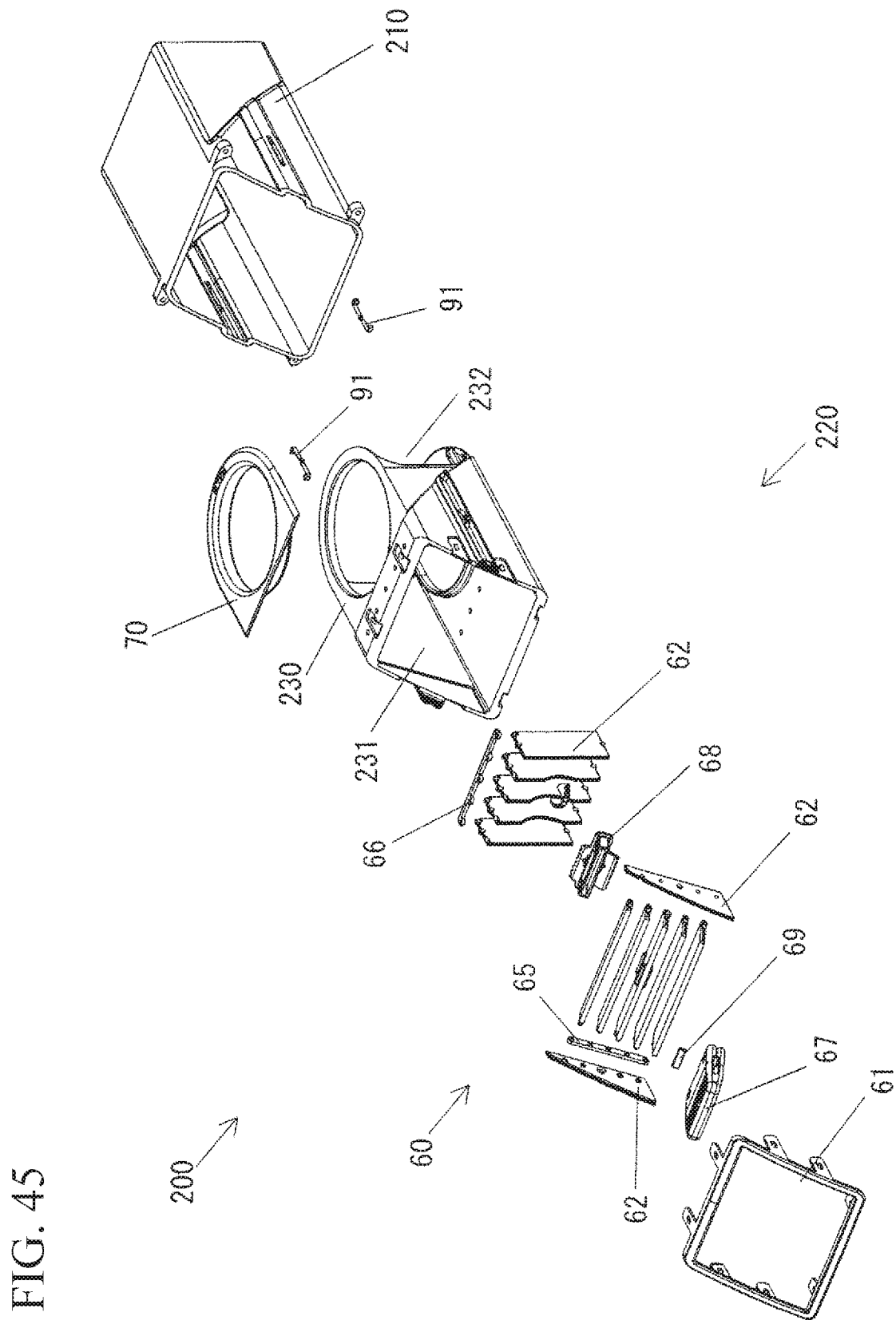
FIG. 45 is an exploded perspective view of the air vent unit according to the second embodiment of the present invention.

As shown in FIG. 45, the air vent unit 200 is generally formed by the case 210 and the unit main member 220.

In the present embodiment, regarding structural portions same as those of the first embodiment explained with reference to FIG. 1 to FIG. 40 hereinabove, the same reference signs are designated, and explanations thereof are omitted.

(Case 210)

Figure 49:
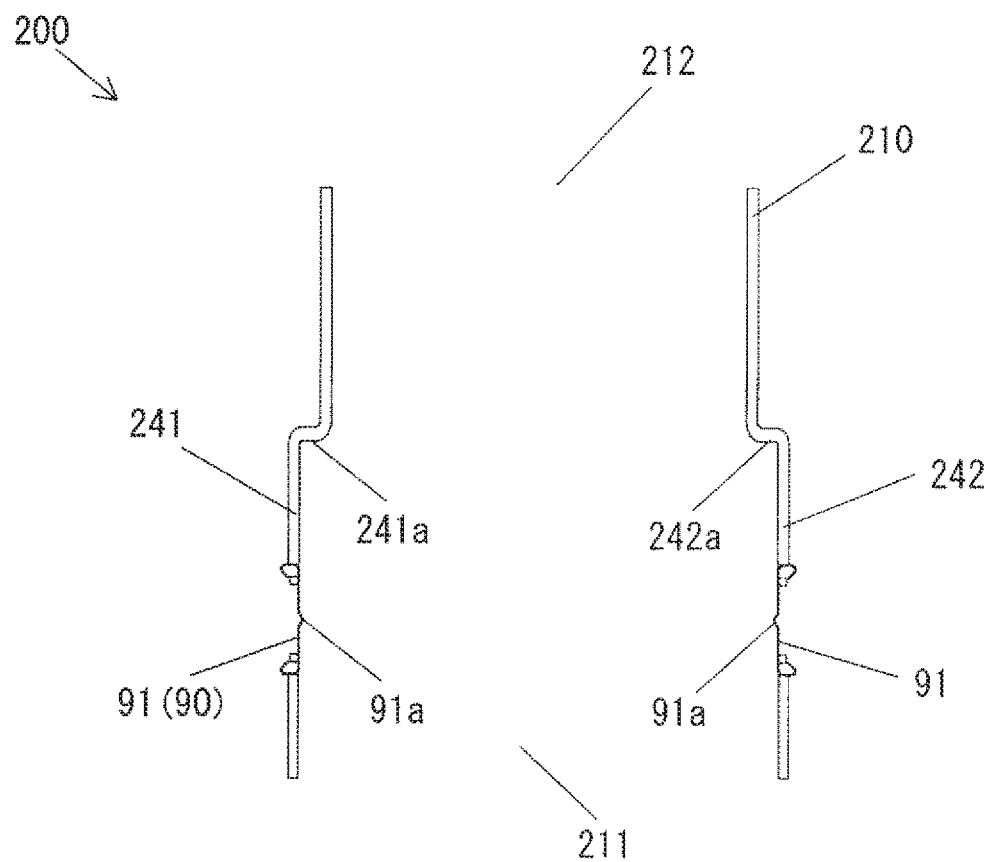
FIG. 49 is a cross-sectional view taken along line I-I in FIG. 46.
Figure 50:
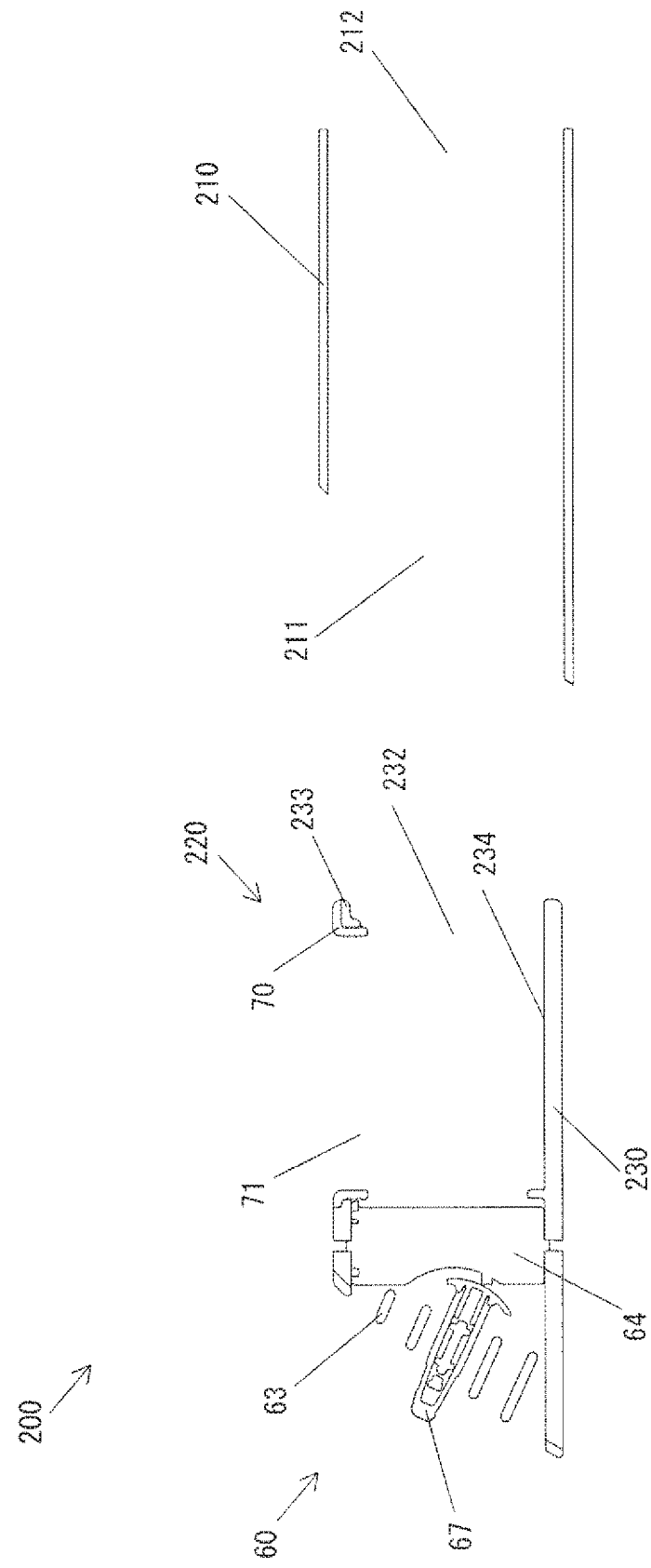
FIG. 50 is a cross-sectional view taken along line J-J in FIG. 46.
Figure 51:
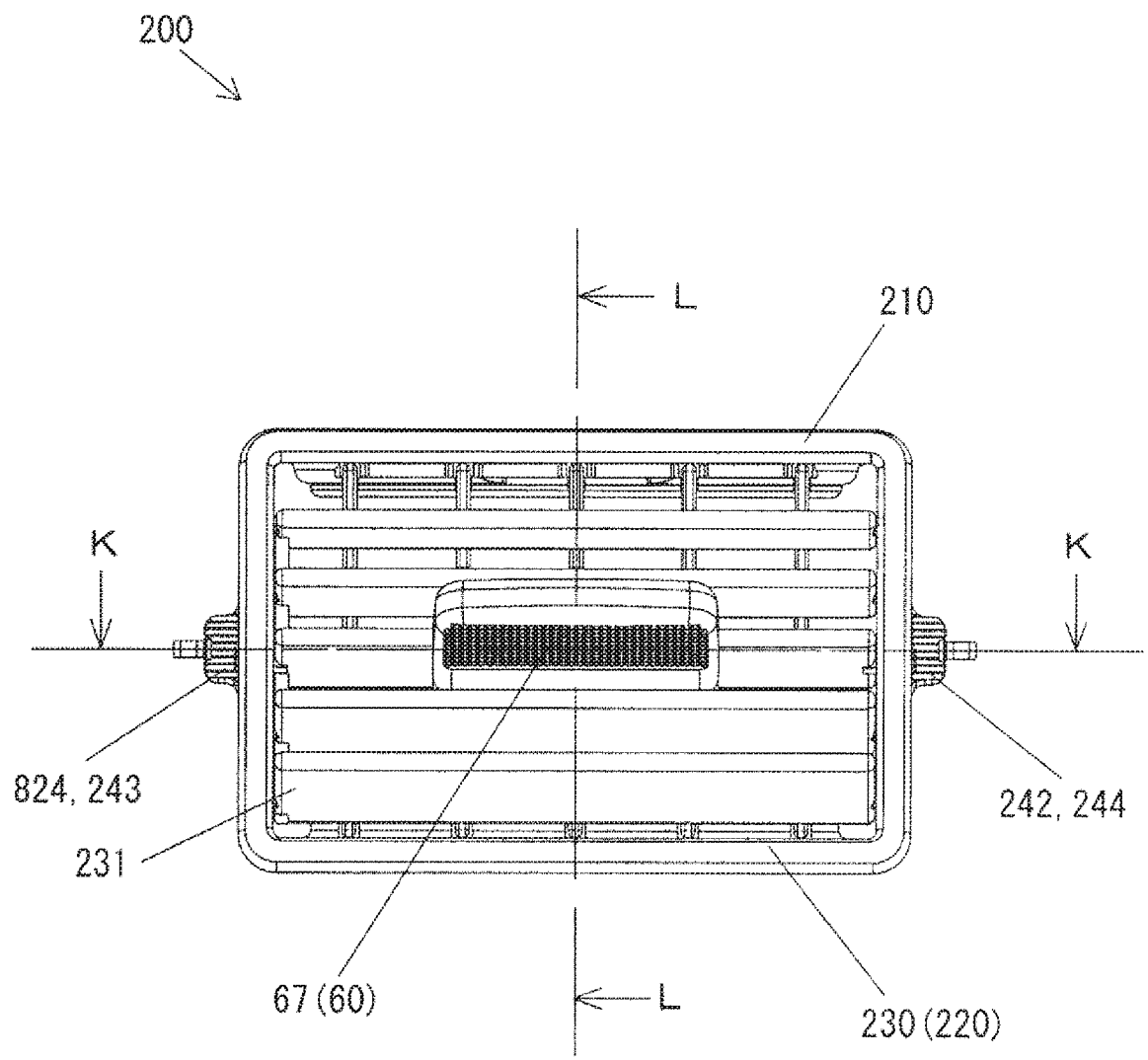
FIG. 51 is a front view corresponding to FIG. 42.
Figure 52:
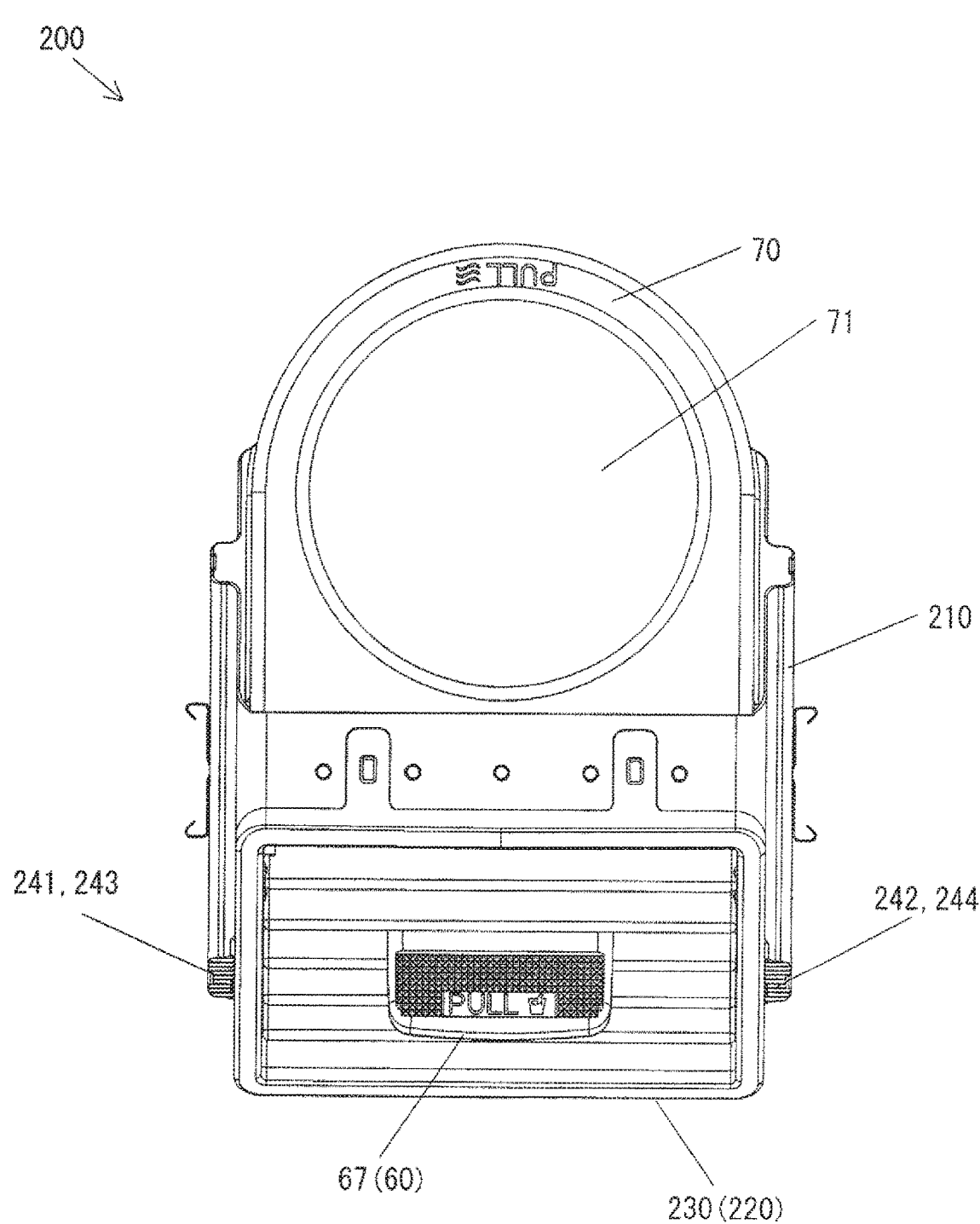
FIG. 52 is a plan view corresponding to FIG. 51.
Figure 53:
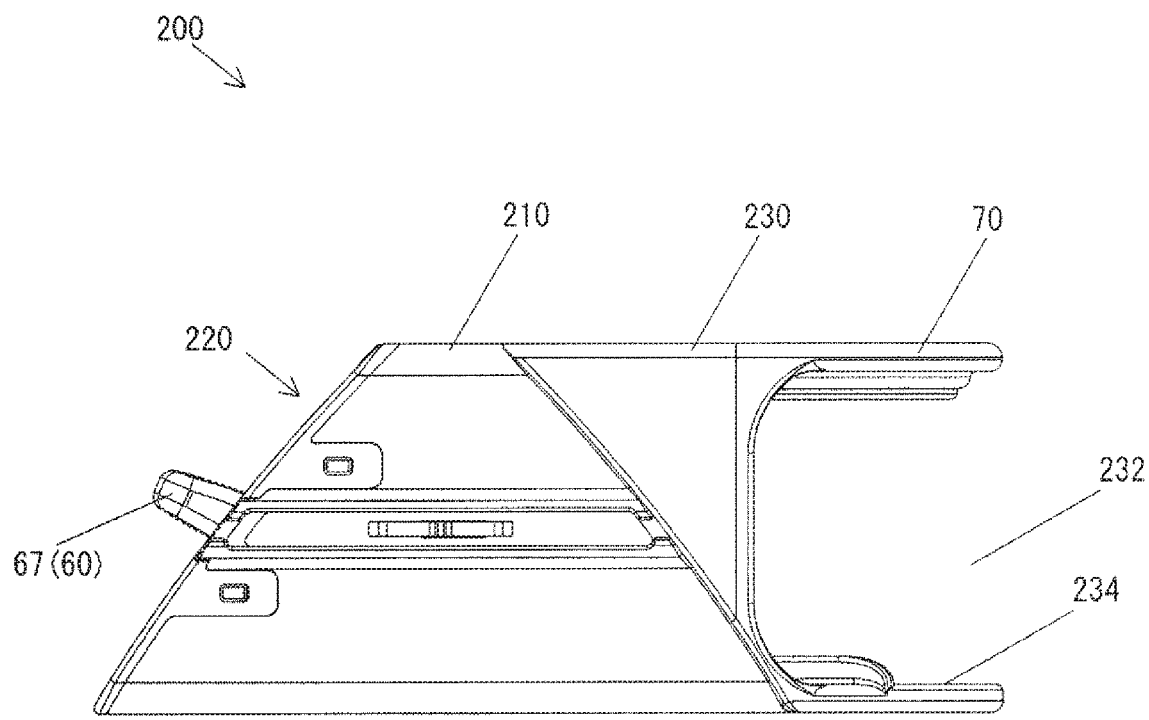
FIG. 53 is a side view corresponding to FIG. 51.

As shown in FIG. 43 and FIG. 49, the case 210 generally comprises a front face opening 211; a back face opening 212; attachment portions 213; and the left-side guide groove 241 and the right-side guide groove 242 on the left and right.

(Unit Main Member 220)

As shown in FIG. 41, FIG. 43, and FIG. 45, the unit main member 220 generally comprises the housing 230, the vent portion 60, and the container holding portion 70.

As shown in FIG. 41, FIG. 43, FIG. 49, and FIG. 50, the housing 230 generally comprises a first opening 231, a second opening 232, a ring attachment portion 233, a container support portion 244, and the first guide projection 243 and the second guide projection 244 on the left and right.

Figure 42:
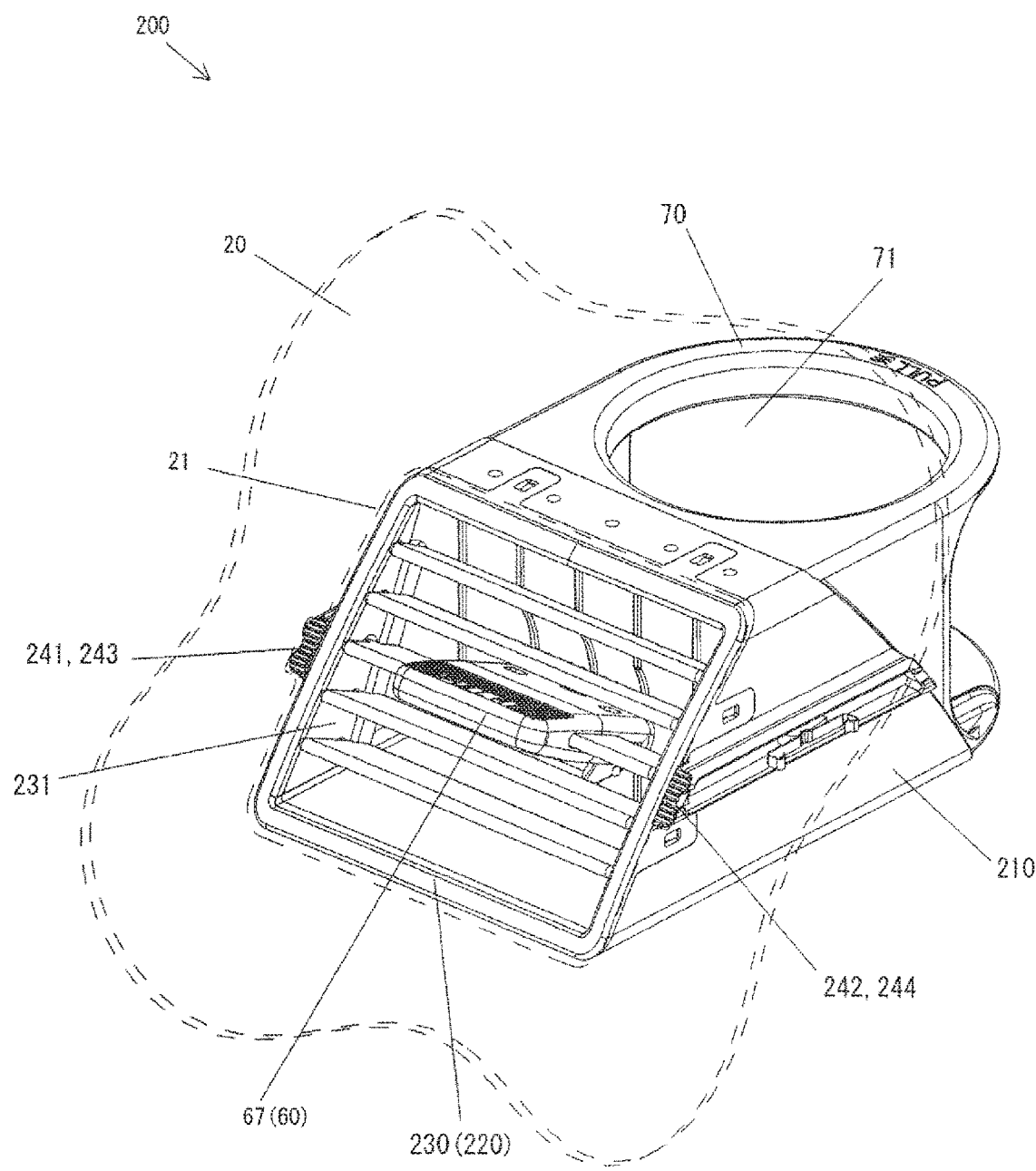
FIG. 42 is a perspective view of the air vent unit in the state wherein the vent portion of the unit main member is attached according to the second embodiment of the present invention.

(Vent-Portion Attachment State Shown in FIG. 42)

Next, a usage of the air vent unit 200 including the aforementioned structures will be explained. First, with reference to FIG. 42, the vent-portion attachment state will be explained.

In the vent-portion attachment state, as shown in FIG. 42, the unit main member 220 fits into the case 210 fixed in the outlet 21 of the panel 20 in the buried state, and at that time, the bent portion 60 faces the interior side.

Figure 54:
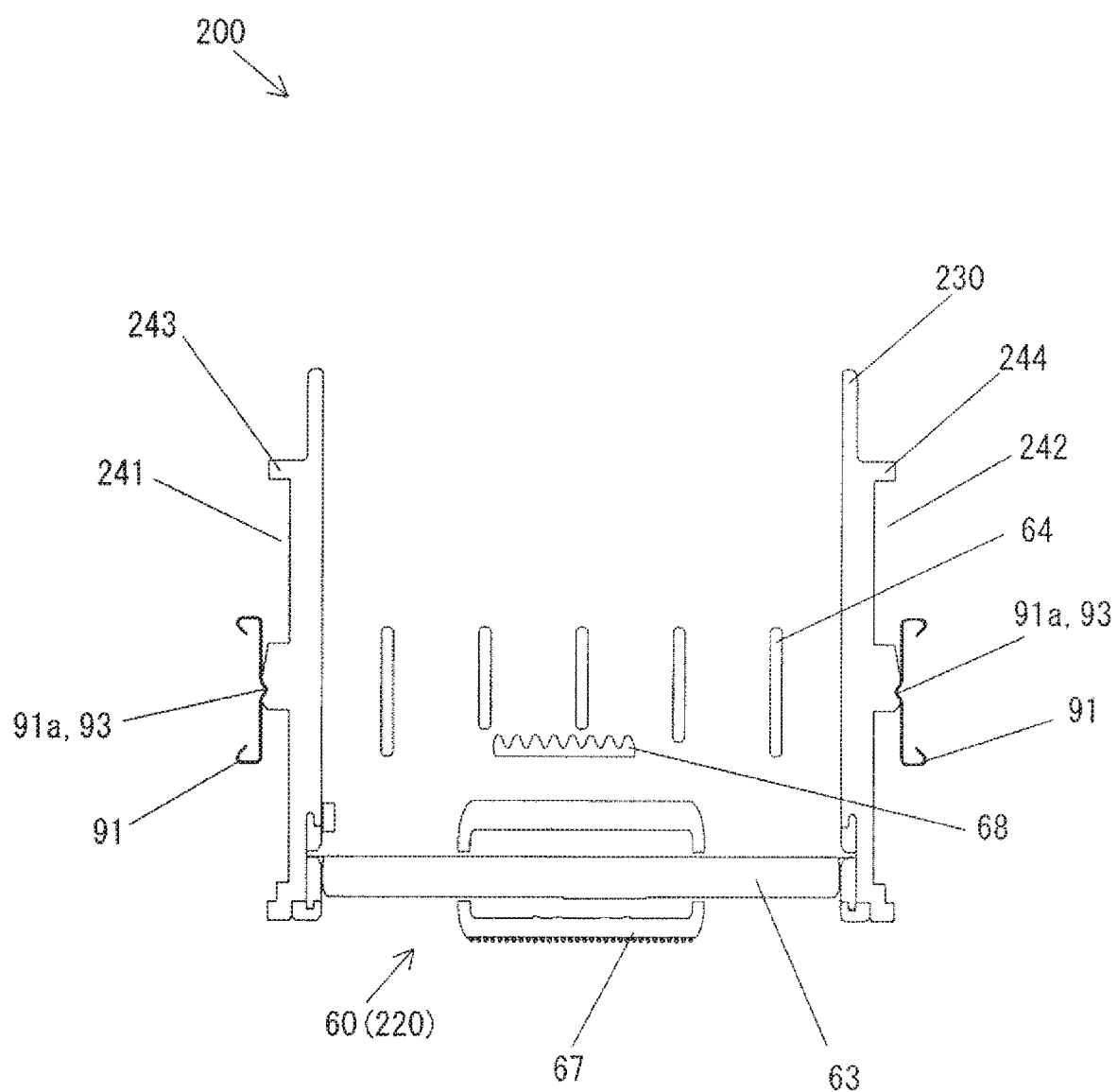
FIG. 54 is a cross-sectional view taken along line K-K in FIG. 51.
Figure 55:
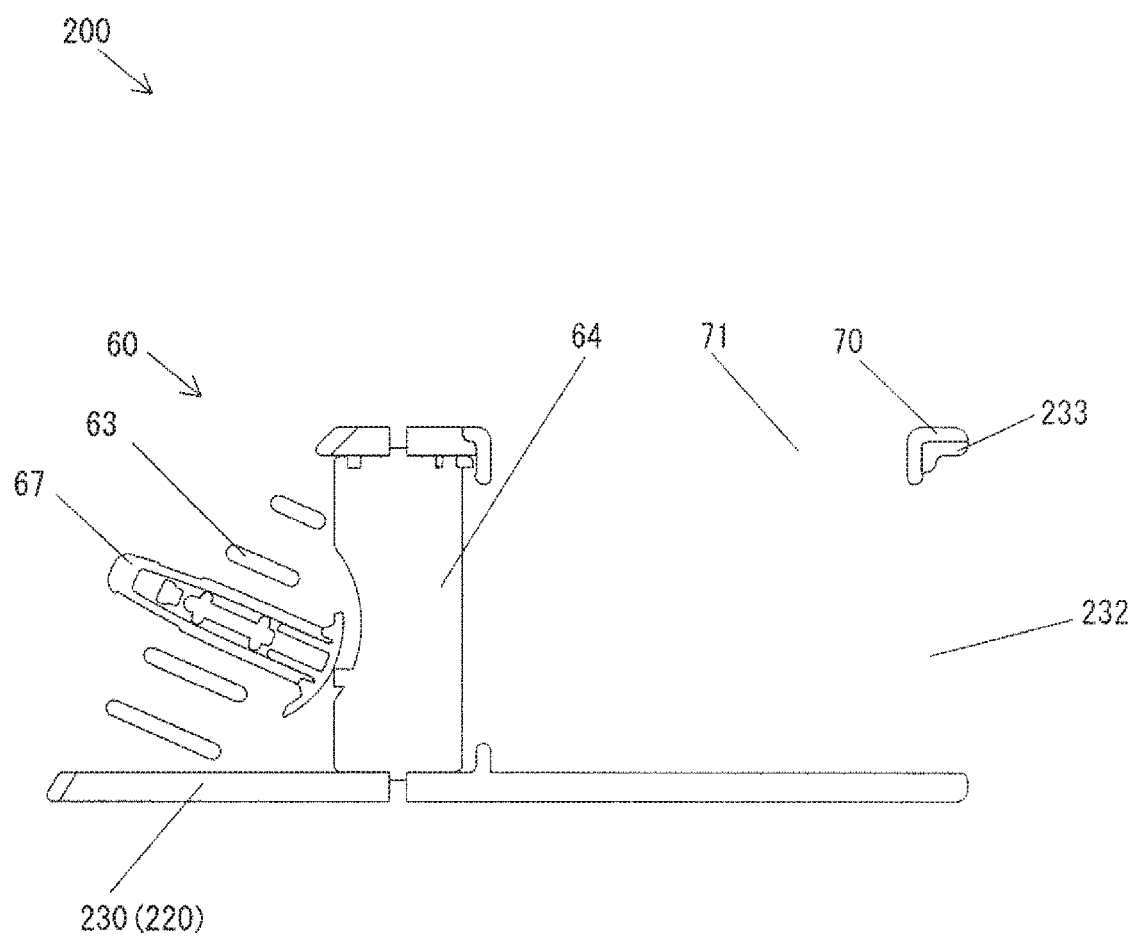
FIG. 55 is a cross-sectional view taken along line L-L in FIG. 51.

In the vent-portion attachment state, as shown in FIG. 54, the unit main member 220 is locked relative to the case 210 by the lock device 90. Also, the container holding portion 70 of the unit main member 220 is stored inside the case 210.

(Attachment State of the Unit Main Member 220 Shown in FIG. 41 and FIG. 43)

Next, in a case wherein the container holding portion 70 of the unit main member 220 is used, as shown in FIG. 43, first, the unit main member 220 is pulled out of the front face opening 211 of the case 210.

When the unit main member 220 is pulled out, the leaf springs 91 positioned on a case 210 side bend, and as shown in FIG. 54, the convex portions 91a fitted into the engagement concave portions 93 of the engagement portions 92 positioned on a unit-main-member 220 side disengage from the relevant engagement concave portions 93 so as to release the lock state of the lock device 90. After releasing the lock state, the unit main member 220 is pulled out of the case 210, and as shown in FIG. 43, the unit main member 220 is removed.

Next, as shown in FIG. 41, the removed unit main member 220 turns over in the horizontal direction. At that time, the container holding portion 70 is positioned on the near side of an operator, and the vent portion 60 is positioned on the back side of the operator, i.e. toward the front face opening 211 of the case 210.

Here, "turning over in the horizontal direction" means rotating the unit main member 220 in FIG. 43 in a front-back direction by 180 degrees.

(Container-Holding-Portion Attachment State Shown in FIG. 44)

Next, the unit main member 220 is attached to the case 210 so as to become the container-holding-portion attachment state shown in FIG. 44.

Namely, as shown in FIG. 41, the unit main member 220 removed and turned over in the horizontal direction is matched and inserted into the front face opening 211 of the case 210 from the vent portion 60.

When the unit main member 220 is inserted from the vent portion 60, the first guide projection 243 and the second guide projection 244 on the left and right respectively fit into the left-side guide groove 241 and the right-side guide groove 242 on the left and right on the case 210 side.

Figure 64:
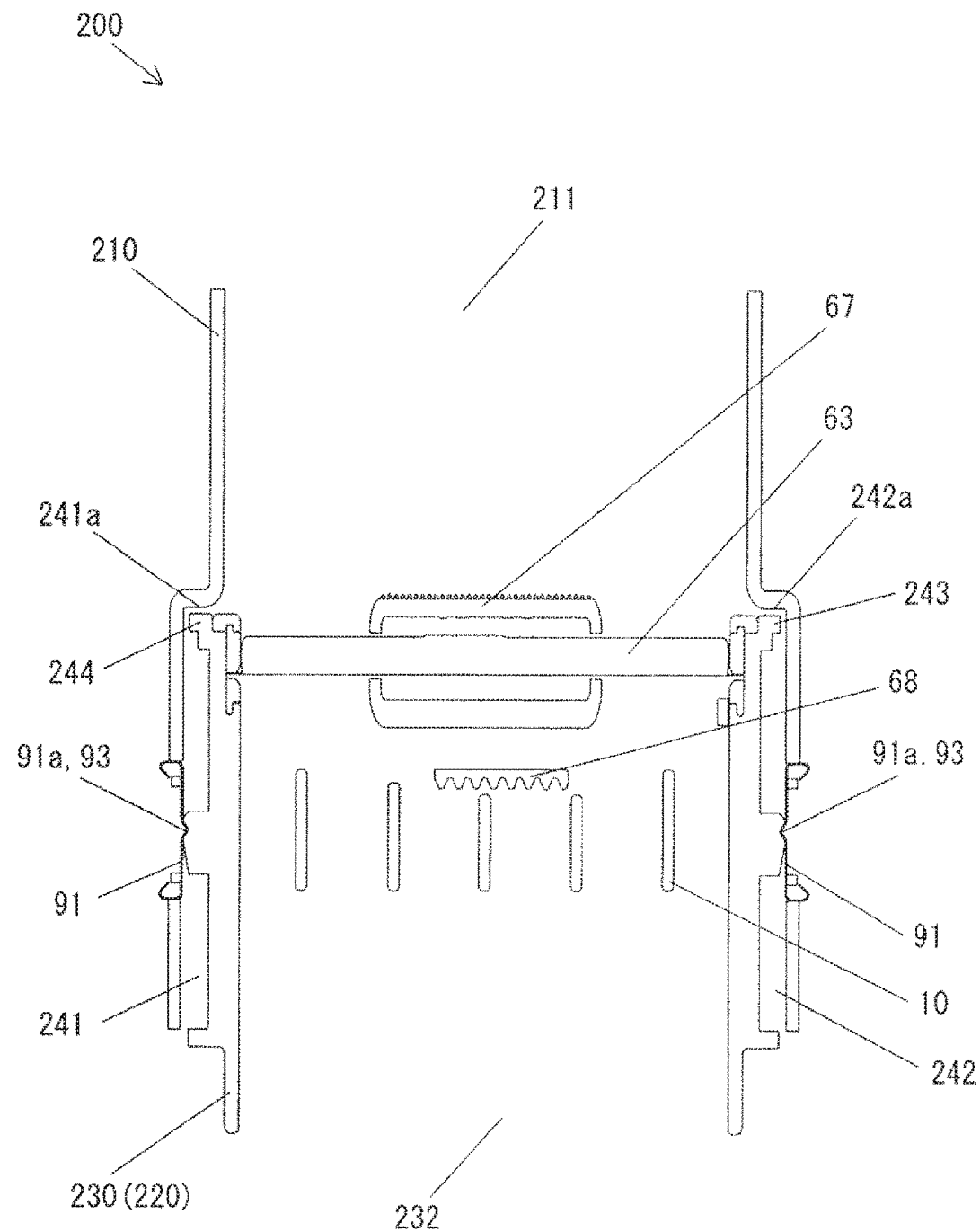
FIG. 64 is a cross-sectional view taken along line O-O in FIG. 61.
Figure 65:
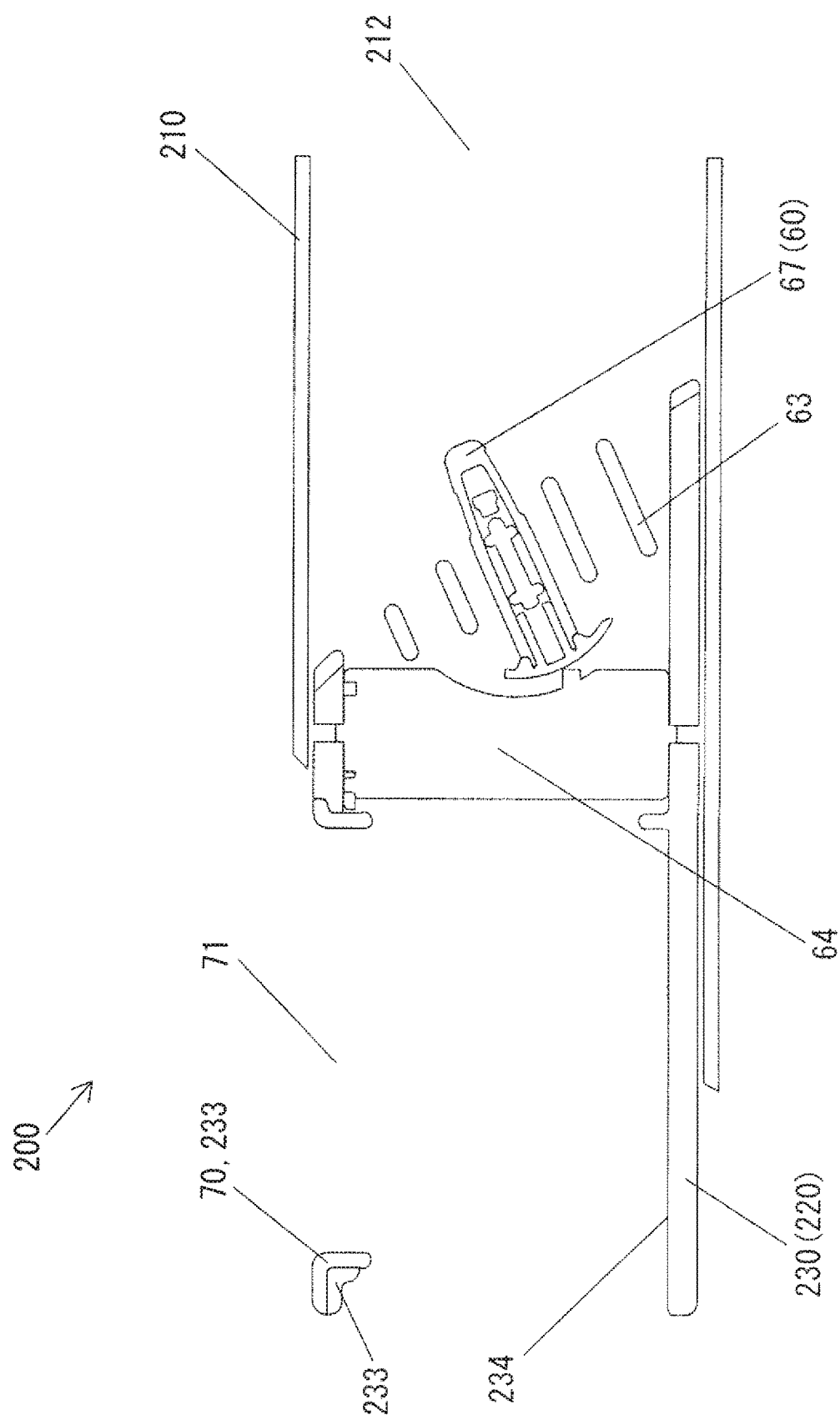
FIG. 65 is a cross-sectional view taken along line P-P in FIG. 61.

As shown in FIG. 64, when the unit main member 220 is inserted further, the convex portion 91a of the leaf spring 91 positioned on the case 210 side fits into the engagement concave portion 93 of the engagement portion 92 positioned on the unit-main-member 220 side, and the lock device 90 comes to the lock state.

In the container-holding-portion attachment state shown in FIG. 44, when the unit main member 220 is attempted to be pushed into the case 210, upper end portions of the left-and-right guide projections 243 and 244 positioned on the unit-main-member 220 side in FIG. 64 abut against closed terminal portions 241a and 242a of the left-and-right guide grooves 241 and 242 positioned on the case 210 side so as to prevent the unit main member 220 from being pushed.

Figure 66:
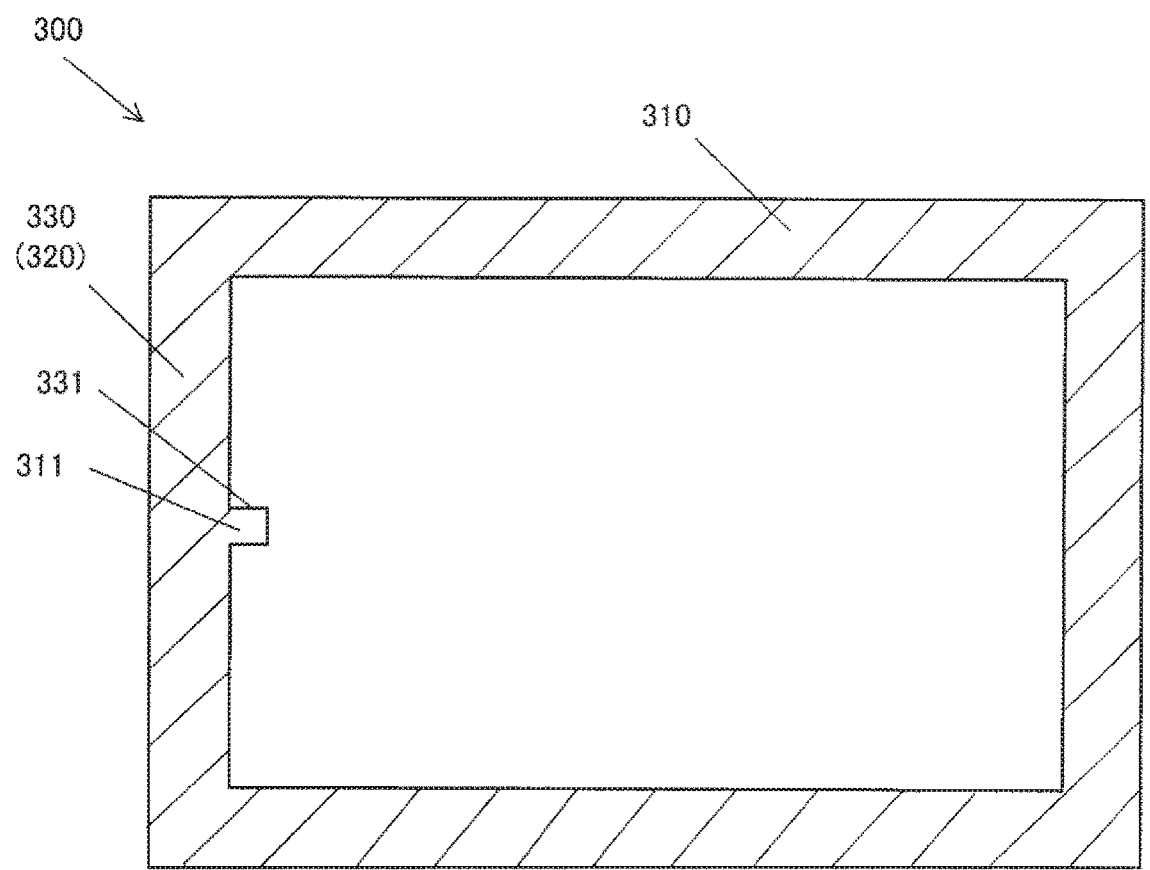
FIG. 66 is an explanatory drawing for explaining a positional relation between a guide projection and a guide groove provided between the case and the unit main member according to a third embodiment of the present invention.

(Third Embodiment with Reference to FIG. 66)

Next, with reference to FIG. 66, a third embodiment of the present invention will be explained.

Characteristics of the third embodiment according to the present invention are such that a guide projection 311 is provided on an inside face on a left side in FIG. 66 of a case 310 of an air vent unit 300, and that a guide groove 331, which fits in the guide projection 311, where the guide projection 311 can slide, is provided on an outside face on the left side in FIG. 66 of a housing 330 of a unit main member 320.

According to the present embodiment, the erroneous assembly of the unit main member 320 relative to the case 310 can be prevented.

Incidentally, although the guide projection 311 is provided on the inside face on the left side of the case 310, it is not limited to the above, and although it is not shown in the drawings, the guide projection may be provided on the inside face on a right side, and corresponding to this, the guide groove may be provided on the outside face on the right side of the housing 330.

The present embodiment is usable for the first embodiment explained with reference to FIG. 1 to FIG. 40 hereinabove. Incidentally, in the second embodiment explained with reference to FIG. 41 to FIG. 65 hereinabove, when the unit main member 220 turns over in the horizontal direction, as shown in FIG. 41 and FIG. 43, the left and right turn over, so that it is not possible to use the present embodiment.

Figure 67:
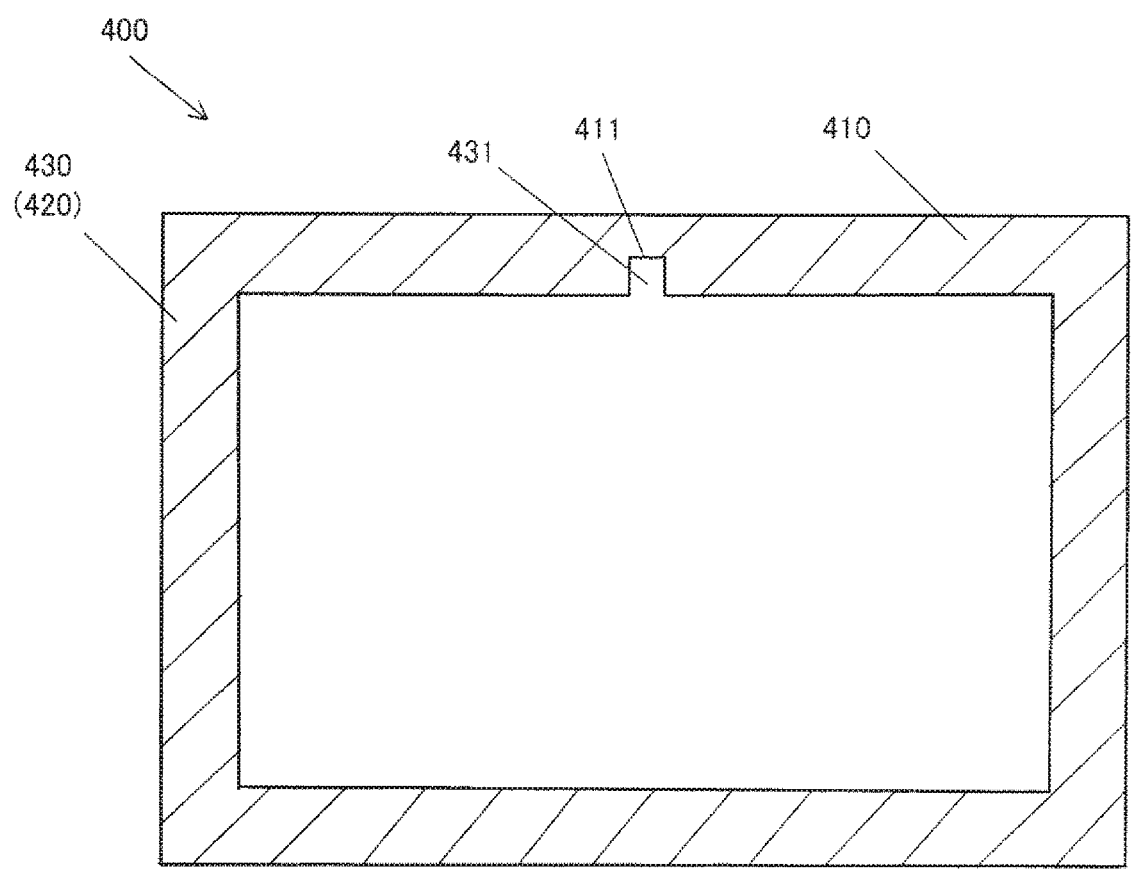
FIG. 67 is an explanatory drawing for explaining a positional relation between the guide projection and the guide groove provided between the case and the unit main member according to a fourth embodiment of the present invention.

(Fourth Embodiment with Reference to FIG. 67)

With reference to FIG. 67, a fourth embodiment of the present invention will be explained.

Characteristics of the fourth embodiment according to the present invention are such that in an air vent unit 400, a guide projection 431 is provided on an upper face of a housing 430 of a unit main member 420, and that a guide groove 411, which fits in the guide projection 431, where the guide projection 431 can slide, is provided on a ceiling face on an inner face of a case 410.

According to the present embodiment, the erroneous assembly of the unit main member 420 relative to the case 410 can be prevented.

Incidentally, although the guide projection 431 is provided on the upper face of the housing 430, it is not limited to the above, and although it is not shown in the drawings, the guide projection may be provided on a lower face, and corresponding to this, the guide groove may be provided on a bottom face on the inner face of the case 410.

The present embodiment is usable for the second embodiment explained with reference to FIG. 41 to FIG. 65 hereinabove. Incidentally, in the first embodiment explained with reference to FIG. 1 to FIG. 40 hereinabove, when the unit main member 40 turns over in the up-and-down direction, as shown in FIG. 1 and FIG. 3, top and bottom turn over, so that it is not possible to use the present embodiment.

Figure 68:
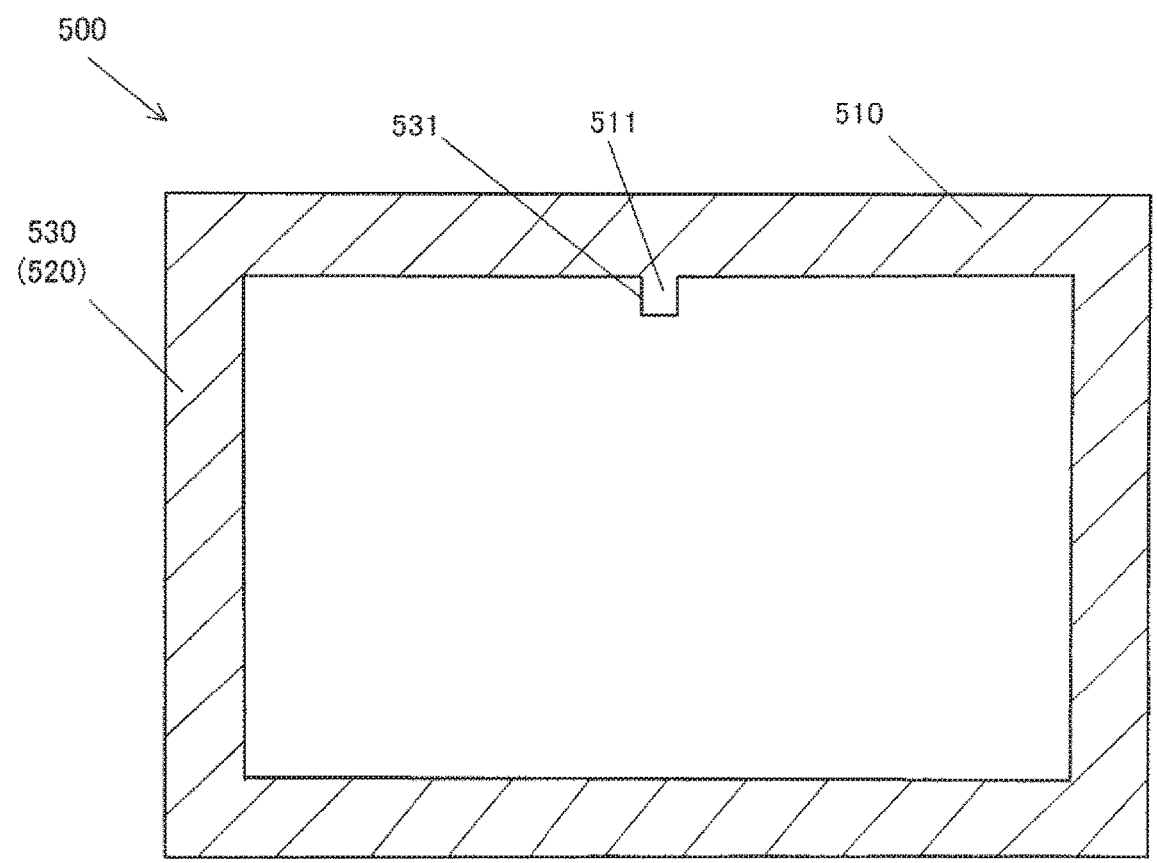
FIG. 68 is an explanatory drawing for explaining a positional relation between the guide projection and the guide groove provided between the case and the unit main member according to a fifth embodiment of the present invention.

(Fifth Embodiment with Reference to FIG. 68)

With reference to FIG. 68, a fifth embodiment of the present invention will be explained.

Characteristics of the fifth embodiment according to the present invention are such that a guide projection 511 is provided on a ceiling face on an inner face of a case 510 of an air vent unit 500, and that a guide groove 531, which fits in the guide projection 511, where the guide projection 511 can slide, is provided on an upper face of a housing 53 of a unit main member 520, and this is a pattern opposite to that of the fourth embodiment explained with reference to FIG. 67.

According to the present embodiment, the erroneous assembly of the unit main member 520 relative to the case 510 can be prevented.

Incidentally, although the guide projection 511 is provided on the ceiling face of the inner face of the case 510, it is not limited to the above, and although it is not shown in the drawings, the guide projection may be provided on a bottom face of the inner face, and corresponding to this, the guide groove may be provided on a lower face of the housing 530.

The present embodiment is usable for the second embodiment explained with reference to FIG. 41 to FIG. 65 hereinabove. Incidentally, in the first embodiment explained with reference to FIG. 1 to FIG. 40 hereinabove, when the unit main member 40 turns over in the up-and-down direction, as shown in FIG. 1 and FIG. 3, the top and bottom turn over, so that it is not possible to use the present embodiment.

Figure 69:
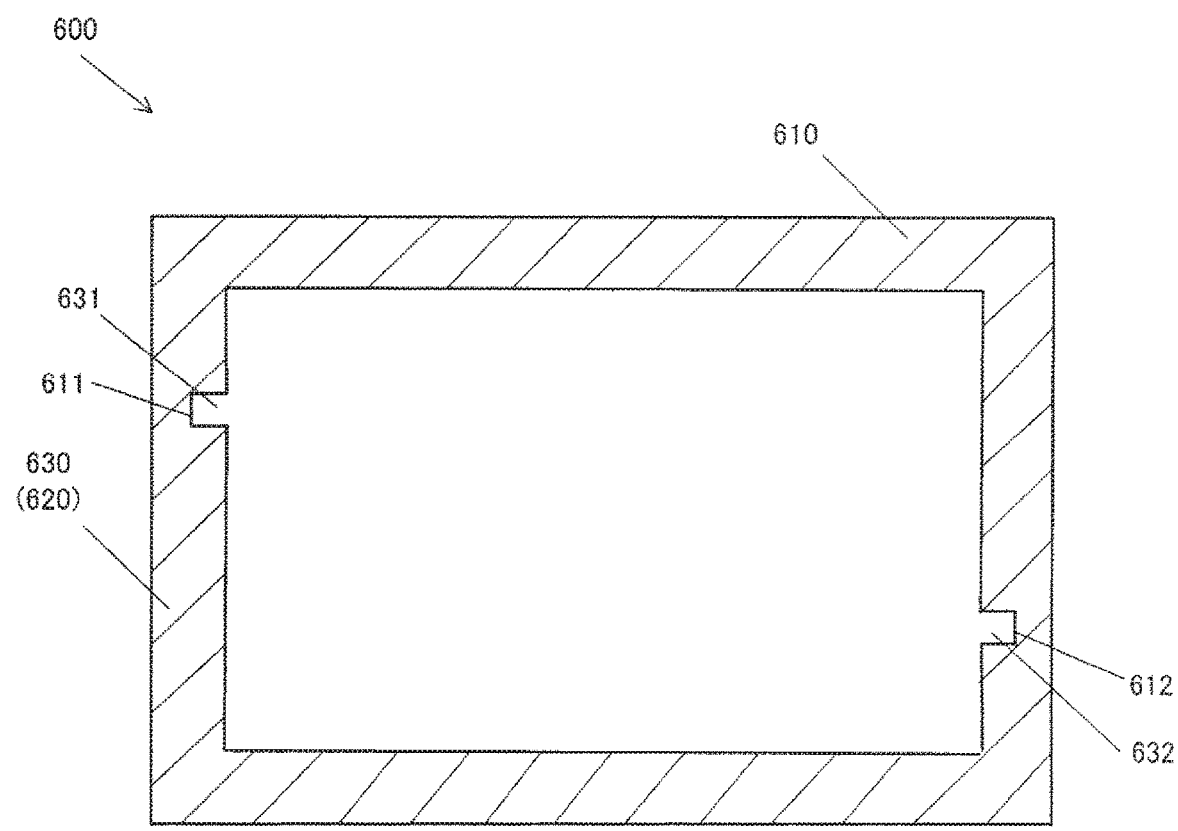
FIG. 69 is an explanatory drawing for explaining a positional relation between the guide projection and the guide groove provided between the case and the unit main member according to a sixth embodiment of the present invention.

(Sixth Embodiment with Reference to FIG. 69)

With reference to FIG. 69, a sixth embodiment of the present invention will be explained.

Characteristics of the sixth embodiment according to the present invention are such that height positions in the up-and-down direction of facing guide grooves 611 and 612 are differentiated from each groove.

According to the present embodiment, the erroneous assembly of a unit main member 620 relative to a case 610 can be prevented.

Namely, in an air vent unit 600, in a housing 630 of the unit main member 620, a guide projection 631 is provided on an upper side of an outside face on a left side in FIG. 69, and a guide projection 632 is provided on a lower side of the outside face on a right side in FIG. 69.

In the case 610, the guide groove 611, which fits in the guide projection 631 on the upper side, where the guide projection 631 can slide, is provided on the upper side of the inside face on the left side, and the guide groove 612, which fits in the guide projection 632 on the lower side, where the guide projection 632 can slide, is provided on the lower side of the inside face on the right side.

Incidentally, although the guide projection 631 is provided on the upper side of the outside face of the housing 630, and the guide projection 632 is provided on the lower side of the outside face on the right side, they are not limited to the above provided that the height positions in the up-and-down direction of the guide projections 631 and 632 are differentiated.

The present embodiment is usable for the first embodiment explained with reference to FIG. 1 to FIG. 40 hereinabove. Incidentally, in the second embodiment explained with reference to FIG. 41 to FIG. 65 hereinabove, when the unit main member 220 turns over in the horizontal direction, as shown in FIG. 41 and FIG. 43, the left and right turn over, so that it is not possible to use the present embodiment.

Figure 70:
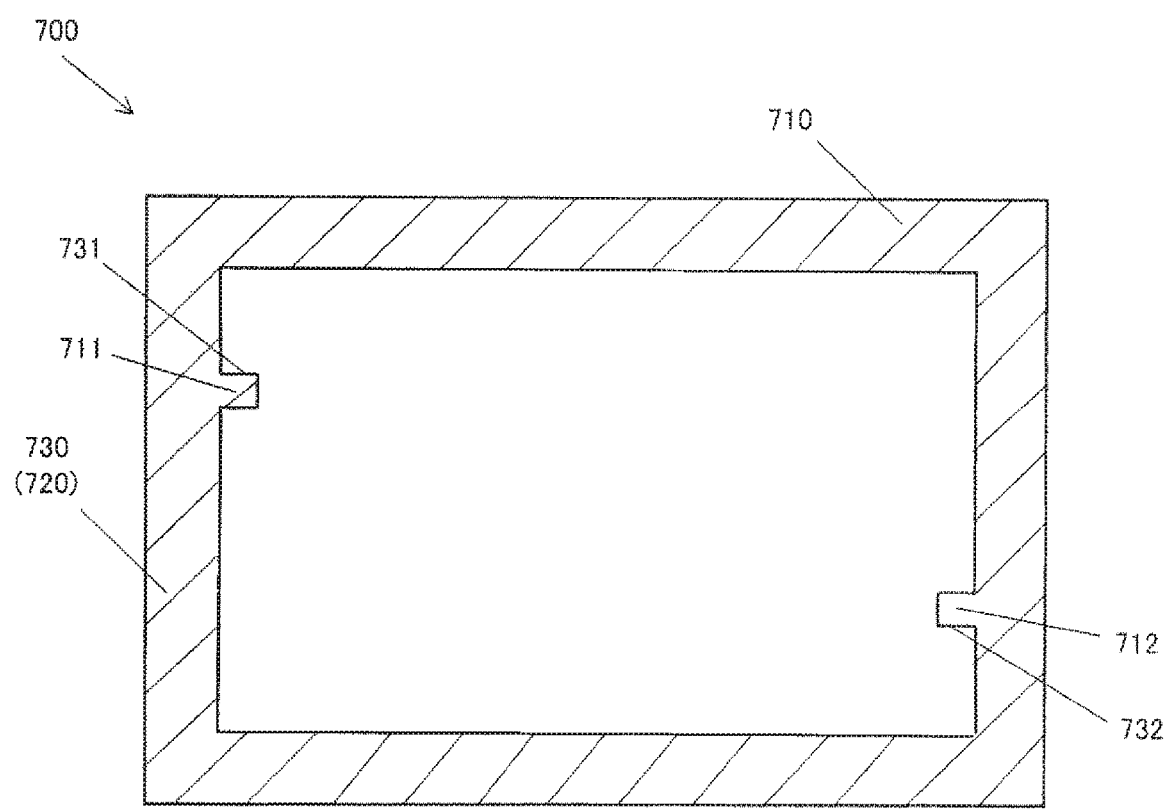
FIG. 70 is an explanatory drawing for explaining a positional relation between the guide projection and the guide groove provided between the case and the unit main member according to a seventh embodiment of the present invention.

(Seventh Embodiment with Reference to FIG. 70)

With reference to FIG. 70, a seventh embodiment of the present invention will be explained.

Characteristics of the seventh embodiment according to the present invention have a pattern opposite to that of the sixth embodiment explained with reference to FIG. 69.

According to the present embodiment, the erroneous assembly of a unit main member 720 relative to a case 710 can be prevented.

Namely, in the case 710 of the unit main member 720, a guide projection 711 is provided on an upper side of an inside face on a left side in FIG. 70, and a guide projection 712 is provided on a lower side of the inside face on a right side in FIG. 70.

In the housing 630 of the unit main member 620, a guide groove 731, which fits in the guide projection 711 on the upper side, where the guide projection 711 can slide, is provided on the upper side of the outside face on the left side, and a guide groove 732, which fits in the guide projection 712 on the lower side, where the guide projection 712 can slide, is provided on the lower side of the outside face on the right side.

Incidentally, although the guide projection 711 is provided on the upper side of the inside face of the left side of the case 710, and the guide projection 712 is provided on the lower side of the inside face on the right side, they are not limited to the above provided that the height positions in the up-and-down direction of the guide projections 711 and 712 are differentiated.

The present embodiment is usable for the first embodiment explained with reference to FIG. 1 to FIG. 40 hereinabove. Incidentally, in the second embodiment explained with reference to FIG. 41 to FIG. 65 hereinabove, when the unit main member 220 turns over in the horizontal direction, as shown in FIG. 41 and FIG. 43, the left and right turn over, so that it is not possible to use the present embodiment.

Figure 71:
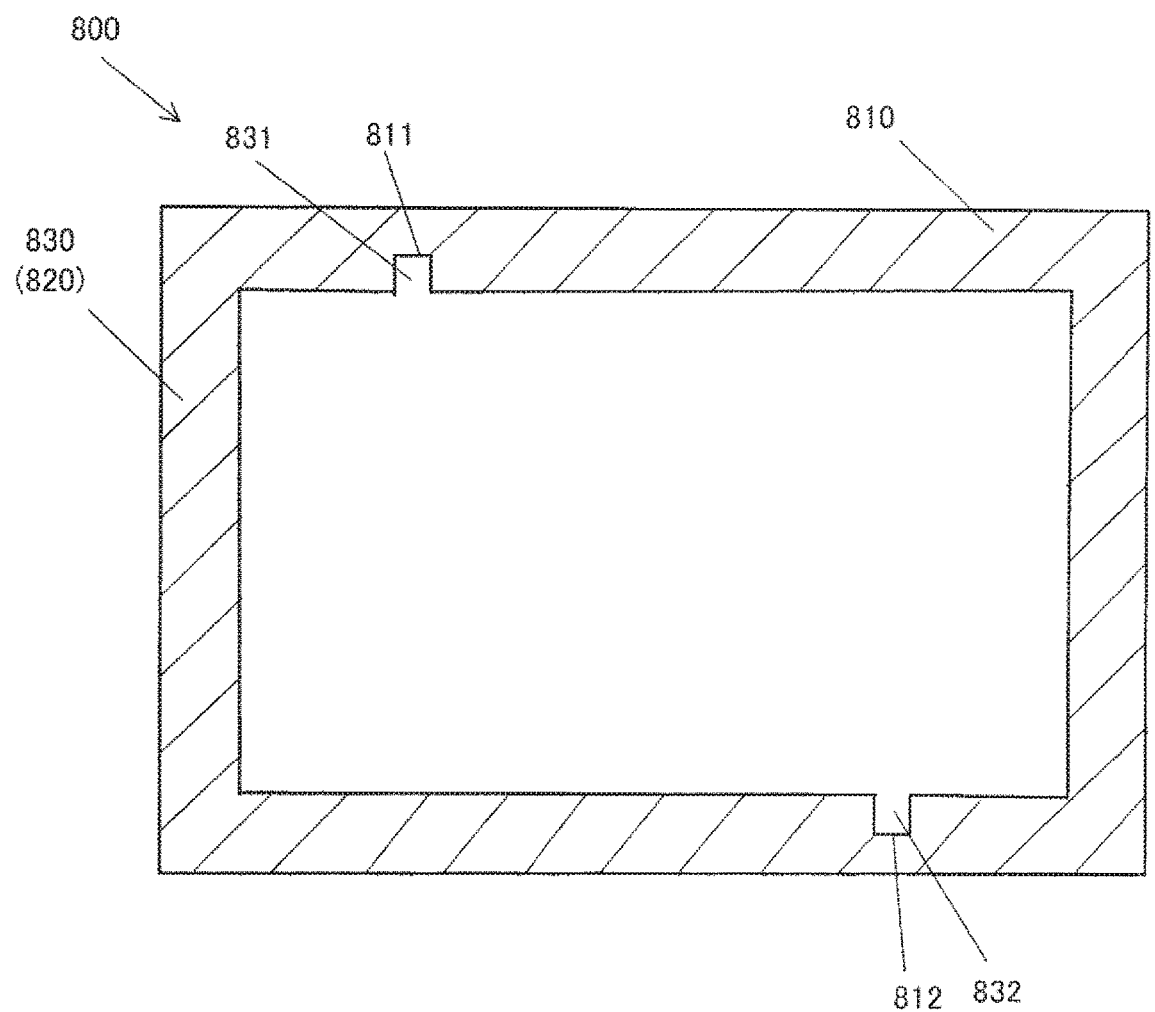
FIG. 71 is an explanatory drawing for explaining a positional relation between the guide projection and the guide groove provided between the case and the unit main member according to an eighth embodiment of the present invention.

(Eighth Embodiment with Reference to FIG. 71)

With reference to FIG. 71, an eighth embodiment of the present invention will be explained.

Characteristics of the eighth embodiment according to the present invention are such that positions in the right-and-left direction of facing guide grooves 811 and 812 are differentiated from each groove.

According to the present embodiment, the erroneous assembly of a unit main member 820 relative to a case 810 can be prevented.

Namely, in an air vent unit 800, in a housing 830 of the unit main member 820, a guide projection 831 is provided on an upper face on a left side in FIG. 71, and a guide projection 832 is provided on a lower face on a right side in FIG. 71.

In the case 810, the guide groove 811, which fits in the guide projection 831 on the left side, where the guide projection 831 can slide, is provided on the left side of the ceiling face of the inner face, and the guide groove 812, which fits in the guide projection 832 on the right side, where the guide projection 832 can slide, is provided on the right side of the bottom face of the inner face.

Incidentally, although the guide projection 831 is provided on the left side of the upper face of the housing 830, and the guide projection 832 is provided on the right side of the lower face, they are not limited to the above provided that the positions in the right-and-left direction of the guide projections 831 and 832 are differentiated.

The present embodiment is usable for the second embodiment explained with reference to FIG. 41 to FIG. 65 hereinabove. Incidentally, in the first embodiment explained with reference to FIG. 1 to FIG. 40 hereinabove, when the unit main member 40 turns over in the up-and-down direction, as shown in FIG. 1 and FIG. 3, the top and bottom turn over, so that it is not possible to use the present embodiment.

Figure 72:
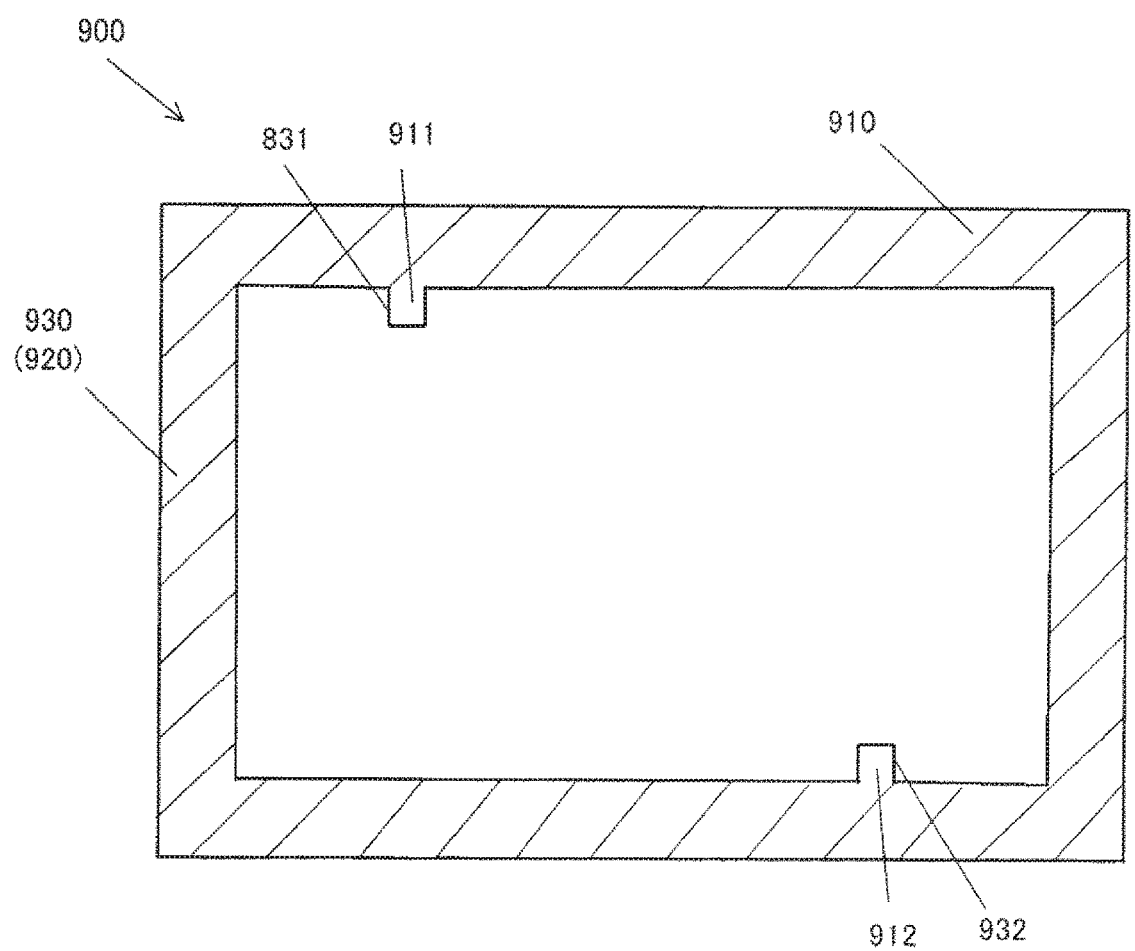
FIG. 72 is an explanatory drawing for explaining a positional relation between the guide projection and the guide groove provided between the case and the unit main member according to a ninth embodiment of the present invention.

(Ninth Embodiment with Reference to FIG. 72)

With reference to FIG. 72, a ninth embodiment of the present invention will be explained.

Characteristics of the ninth embodiment according to the present invention have a pattern opposite to that of the eighth embodiment explained with reference to FIG. 71.

According to the present embodiment, the erroneous assembly of a unit main member 920 relative to a case 910 can be prevented.

Namely, in the case 910 of an air vent unit 900, a guide projection 911 is provided on a ceiling face of an inner face on a left side in FIG. 72, and a guide projection 912 is provided on a bottom face of the inside face on a right side in FIG. 72.

In the housing 830, a guide groove 931, which fits in the guide projection 911 on the left side, where the guide projection 911 can slide, is provided on the left side of the upper face, and a guide groove 931, which fits in the guide projection 912 on the right side, where the guide projection 912 can slide, is provided on the right side of the lower face.

Incidentally, in the case 910, although the guide projection 911 is provided on the left side of the ceiling face of the inner face, and the guide projection 912 is provided on the right side of the bottom face on the inner face, they are not limited to the above provided that the positions in the right-and-left direction of the guide projections 911 and 912 are differentiated.

The present embodiment is usable for the second embodiment explained with reference to FIG. 41 to FIG. 65 hereinabove. Incidentally, in the first embodiment explained with reference to FIG. 1 to FIG. 40 hereinabove, when the unit main member 40 turns over in the up-and-down direction, as shown in FIG. 1 and FIG. 3, the top and bottom turn over, so that it is not possible to use the present embodiment.

Explanation of Symbols (First embodiment)

| | | | |
|---|---|---|---|
| 10 | an air vent unit | | |
| 20 | a panel | 21 | an outlet of an air conditioning device |
| 30 | a case | 31 | a front face opening |
| 32 | a back face opening | 33 | attachment portions |
| 40 | a unit main member | 50 | a housing |
| 51 | a first opening | 52 | a second opening |
| 53 | a ring attachment portion | 54 | a container support portion |
| 60 | a vent portion | 61 | a bezel |
| 62 | a holder | 63 | transverse fins |
| 64 | vertical fins | 65 | a first link |
| 66 | a second link | 67 | a knob |
| 68 | a knob gear | 69 | a rubber |
| 70 | a container holding portion | 71 | a container insertion hole |
| 80 | an erroneous-assembly prevention device | | |
| 81 | a left-side guide groove | 81a | a terminal portion |
| 82 | a right-side guide groove | 82a | a terminal portion |
| 83 | a first guide projection | 84 | a second guide projection |

-continued

| Explanation of Symbols | | | |
|---|---|---|---|
| 90 | a lock device | | |
| 91 | leaf springs | 91a | convex portions |
| 92 | engagement portions | 93 | engagement concave portions |
| 94 | first engagement convex portions | | |
| 95 | second engagement convex portions | | |
| 100 | a left side wall | 101 | a right side wall |
| 102 | an upper wall | 103 | a lower wall |
| 110 | a first side wall | 111 | a second side wall |
| 112 | an upper wall | 113 | a lower wall |
| (Second embodiment) | | | |
| 200 | an air vent unit | | |
| 210 | a case | 211 | a front face opening |
| 212 | a back face opening | 213 | attachment portions |
| 220 | a unit main member | 230 | a housing |
| 231 | a first opening | 232 | a second opening |
| 233 | a ring attachment portion | 234 | a container support portion |
| 241 | a left-side guide groove | 241a | a terminal portion |
| 242 | a right-side guide groove | 242a | a terminal portion |
| 243 | a first guide projection | 244 | a second guide projection |
| (Third embodiment) | | | |
| 300 | an air vent unit | | |
| 310 | a case | 311 | a guide projection |
| 320 | a unit main member | | |
| 330 | a housing | 331 | a guide groove |
| (Fourth embodiment) | | | |
| 400 | an air vent unit | | |
| 410 | a case | 411 | a guide groove |
| 420 | a unit main member | | |
| 430 | a housing | 431 | a guide projection |
| (Fifth embodiment) | | | |
| 500 | an air vent unit | | |
| 510 | a case | 511 | a guide projection |
| 520 | a unit main member | | |
| 530 | a housing | 531 | a guide groove |
| (Sixth embodiment) | | | |
| 600 | an air vent unit | 610 | a case |
| 611 | a left-side guide groove | 612 | a right-side guide groove |
| 620 | a unit main member | 630 | a housing |
| 631 | a left-side guide projection | 632 | a right-side guide projection |
| (Seventh Embodiment) | | | |
| 700 | an air vent unit | 710 | a case |
| 711 | a left-side guide projection | 712 | a right-side guide projection |
| 720 | a unit main member | 730 | a housing |
| 731 | a left-side guide groove | 732 | a right-side guide groove |
| (Eighth embodiment) | | | |
| 800 | an air vent unit | 810 | a case |
| 811 | a left-side guide groove | 812 | a right-side guide groove |
| 820 | a unit main member | 830 | a housing |
| 831 | a left-side guide projection | 832 | a right-side guide projection |
| (Ninth embodiment) | | | |
| 900 | an air vent unit | 910 | a case |
| 911 | a left-side guide projection | 912 | a right-side guide projection |
| 920 | a unit main member | 930 | a housing |
| 931 | a left-side guide groove | 932 | a right-side guide groove |

Incidentally, all contents of the specification, claims, drawings, and abstract of Japanese Patent Applications No. 2017-123958 filed on Jun. 26, 2017 are cited in their entireties herein and are incorporated as a disclosure of the specification of the present invention.

What is claimed is:

1. An air vent unit serving as a container holder communicating with an outlet of an air conditioning device, comprising:

a housing formed separately from the outlet of the air conditioning device, and adapted to be attached to and detached from the outlet of the air conditioning device;
a vent portion formed on one side of the housing; and
a container holding portion formed on another side of the housing opposite to the vent portion to hold a container therein,
wherein the air vent unit has a vent-portion attachment state, wherein the vent portion is adapted to face an interior side of a vehicle, and the container holding portion is adapted to be stored inside the outlet, and a container-holding-portion attachment state, wherein the vent portion is adapted to be stored inside the outlet, and the container holding portion is adapted to project toward the interior side.

2. An air vent unit serving as a container holder according to claim 1, further comprises:
a hollow case to be located in the outlet
wherein a guide projection, and a guide groove fitted in the guide projection and extending along an attachment/detachment direction of the unit main member are provided between the case and the housing.

3. An air vent unit serving as a container holder according to claim 2, wherein the guide projection and the guide groove are provided respectively on at least one inside face in a right-and-left direction or an up-and-down direction of the case, and at least one outside face in a right-and-left direction or an up-and-down direction of the housing facing the one inside face in the right-and-left direction or the up-and-down direction of the case.

4. An air vent unit serving as a container holder according to claim 2, wherein the container holding portion includes a container insertion hole capable of inserting the container, and
in a state wherein the vent portion is attached to face the outlet and the container insertion hole faces downward, an erroneous-assembly prevention device preventing the guide projection from fitting into the guide groove is provided.

5. An air vent unit serving as a container holder according to claim 4, wherein the guide projection and the guide groove are provided respectively on an inside face facing in a right-and-left direction or an up-and-down direction of the case, and on an outside face facing in a right-and-left direction or an up-and-down direction of the unit main member facing the inside face facing the right-and-left direction or the up-and-down direction of the case, and
the erroneous-assembly prevention device is formed by differentiating a groove width, or a height position in an up-and-down direction or a position in a right-and-left direction facing the guide grooves from each groove.

6. An air vent unit serving as a container holder according to claim 2, wherein at least one portion of the vent portion of the housing fits in an inside of the case,
in the container-holding-portion attachment state, a pushing prevention device for allowing the container holding portion not to be pushed toward an inside of the outlet is formed by:
a first abutment portion positioned between the inside of the case and the one portion of the vent portion to fit in the inside of the case, abutting against each other in a state wherein the one portion of the vent portion fits in the inside of the case, and provided in the one portion of the vent portion; and
a second abutment portion provided inside the case.

7. An air vent unit serving as a container holder according to claim 6, wherein the first abutment portion is provided in one of either the guide projection or the guide groove, and the second abutment portion abutting against the first abutment portion is provided in another of either the guide projection or the guide groove.

8. An air vent unit serving as a container holder according to claim 7, wherein the first abutment portion is formed by the guide projection, and the second abutment portion is formed by the guide groove, and it is positioned in a terminal portion in an insertion direction of the guide projection into the guide groove.

9. An air vent unit serving as a container holder according to claim 1, wherein the container holding portion includes:
a container insertion hole to insert the container; and
a container support portion to support a bottom of the container inserted through the container insertion hole,
in the vent-portion attachment state, the container holding portion is stored inside the outlet by facing the container insertion hole downward,
in a state wherein the air vent unit is removed from the outlet, in a state wherein the air vent unit turns over in an up-and-down direction and the container insertion hole faces upward, the vent portion is attached by facing the outlet.

10. An air vent unit serving as a container holder according to claim 1, wherein the container holding portion includes:
a container insertion hole to insert the container; and
a container support portion supporting a bottom of the container inserted through the container insertion hole,
in the vent-portion attachment state, the container holding portion is stored inside the outlet by facing the container insertion hole upward,
in a state wherein the air vent unit is removed from the outlet, in a state wherein the air vent unit turns over in a horizontal direction and the container insertion hole faces upward, the vent portion is attached by facing the outlet.

11. An air vent unit serving as a container holder according to claim 1, further comprising a guide groove provided in one of the outlet or the housing, and a guide projection fitted in the guide groove and provided in another of the outlet or the housing, the guide groove and the guide projection being arranged so that the housing enters the outlet only when the guide projection is correctly aligned with the guide groove.

* * * * *